US010761995B2

(12) United States Patent
Blaner et al.

(10) Patent No.: US 10,761,995 B2
(45) Date of Patent: Sep. 1, 2020

(54) INTEGRATED CIRCUIT AND DATA PROCESSING SYSTEM HAVING A CONFIGURABLE CACHE DIRECTORY FOR AN ACCELERATOR

(71) Applicant: INTERNATIONAL BUSINESS MACHINES CORPORATION, Armonk, NY (US)

(72) Inventors: Bartholomew Blaner, Shelburne, VT (US); Jeffrey A. Stuecheli, Austin, TX (US); Michael S. Siegel, Raleigh, NC (US); William J. Starke, Round Rock, TX (US); Curtis C. Wollbrink, Rochester, MN (US); Kenneth M. Valk, Rochester, MN (US); Lakshminarayana Arimilli, Austin, TX (US); John D. Irish, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/395,976

(22) Filed: Apr. 26, 2019

(65) Prior Publication Data
US 2019/0332549 A1  Oct. 31, 2019

Related U.S. Application Data

(60) Provisional application No. 62/664,135, filed on Apr. 28, 2018.

(51) Int. Cl.
G06F 12/10 (2016.01)
G06F 13/16 (2006.01)
(Continued)

(52) U.S. Cl.
CPC ............ G06F 12/10 (2013.01); G06F 3/061 (2013.01); G06F 9/3877 (2013.01);
(Continued)

(58) Field of Classification Search
CPC ................ G06F 12/10; G06F 3/061
(Continued)

(56) References Cited

U.S. PATENT DOCUMENTS 4,441,155 A  4/1984 Fletcher et al.
4,763,244 A  8/1988 Moyer et al.
(Continued)

FOREIGN PATENT DOCUMENTS

CA  1301354    9/1988
CN  1260656 C  6/2006
(Continued)

OTHER PUBLICATIONS

Jacob et al. "Software-Managed Address Translation", Copyright © 1997 IEEE. Reprinted from Proceedings of the Third international Symposium on High Performance Computer Architecture (HPCA). Feb. 1-5, 1997.
(Continued)

Primary Examiner — Jae U Yu
(74) Attorney, Agent, or Firm — David Quinn; Brian F. Russell

(57) ABSTRACT

An integrated circuit includes a first communication interface for communicatively coupling the integrated circuit with a coherent data processing system, a second communication interface for communicatively coupling the integrated circuit with an accelerator unit including an effective address-based accelerator cache for buffering copies of data from a system memory, and a real address-based directory inclusive of contents of the accelerator cache. The real address-based directory assigns entries based on real
(Continued)

addresses utilized to identify storage locations in the system memory. The integrated circuit further includes directory control logic that configures at least a number of congruence classes utilized in the real address-based directory based on configuration parameters specified on behalf of or by the accelerator unit.

20 Claims, 32 Drawing Sheets

(51) Int. Cl.
G06F 9/38 (2018.01)
G06F 12/0817 (2016.01)
G06F 12/1027 (2016.01)
G06F 12/1045 (2016.01)
G06F 3/06 (2006.01)
G06F 13/28 (2006.01)
G06F 9/455 (2018.01)

(52) U.S. Cl.
CPC ...... *G06F 12/0822* (2013.01); *G06F 12/1027* (2013.01); *G06F 12/1045* (2013.01); *G06F 13/1668* (2013.01); *G06F 13/28* (2013.01); *G06F 9/45533* (2013.01); *G06F 2212/608* (2013.01); *G06F 2212/657* (2013.01)

(58) Field of Classification Search
USPC ........................................................ 711/206
See application file for complete search history.

(56) References Cited

U.S. PATENT DOCUMENTS

| | | | |
|---|---|---|---|
| 5,860,138 A | 1/1999 | Engebretsen et al. | |
| 6,138,209 A | 10/2000 | Krolak et al. | |
| 6,412,043 B1 | 6/2002 | Chopra et al. | |
| 6,466,825 B1 * | 10/2002 | Wang ................. | G06F 12/0822 700/5 |
| 6,591,340 B2 | 7/2003 | Chopra et al. | |
| 6,606,686 B1 | 8/2003 | Agarwala et al. | |
| 8,301,836 B2 | 10/2012 | Ledford | |
| 8,949,572 B2 | 2/2015 | Kurosawa et al. | |
| 9,208,095 B2 | 12/2015 | Pesavento et al. | |
| 9,658,940 B2 | 5/2017 | Chen et al. | |
| 9,715,470 B1 | 7/2017 | Adar et al. | |
| 9,740,629 B2 | 8/2017 | Blaner et al. | |
| 10,216,653 B2 | 2/2019 | Arimilli et al. | |
| 2002/0078304 A1 * | 6/2002 | Masri .................... | G06F 12/082 711/134 |
| 2002/0191647 A1 * | 12/2002 | Hyakutake ............. | H04N 7/088 370/535 |
| 2007/0101044 A1 | 5/2007 | Sudheer | |
| 2008/0005546 A1 | 1/2008 | Wang et al. | |
| 2009/0006756 A1 | 1/2009 | Donley | |
| 2014/0164731 A1 | 6/2014 | Muff et al. | |
| 2015/0310580 A1 | 10/2015 | Kumar | |
| 2017/0109281 A1 | 4/2017 | Weissmann et al. | |
| 2018/0095921 A1 | 4/2018 | Lambrecht et al. | |
| 2018/0150396 A1 | 5/2018 | Adar et al. | |
| 2018/0315158 A1 | 11/2018 | Nurvitadhi et al. | |
| 2019/0065379 A1 | 2/2019 | Guthrie et al. | |

FOREIGN PATENT DOCUMENTS

| | | |
|---|---|---|
| CN | 103827839 | 5/2014 |
| EP | 0549508 A1 | 6/1993 |
| EP | 0767424 B1 | 4/2002 |
| WO | 0161501 A1 | 8/2001 |
| WO | 2016097795 A9 | 6/2016 |

OTHER PUBLICATIONS

Allison; Brian, OpenPOWER, "Introduction to the OpenCAPI Interface", OpenCAPI Technology and Enablement, RAI Centre I Amsterdam, Oct. 3-4, 2018.
Benton; Brad, OpenFabrics Alliance, 13th Annual Workshop 2017 "CCIX, GEN-Z, OpenCAPI: Overview & Comparison", Mar. 2017.
Slota; Myron, OpenCAPI Technology: OpenCAPI Consortium, MGM Grand Las Vegas, Mar. 19, 2018.

* cited by examiner

| A_RC # 1302 1310 | Type 1304 (Read/CO) | EA 1306 | A_CO host tag 1308 | HTV |
|---|---|---|---|---|

| A_RC # 1402 1410 | Type 1404 (RWITM/CO) | EA 1406 | A_CO host tag 1408 | HTV |
|---|---|---|---|---|

| A_CO # 1502 | Type 1504 (Castout) | Host tag 1506 | Data 1508 | DV 1510 |
|---|---|---|---|---|

| A_RC # 1602 EA 1606 | Type 1604 (Claim) |
|---|---|

| A_RC # 1702 EA 1706 | Type 1704 (Kill) |
|---|---|

1800 → | A_RC # 1802 | Type 1804 (Read resp) | Data 1806 | State 1808 | Result 1810 | Host tag 1812 |

*Figure 19*

1900 → | A_RC # 1902 1910 | Type 1904 (RWITM resp) | Data 1906 | Result 1908 | Host tag |

*Figure 20*

2000 → | A_CO # 2002 2006 | Type 2004 (CO dispatch resp) | Result |

*Figure 21*

2100 → | A_RC # 2102 | Type 2104 (Claim resp) | Result 2106 |

*Figure 22*

2200 → | A_RC # 2202 | Type 2204 (Kill resp) | Result 2206 |

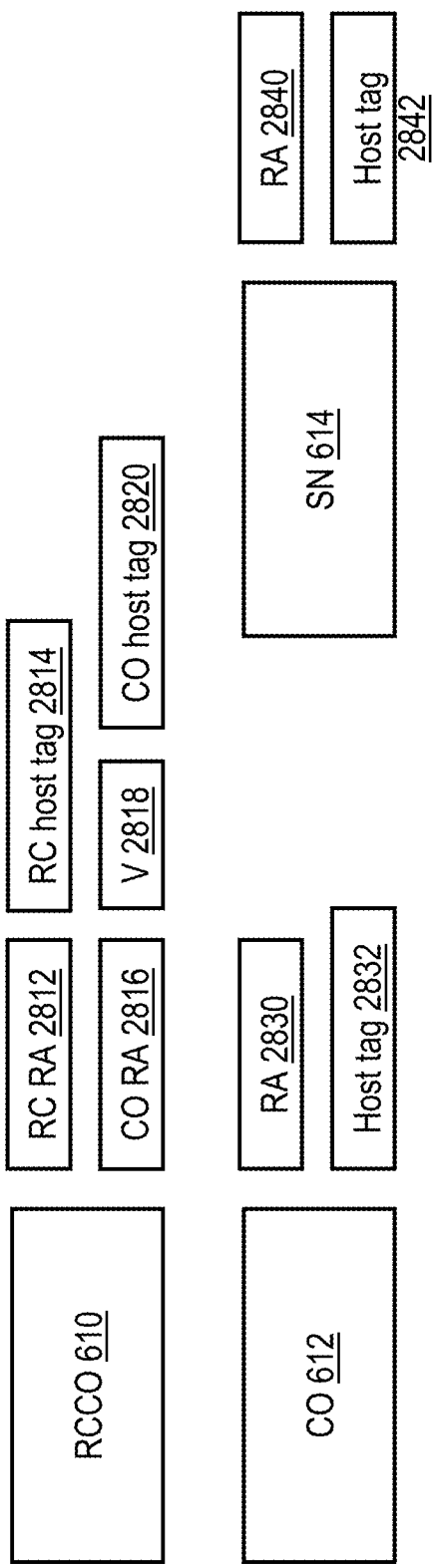
*Figure 28*
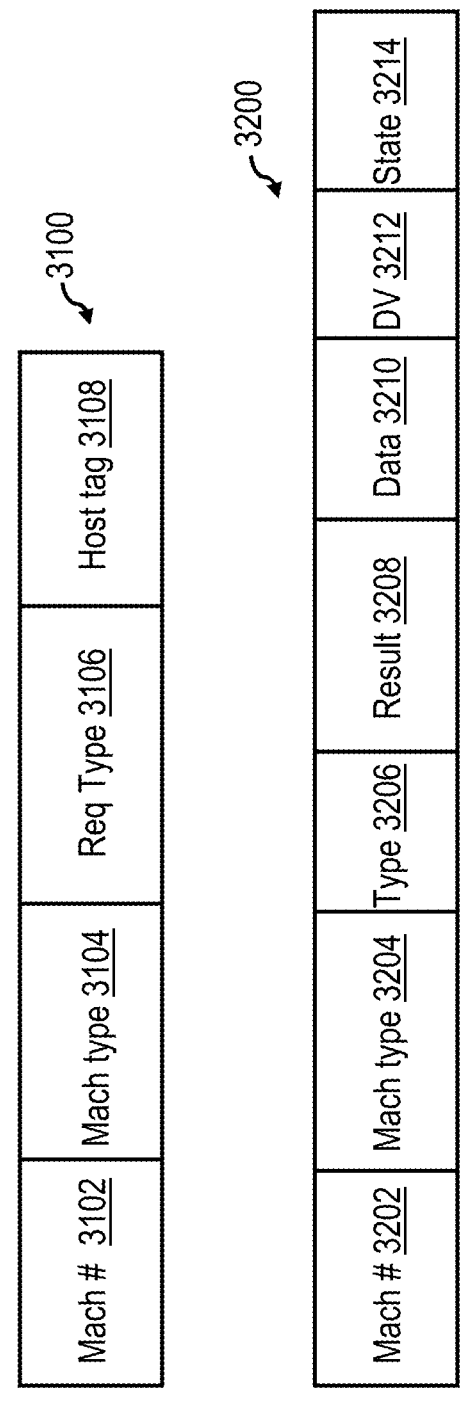
*Figure 31*
*Figure 32*

*Figure 43*

*Figure 44*

INTEGRATED CIRCUIT AND DATA PROCESSING SYSTEM HAVING A CONFIGURABLE CACHE DIRECTORY FOR AN ACCELERATOR

BACKGROUND OF THE INVENTION

The present invention relates to data processing and, and more specifically, to an integrated circuit and data processing system having a configurable cache directory for an accelerator.

As computing enters the post-Moore's Law era, the traditional boundary between central processing unit (CPU) and input/output (I/O) devices is being disrupted. Computational demands for emerging workloads such as cognitive computing (i.e., artificial intelligence) have forced the introduction of heterogeneous systems that combine traditional CPUs with throughput-centric compute accelerators. For example, the highly parallel architecture of graphics processors has been adapted for general-purpose highly parallel computing. This greater computational demand has also forced dramatic changes in what is defined as storage. Emerging technologies are creating memory devices that fill the gaps between storage and main memory. The first attempts to integrate these technologies have used traditional I/O attach strategies such as PCI Express (PCIe), which has resulted in suboptimal solutions with bandwidth bottlenecks and high-latency hardware built on software models incapable of adequately handling the communication demands.

BRIEF SUMMARY

In at least one embodiment, an accelerator unit is coupled to a coherent data processing system via host attach logic, which may be realized as an integrated circuit. The accelerator includes a cache having an associated directory in the host attach logic. Given its inherent understanding of how data will be processed in the accelerator, the accelerator may have a preferred organization for the directory in the host attach logic, for example, to reduce thrashing in the directory. In accordance with at least some embodiments, the accelerator indicates the preferred organization utilizing one or more configuration parameters, which can be utilized to configure the directory of the host attach logic.

In at least one embodiment, an integrated circuit includes a first communication interface for communicatively coupling the integrated circuit with a coherent data processing system, a second communication interface for communicatively coupling the integrated circuit with an accelerator unit including an effective address-based accelerator cache for buffering copies of data from a system memory, and a real address-based directory inclusive of contents of the accelerator cache. The real address-based directory assigns entries based on real addresses utilized to identify storage locations in the system memory. The integrated circuit further includes directory control logic that configures at least a number of congruence classes utilized in the real address-based directory based on configuration parameters specified on behalf of or by the accelerator unit.

BRIEF DESCRIPTION OF THE SEVERAL VIEWS OF THE DRAWINGS

FIG. 7 is an exemplary embodiment of a real-address (RA) based directory in the host attach logic of FIG. 6;

FIG. 8 depicts an exemplary embodiment of an entry in the RA-based directory of FIG. 7;

FIGS. 13-17 respectively illustrate exemplary Read/castout, read-with-intent-to-modify (RWITM)/castout, Castout (CO), Claim, and Kill requests of an AU in accordance with one embodiment;

FIGS. 18-22 respectively depict exemplary Read, RWITM, Castout dispatch, Claim, and Kill responses of host attach logic to an AU in accordance with one embodiment;

FIG. 28 depicts various state machines and associated data within the host attach logic of FIG. 6;

FIG. 31 illustrates a host request transmitted by the host attach logic to the AU in accordance with one embodiment;

FIG. 32 depicts a host request response transmitted by the AU to the host attach logic in accordance with one embodiment;

FIGS. 43-45 are illustrative views of the real-address (RA) based directory in the host attach logic, which depict some of the various alternative cache configurations that can be supported in an exemplary system.

DETAILED DESCRIPTION

The present disclosure discloses embodiments of a data processing system supporting address aliasing in an effective address-based cache. As utilized herein, an "alias" or "synonym" is defined to mean one of multiple different effective addresses allocated to one process that map to the same real address or one of multiple effective addresses (whether the same or different) that map to the same real address and that are allocated to two or more processes.

Figure 1:
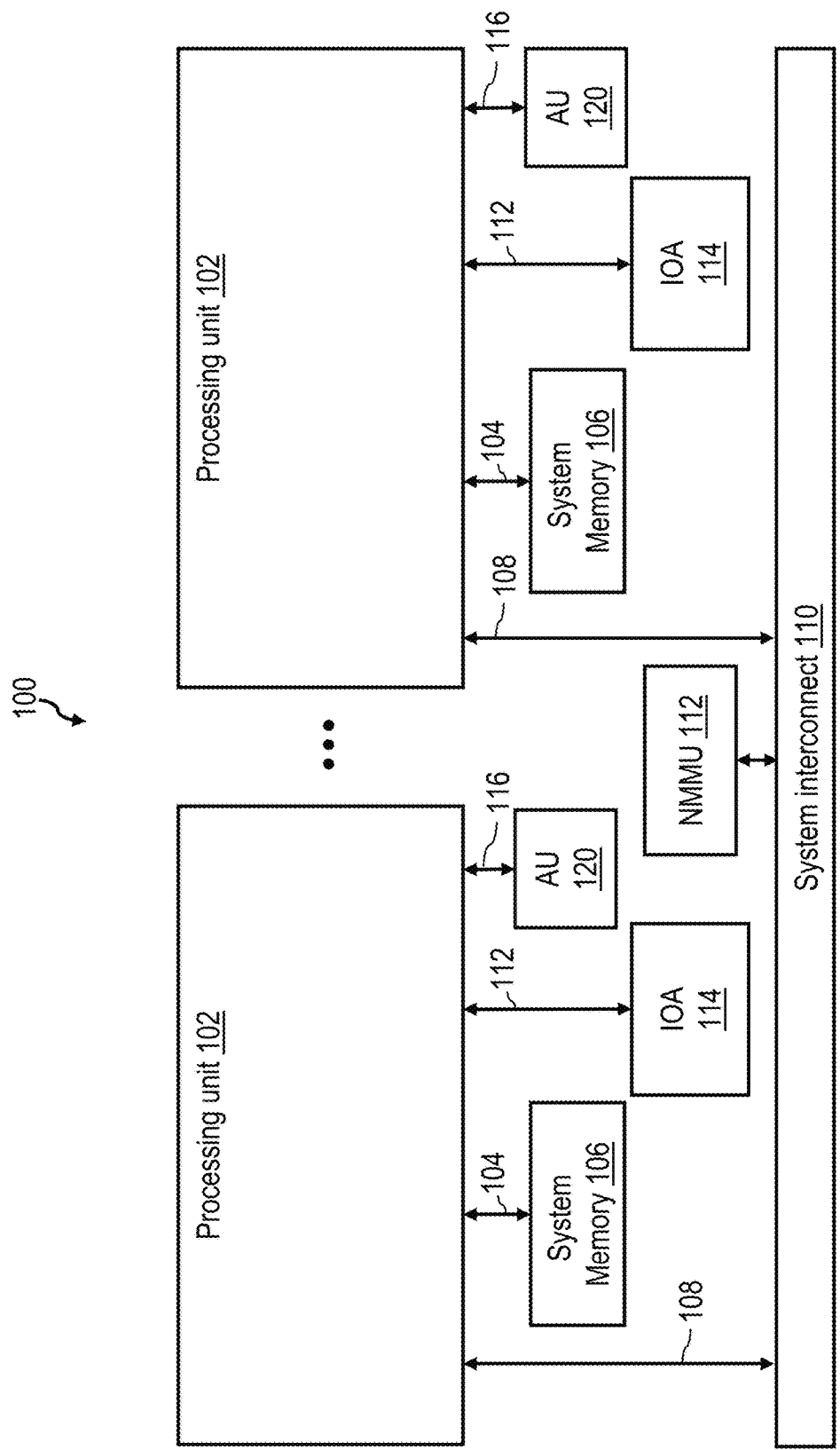
FIG. 1 is a high-level block diagram of an exemplary coherent data processing system in accordance with one embodiment.

With reference now to the figures and with particular reference to FIG. 1, there is illustrated a high-level block diagram of an exemplary data processing system 100 in accordance with one embodiment. Data processing system 100 may be implemented, for example, with an IBM POWER® server, a product line of International Business Machines Corporation of Armonk, N.Y.

In the depicted embodiment, data processing system 100 is a distributed shared memory multiprocessor (MP) data processing system including a plurality of processing units 102, which can each be implemented as a respective integrated circuit. Each of processing units 102 is coupled by a memory bus 104 to a respective one of shared system memories 106, the contents of which may generally be accessed by any of processing units 102 utilizing real addresses within a real address space. System memories 106 may be implemented with volatile (e.g., dynamic random access memory (DRAM)) and/or non-volatile memory (e.g., non-volatile random access memory (NVRAM), flash memory, or static random access memory (SRAM)). Processing units 102 are further coupled via an interconnect interface 108 to a system interconnect 110, which may include one or more bused, switched and/or wireless communication links. Communication on system interconnect 110 includes, for example, memory access requests by processing units 102 and other coherence participants requesting coherent access to various memory blocks within various shared system memories 106 or cached within data processing system 100. Also coupled to system interconnect 110 is a nest memory management unit (NMMU) 112, which provides effective (virtual)-to-real address translation services to requesting devices.

As further shown in FIG. 1, one or more of processing units 102 are further coupled via one or more input/output (IO) communication links 112 to one or more IO adapters (IOAs) 114 providing expanded connectivity. For example, in at least some embodiments, an IO communication link 112 can include a PCIe (Peripheral Component Interconnect Express) bus, hub, and/or switch, and an IOA 114 can be a network adapter, storage device controller, display adapter, or peripheral adapter, etc.

In addition, one or more of processing units 102 may be coupled by an accelerator interface 116 to an accelerator unit 120, as described further below. As utilized herein, the term "accelerator" is defined to refer to a computational device specifically configured to perform one or more computational, data flow, data storage, and/or functional tasks (as compared with a general-purpose CPU, which is designed to handle a wide variety of different computational tasks). Accelerator units 120 can be implemented, for example, as an integrated circuit including programmable logic (e.g., programmable logic array (PLA) or field programmable gate array (FPGA)) and/or custom integrated circuitry (e.g., application-specific integrated circuit (ASIC)). An accelerator unit 120 can be utilized, for example, to provide hardware acceleration of specialized computations (e.g., encryption, compression/decompression, encoding, database searches, packet inspection, etc.), to implement memory/storage, and/or to provide high-performance IO.

Those of ordinary skill in the art will appreciate that the architecture and specific components of a data processing system 100 can vary between embodiments. For example, other devices and interconnects may alternatively or additionally be used. Accordingly, the exemplary data processing system 100 given in FIG. 1 is not meant to imply architectural limitations with respect to the claimed invention.

Figure 2:
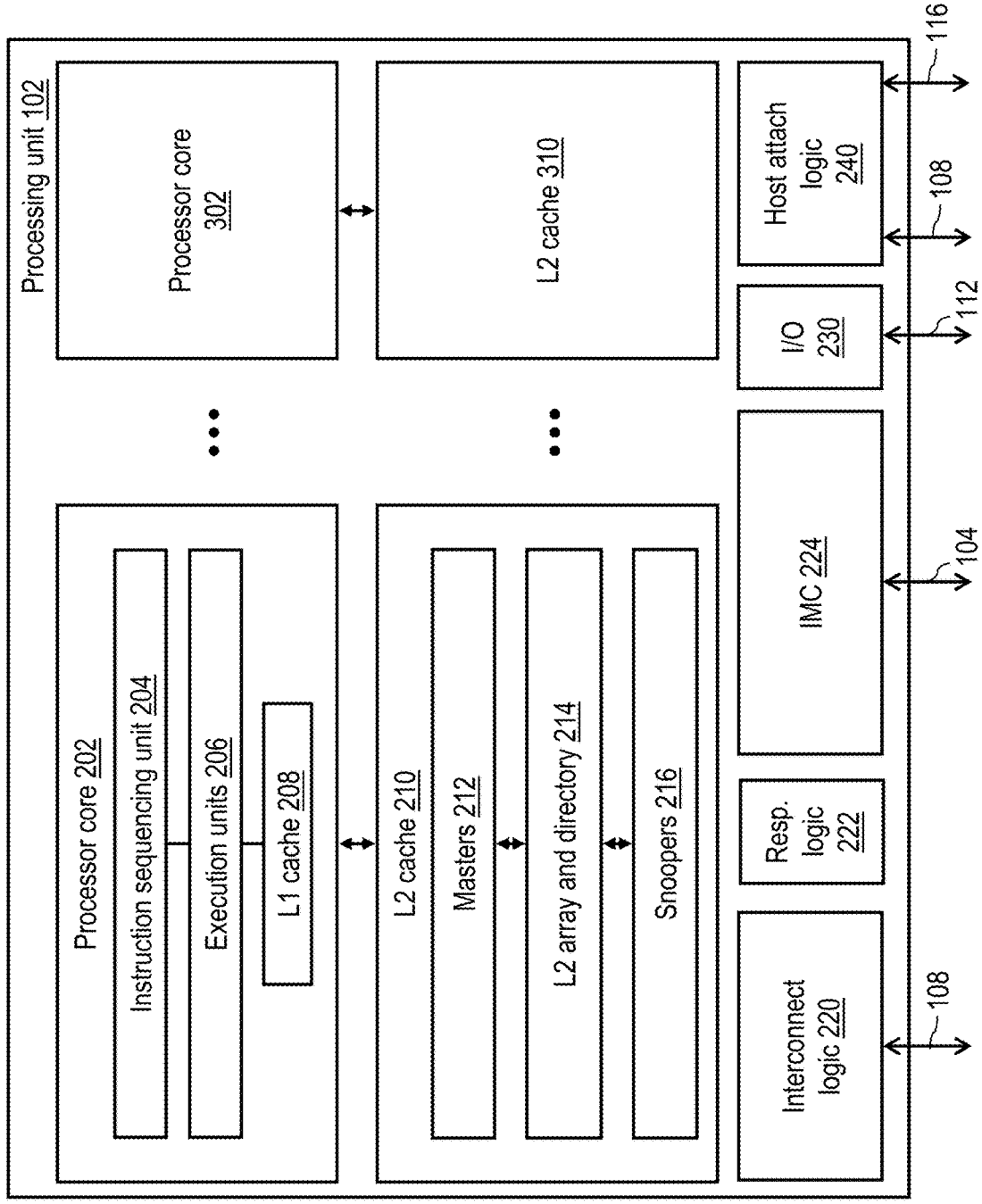
FIG. 2 is a more detailed block diagram of an exemplary embodiment of a processing unit in the data processing system of FIG. 1.

Referring now to FIG. 2, there is depicted a more detailed block diagram of a processing unit 102 of data processing system 100 of FIG. 1. In the depicted embodiment, each processing unit 102 is preferably realized as a single integrated circuit chip having a substrate in which semiconductor circuitry is fabricated as is known in the art.

Each processing unit 102 includes multiple processor cores 202 for independently processing instructions and data. Each processor core 202 includes at least an instruction sequencing unit (ISU) 204 for fetching and ordering instructions for execution and one or more execution units 206 for executing instructions. The instructions executed by execution units 206 may include, for example, fixed- and floating-point arithmetic instructions, logical instructions, and memory access instructions that request read and/or write access to a memory block in the coherent address space of data processing system 100.

The operation of each processor core 102 is supported by a multi-level volatile memory hierarchy having at its lowest level one or more shared system memories 106 and, at its upper levels, one or more levels of cache memory. As depicted, processing unit 102 includes an integrated memory controller (IMC) 224 that controls read and write access to an associated system memory 106 in response to requests received from processor cores 202 and requests received on system interconnect 110 via interconnect interface 108.

In the illustrative embodiment, the cache memory hierarchy of processing unit 102 includes a store-through level one (L1) cache 208 within each processor core 202 and a store-in level two (L2) cache 210. As shown, L2 cache 210 includes an L2 array and directory 214, masters 212 and snoopers 216. Masters 212 initiate operations on system interconnect 110 and access L2 array and directory 214 in response to memory access (and other) requests received from the associated processor cores 202. Snoopers 216 detect operations on system interconnect 110, provide appropriate responses, and perform any accesses to L2 array and directory 214 required by the operations. Although the illustrated cache hierarchy includes only two levels of cache, those skilled in the art will appreciate that alternative embodiments may include additional levels (L3, L4, etc.) of private or shared, on-chip or off-chip, in-line or lookaside cache, which may be fully inclusive, partially inclusive, or non-inclusive of the contents the upper levels of cache.

As further shown in FIG. 2, processing unit 102 includes integrated interconnect logic 220 by which processing unit 102 is coupled to system interconnect 110, as well as an instance of response logic 222, which in embodiments employing snoop-based coherency, implements a portion of a distributed coherency messaging mechanism that maintains coherency among the cache hierarchies of the various processing units 102. In the following description, it will be assumed that each memory access request issued on system interconnect 110 has an associated coherency message that provides a systemwide coherence response to the memory access request. The systemwide coherence response may indicate, among other things, whether the associated memory access request succeeded or failed, a data source for requested data, and/or coherence state updates to be made by various coherence participants. Processing unit 102 further includes one or more integrated I/O (input/output) controllers 230 supporting I/O communication via one or more IO communication links 112.

Processing unit 102 additionally includes host attach logic 240, which is coupled to system interconnect 110 via interconnect interface 108 and is additionally coupled to accelerator unit 120 via accelerator interface 116. As discussed in greater detail below with reference to FIG. 6, host attach logic 240 includes circuitry to securely and efficiently interface processing unit 102 with an accelerator unit 120, which may be heterogeneous with respect to processing unit 102 in terms of the circuitry, clock rate, functionality, and/or security. In one or more embodiments, it may be desirable from a security, cost, and/or latency standpoint for accelerator unit 120 to not directly issue memory access requests or participate in the determination of systemwide coherency responses for memory access requests on system interconnect 110. Accordingly, host attach logic 240 may issue memory access requests and participate in coherency messaging on behalf of accelerator unit 120. Further host attach logic 240 may secure the coherent address space of data processing system 100 in part by shielding the associated accelerator unit 120 from direct knowledge of the real address space employed to address system memories 106, making accelerator unit 120 "agnostic" of real addresses.

Those skilled in the art will appreciate that data processing unit 102 can include many additional or alternative components. Because such additional or alternative components are not necessary for an understanding of the present invention, they are not illustrated in FIG. 2 or discussed further herein.

Figure 3:
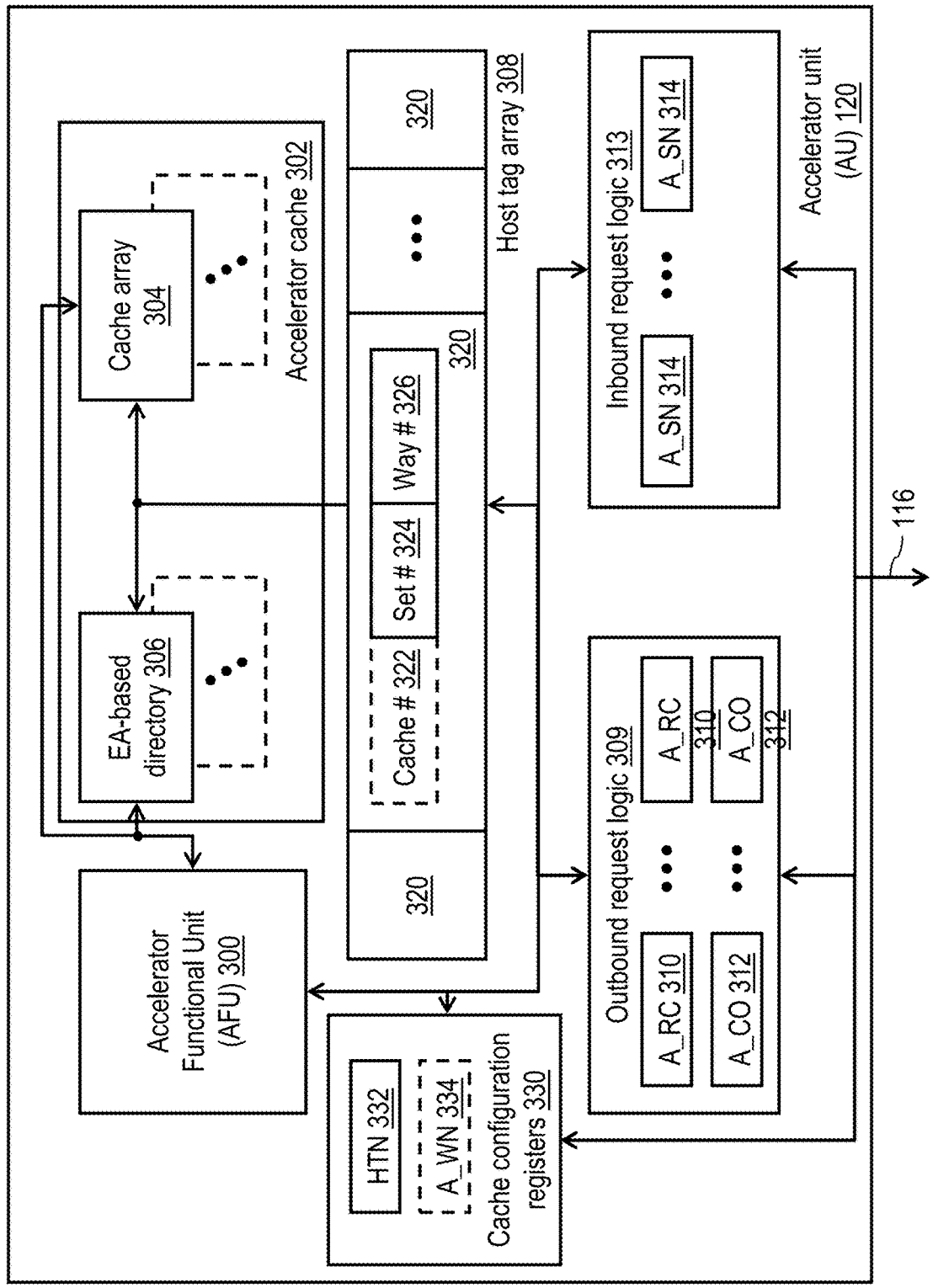
FIG. 3 is a more detailed block diagram of an exemplary embodiment of an accelerator unit (AU) in the data processing system of FIG. 1.

With reference now to FIG. 3, there is illustrated an exemplary accelerator unit 120 in accordance with one embodiment. Accelerator unit 120 is preferably realized as a single integrated circuit chip having a substrate in which semiconductor circuitry is fabricated as is known in the art.

In the depicted embodiment, accelerator unit 120 includes at least one accelerator functional unit (AFU) 300 including circuitry for implementing a function (or one of the functions) of accelerator unit 120. In various embodiments, the function(s) can be implemented entirely in hardware or in a combination of hardware and software or firmware. Additionally, as noted above, in some embodiments, AFU 300 can be implemented in programmable logic (e.g., an FPGA or PLA) so that the functionality of AFU 300 is programmable and can thus change in response to software execution and/or dynamic system operating conditions.

Data generated, accessed, and/or transmitted by AFU 300 is buffered in an accelerator cache 302 coupled to AFU 300. Accelerator cache 302 includes at least one cache array 304 and, optionally, multiple cache arrays 304. In a typical implementation, each cache array 304 is organized as a set-associative array including a plurality of congruence classes each containing an equal number of ways or entries for storing cache lines. For example, it is typical for a set-associative cache to be organized as a 2-way, 4-way, 8-way, or 16-way associative cache in which each congruence class contains the same number of entries all associated with a common value of mid-order address bits. In cases in which accelerator cache 302 includes multiple cache arrays 304, AFU 300 can assign particular data to particular cache arrays 304 based, for example, on data type among other criteria. Further, in at least some embodiments, the organization of individual cache arrays 304 and/or the number of cache arrays 304 can be configurable by AFU 300.

Figure 4:
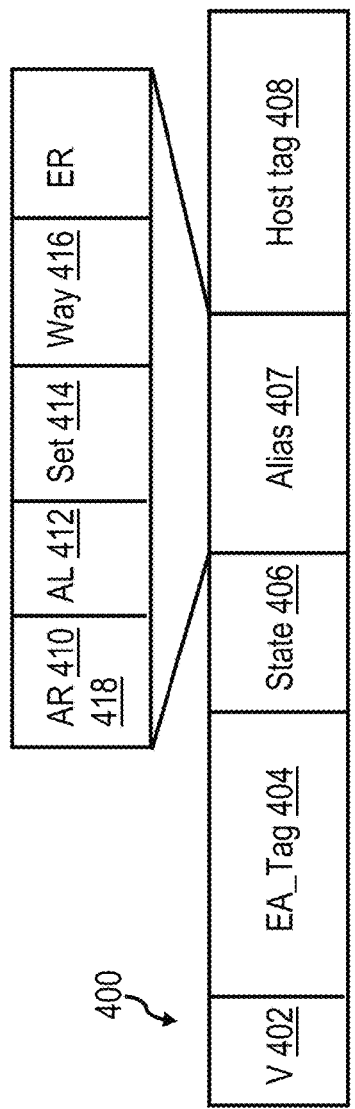
FIG. 4 is an exemplary embodiment of an entry in the effective address (EA)-based directory in the AU of FIG. 3.

The contents of each cache array 304 are recorded in a respective associated effective address (EA)-based directory 306. As implied by the nomenclature, each EA-based directory 306 tracks data stored within the associated cache array 304 utilizing tags (e.g., upper order bits) of effective addresses rather than real memory addresses employed by IMCs 224. FIG. 4 depicts an exemplary cache entry 400 in an EA-based directory 306 utilized to record information related to a corresponding way of the associated cache array 304. In this example, directory entry 400 includes a valid field 402 for indicating whether or not the other contents of directory entry 400 are valid, an EA tag field 404 for identifying by the higher order EA bits which cache line is stored in the corresponding way of cache array 304, a state field 406 for indicating a coherence state (e.g., modified, shared owner, shared, or invalid) of the associated cache line, if any, held in cache array 304, an alias field 407 for storing information, if applicable, about multiple concurrent entries 400 having different EAs mapped to a common real address (RA), and a host tag field 408 for buffering a host tag (as described further below) temporarily associated with the way of the cache array 304.

As further illustrated in FIG. 4, in at least one embodiment, alias field 407 of directory entry 400 includes an alias root (AR) field 410 indicating whether or not this directory entry 400 is an alias root entry, that is, the first directory entry 400 established in EA-based directory 306 among all the concurrent alias entries 400 having EAs that map to a common RA. Alias field 407 additionally includes an alias leaf (AL) field 412 indicating whether the entry 400 is an alias entry, but not the alias root entry. In at least one embodiment, AR field 410 and AL field 412 are mutually exclusive, meaning that a directory entry 400 can be designated as an alias root entry or an alias leaf entry or neither, but not both. If directory entry 400 is identified as an alias leaf entry by AL field 412, set field 414 and way field 416 can be utilized to identify the related alias root entry 400 in EA-based directory 306. If directory entry 400 is identified as an alias root entry by AR field 410, evict root (ER) field 418 additionally indicates whether or not the cache line associated with directory entry 400 is required to be written back upon eviction (regardless of the coherence state indicated by state field 406 of the alias root entry). As a final note, in at least some embodiments, if AL field 412 is set (e.g., to '1') to identify a directory entry 400 as an alias leaf entry, state field 406 is interpreted as indicating either read-only (R) permission for the associated cache line held at the alias root or both read and write (RW) permission for the associated cache line.

Referring again to FIG. 3, accelerator unit 120 additionally includes a host tag array 308 coupled to accelerator cache 302 and AFU 300. Host tag array 308, which in some embodiments is configurable in size by AFU 300, includes a plurality of entries 320 each identifying a particular cache entry and associated directory entry in accelerator cache 302. For example, in one embodiment, each entry 320 in host tag array 300 stores a tuple including a set number 324 specifying a particular congruence class, a way number 326 specifying a particular entry within the congruence class, and, if more than one cache array 304 is implemented, a cache number 322 identifying a particular cache array 304 and EA-based directory 306. Each entry 320 in host tag array 300 is accessed by a unique corresponding host tag employed by host attach logic 240, as discussed further below. Host tag array 308 thus provides a mapping between host tags utilized by host attach logic 240 to identify cache lines and particular storage locations for those cache lines within accelerator cache 302.

To support the configurability of an associated real address (RA)-based directory 600 of the contents of accelerator cache 302 that resides in host attach logic 240 (see, e.g., FIG. 6 described below), accelerator unit 120 preferably allocates internal or external storage for cache configuration parameters defining a desired configuration of RA-based directory 600. Although in some embodiments, these cache configuration parameters can be stored, for example, in software-defined storage locations (e.g., in system memory 106), in the depicted embodiment accelerator unit 120 is equipped with a set of hardware cache configuration registers 330 for storing the cache configuration parameters. In the illustrated example, cache configuration registers 330 include at least a host tag number (HTN) register 332 for specifying a desired number of entries 320 to be utilized in host tag array 308. Cache configuration registers 330 optionally additionally include an accelerator way number (A_WN) register 334 for specifying a desired number of ways to be implemented in RA-based directory 600. AFU 300 can set cache configuration registers 330, for example, at initial system configuration or between processing workloads during system operation. In a preferred embodiment, the configuration of RA-based directory 600 is simplified by restricting the possible settings of cache configuration registers 330 to positive integer values N, which are interpreted as indicating $2^N$ host tags or ways. For example, HTN register 332 can be set to a value of 10 to indicate that the desired number of host tags to be utilized in host tag array 308 is 1024. This exponential interpretation of the values of cache configuration registers 330 allows cache configuration registers 330 to be kept small and advantageously constrains the indicated configuration parameters to positive integer powers of 2.

Accelerator unit 120 additionally includes outbound request logic 309 and inbound request logic 313, which include a number of state machines 310, 312, and 314 to handle various types of memory access requests. These state machines include accelerator read-claim (A_RC) machines 310, which are utilized to handle memory access requests initiated by AFU 300, accelerator castout (A_CO) machines 312, which are utilized to handle castout of cache lines from accelerator cache 302, and accelerator snoop (A_SN) machines 314, which are utilized to handle host requests received by accelerator unit 120 from host attach logic 240 via accelerator interface 116. In at least some embodiments, A_RC machines 310 and A_CO machines 312 are implemented in pairs that are jointly allocated to memory access requests of AFU 300.

Figure 5:
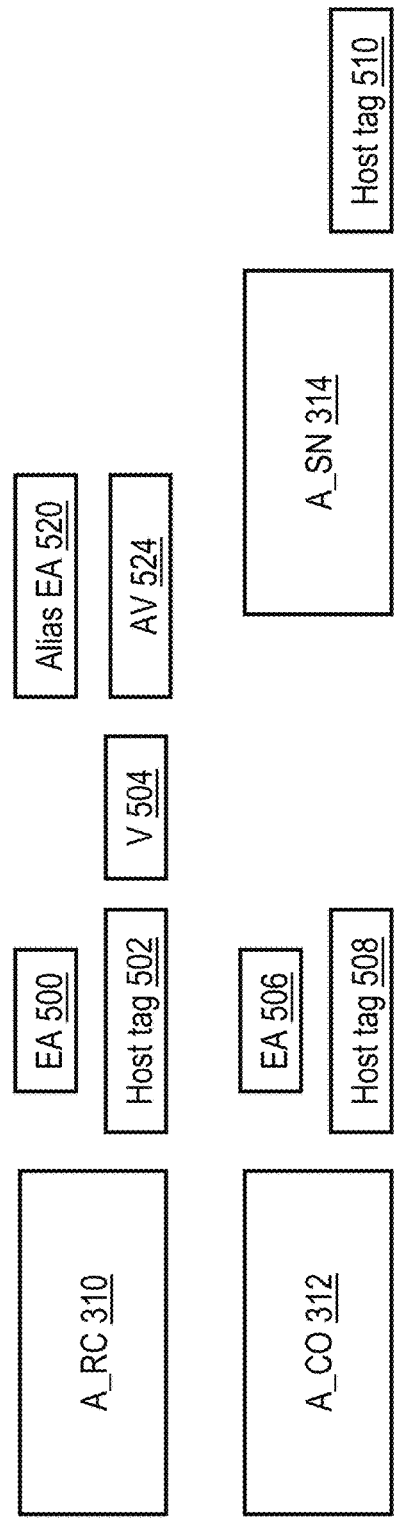
FIG. 5 illustrates various state machines and associated data within the AU of FIG. 3.

As indicated in FIG. 5, each of state machines 310, 312, and 314 can buffer associated request information related to a memory access request being handled by that state machine. For example, for an A_RC machine 310 this request information can include a request EA 500, as well as a host tag 502 having an associated valid field 504. In addition, to support aliasing in accelerator cache 302, the information buffered by an A_RC machine 310 can include an alias EA 520 having an associated alias valid (AV) field 524. For an A_CO machine 312, the request information can include an EA 506 and a host tag 508 as well as unillustrated information regarding a victim storage location (e.g., cache, set, and way) and coherence state. For an A_SN machine 314, the request information can include a host tag 510.

Figure 6:
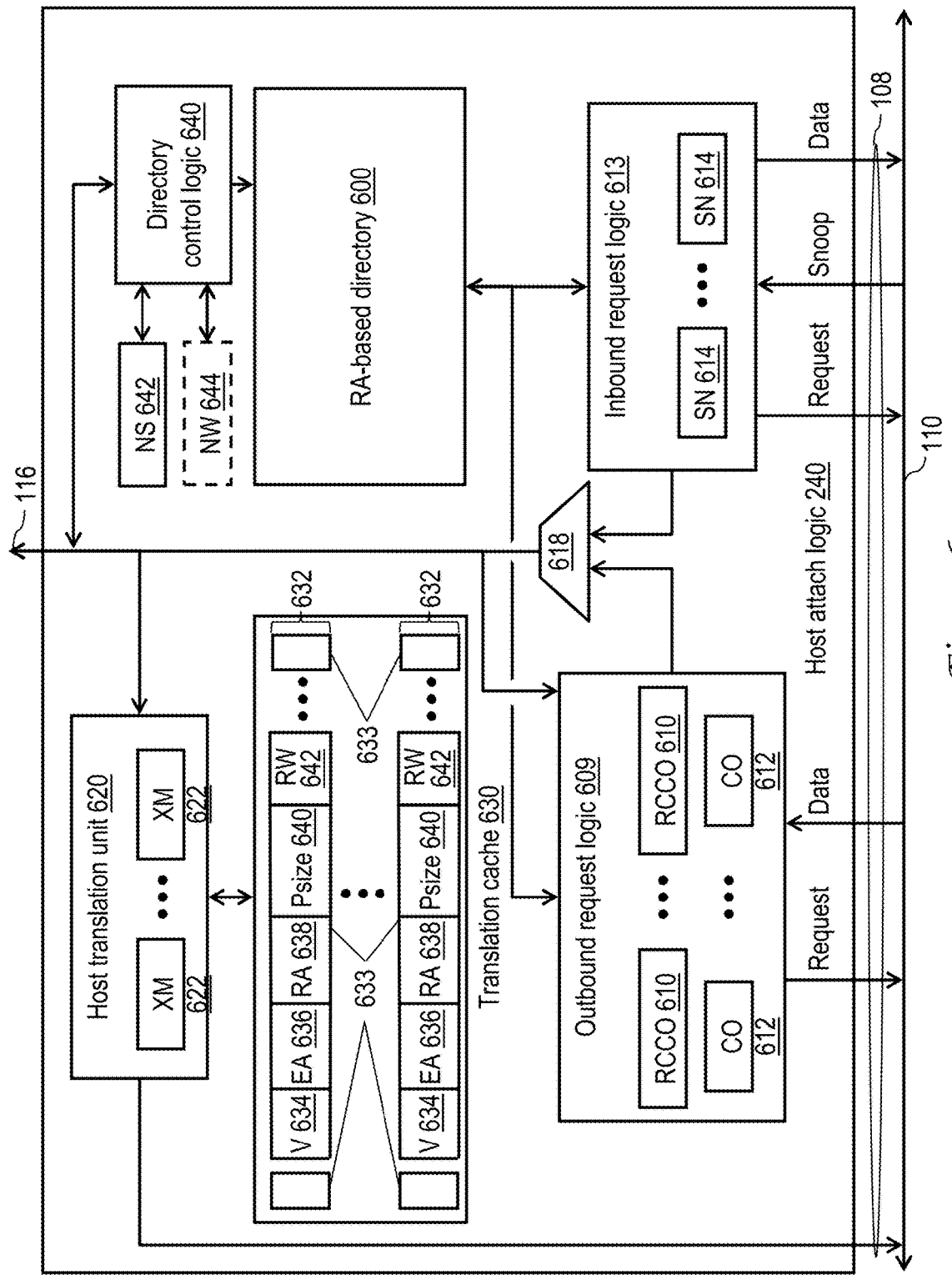
FIG. 6 is a block diagram of an exemplary embodiment of host attach logic in the processing unit of FIG. 2.

Referring now to FIG. 6, there is depicted a more detailed block diagram of an exemplary embodiment of host attach logic 240 in a processing unit 102 of FIG. 2. As shown, host attach logic 240 is coupled to interconnect interface 108 to permit host attach logic 240 to transmit and receive address, control and coherency communication via system interconnect 110 on behalf of (i.e., as a proxy for) accelerator unit 120 to which it is coupled by accelerator interface 116.

Host attach logic 240 includes a real address (RA)-based directory 600, a number of state machines 610, 612, and 614 for handling various types of memory access requests, a translation unit 620, and a translation cache 630. The state machines within host attach logic 240 include read-claim/castout (RCCO) machines 610, which are utilized to handle memory access requests and associated castout requests initiated by AFU 300 and received via accelerator interface 116, castout (CO) machines 612, which are utilized to handle castout of entries from RA-based directory 600, and snoop (SN) machines 614, which are utilized to handle memory access requests snooped by host attach logic 240 from system interconnect 110 via interconnect interface 108. Communication from the state machines to accelerator unit 120 is arbitrated by selection logic represented by multiplexer 618.

As indicated in FIG. 28, each of state machines 610, 612, and 614 can buffer associated request information related to a memory access request being handled by that state machine. For example, for a RCCO machine 610 this request information can include an RCCO RC RA 2812 indicating a real address of a target cache line of data, an RC host tag 2814 also identifying the target cache line of data, a RCCO CO RA 2816 for identifying the real address of a cache line of data to be castout from accelerator cache 302, a valid field 2818 for indicating whether RCCO CO RA 2816 is valid, and a CO host tag 2820 for also identifying the cache line to be castout. For a CO machine 612, the request information can include a CO RA 2830 indicating the real address of a cache line to be castout from RA-based directory 600 and a host tag 2832 also identifying the cache line to be castout from RA-based directory 600. For a SN machine 614, the request information can include a SN RA 2840 specified by a snooped memory access request received via system interconnect 110 and interconnect interface 108 and a host tag 2842 of the cache line associated with SN RA 2840.

Figures 7, 8:
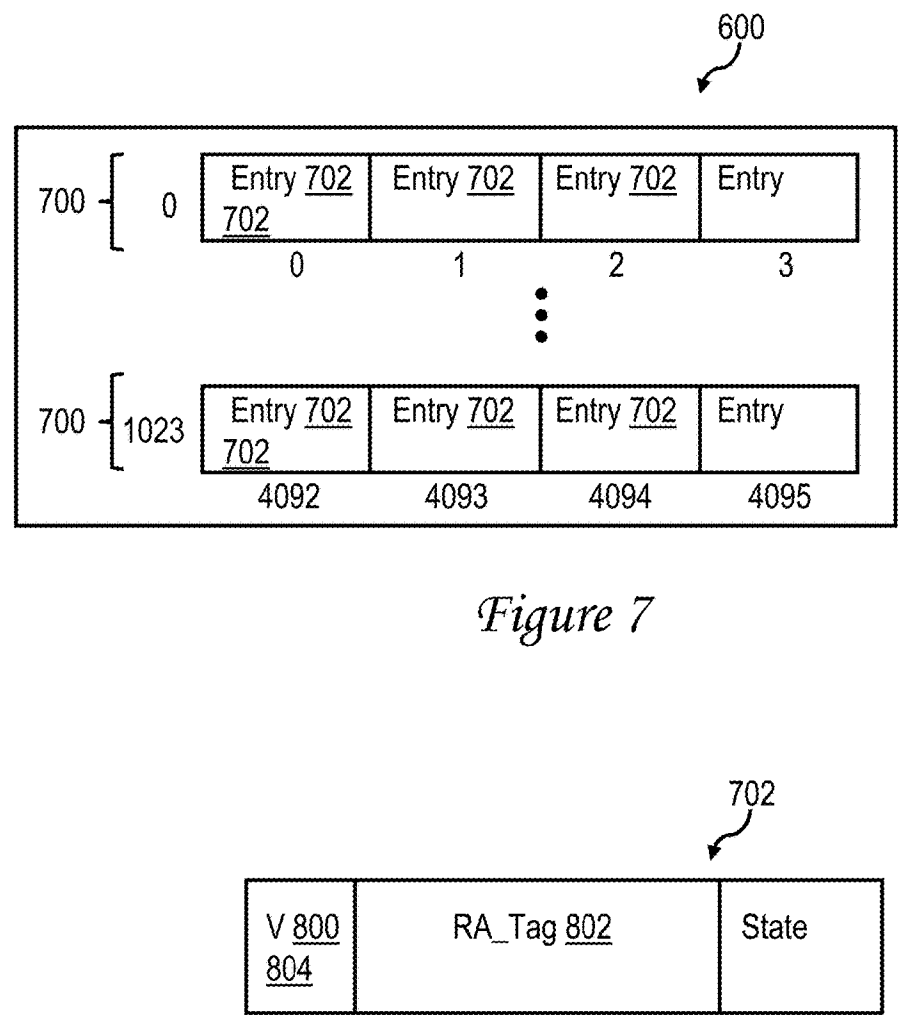

Returning to FIG. 6, RA-based directory 600 includes a plurality of entries for recording information regarding each cache line of data held in accelerator cache 302 of the associated accelerator unit 120. In at least some embodiments RA-based directory 600 has a set-associative organization including a plurality of congruence classes each including multiple entries. For example, in the exemplary four-way set-associative implementation illustrated in FIG. 7, RA-based directory 600 includes 1024 congruence classes 700 each including four entries (ways) 702 for a maximum number of 4096 entries 702. Of course, in other embodiments, the number of congruence classes and number of entries can vary, and as discussed below, can be made configurable. Regardless of the implemented size of RA-based directory 600, each of the entries in RA-based directory 600 is preferably uniquely identified, for example, by a congruence class and way number (e.g., (1023,1)) and/or by an absolute entry number (e.g., 4093). This unique identifier forms the host tag by which host attach logic 240 references entries in accelerator cache 302 via the mapping performed by host tag array 308. Notably, the host tag does not reference or include an effective address. As indicated in FIG. 8, each entry 702 in RA-based directory 600 preferably includes at least a valid field 800 for indicating whether or not the contents of the entry 702 are valid, an RA_tag field 802 for storing the high order bits of the RA of a cache line within accelerator cache 302, and a state field 804 for indicating the local coherence state of the cache line identified in RA_tag field 802.

In at least some embodiments, RA-based directory 600 can be configured by directory control logic 640 to correspond to a desired geometry. In the depicted example, host attach logic 240 includes at least a number-of-sets (NS) register 642 for specifying the number of congruence classes 700 to be used to support the accelerator cache 302 of the associated accelerator unit 120. Optionally, host attach logic 240 may additionally include a number-of-ways (NW) register 644 for specifying a number of ways 702 to be implemented in each of the implemented congruence classes 700. As with cache configuration registers 330 discussed above, the possible settings of registers 642 and 644 are preferably constrained to positive integer values N, which are interpreted as indicating $2^N$ sets or ways. Based on the settings of NS register 642 and NW register 644, directory control logic 640 can configure RA-based directory 600 with any desired number of congruence classes 700 and any desired number of ways 702 that are positive integer powers of 2 and that fit within the physically constrained maximum dimensions (i.e., number of sets and number of ways) of RA-based directory 600.

Referring again to FIG. 6, translation unit 620 includes multiple translation machines (XM) 622, which are state machines that can be dispatched by translation unit 620 to perform effective-to-real address translation for memory access requests initiated by accelerator unit 120. Translation machines 622 perform address translation, if possible, by reference to a translation cache 630, which buffers previously utilized EA-to-RA address translations. As depicted, in an exemplary embodiment, translation cache 630 includes multiple congruence classes 632, which each contain multiple translation entries 633 for storing effective-to-real address translations. The various congruence classes can be indexed, for example, by mid-order bits of the EA. In the depicted example, each entry 633 in translation cache 630 includes a valid field 634 for indicating whether or not the rest of the contents of that entry 632 are valid, an EA field 636 for storing an EA, and RA field 638 for storing the RA corresponding to the EA specified in EA field 636, a Psize field 640 for storing the page size of the effective address page containing the EA specified in EA field 636, and a read/write (RW) field 642 indicating read/write permissions for the effective address page. In one embodiment, which will hereafter be assumed, RW field 642 can be implemented as a single bit, which if set (e.g., to 1) indicates that both read and write accesses to the effective address page are permitted and if reset (e.g., to 0) indicates that only read access to the effective address page is permitted. In other embodiments, additional permissions (e.g., write-only access) can be implemented through the inclusion of additional bits. If a translation required by translation unit 620 is not available in translation cache 630, translation unit 620 can issue a request on system interconnect 110 for the translation. In at least some embodiments, such address translation requests are serviced by an address translation facility in data processing system 100, such as NMMU 112.

Figure 9:
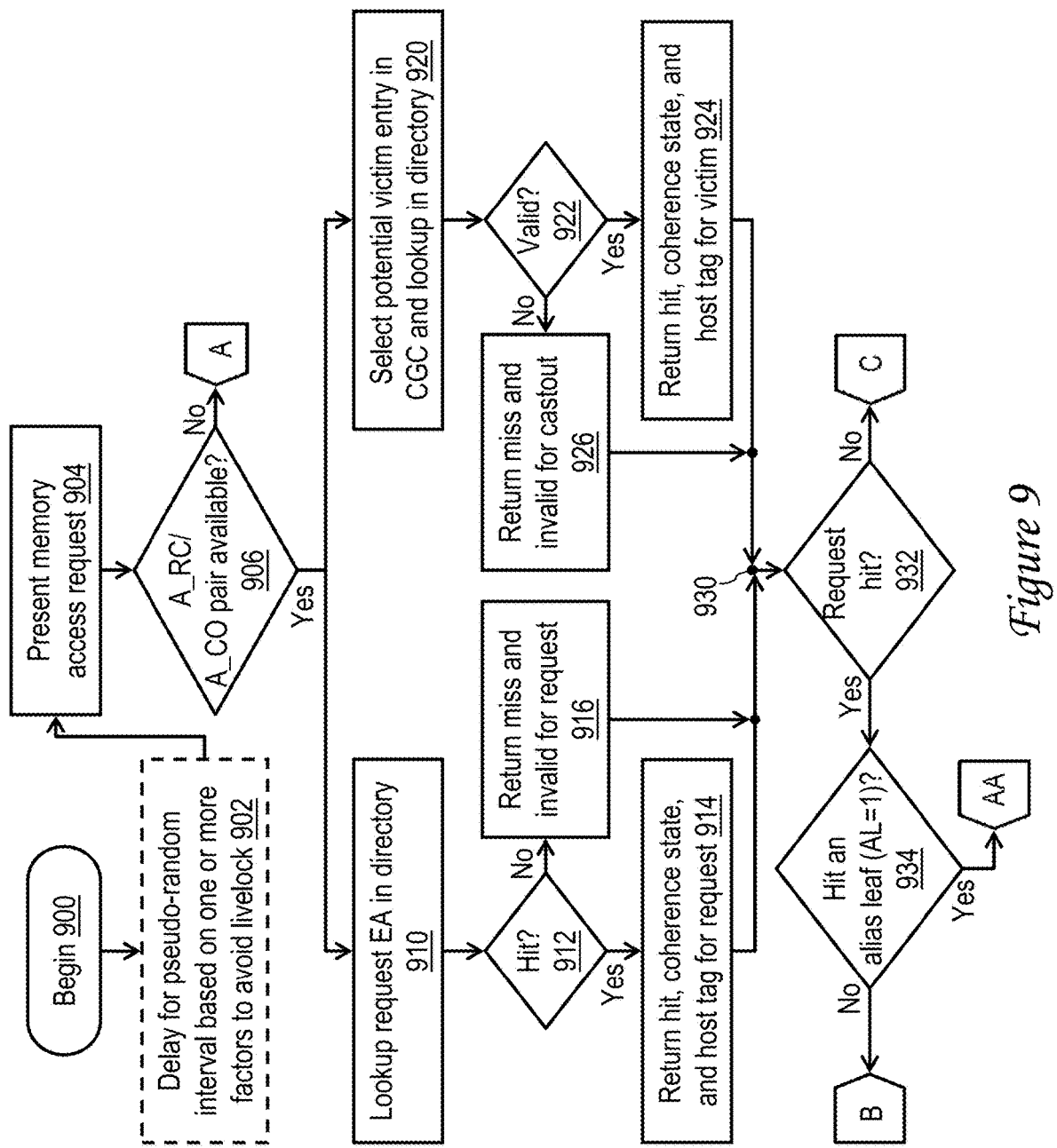
FIGS. 9-10 together form a high-level logical flowchart of an exemplary process for dispatching one or more state machines to service a request of an AU in accordance with one embodiment.
Figure 10:
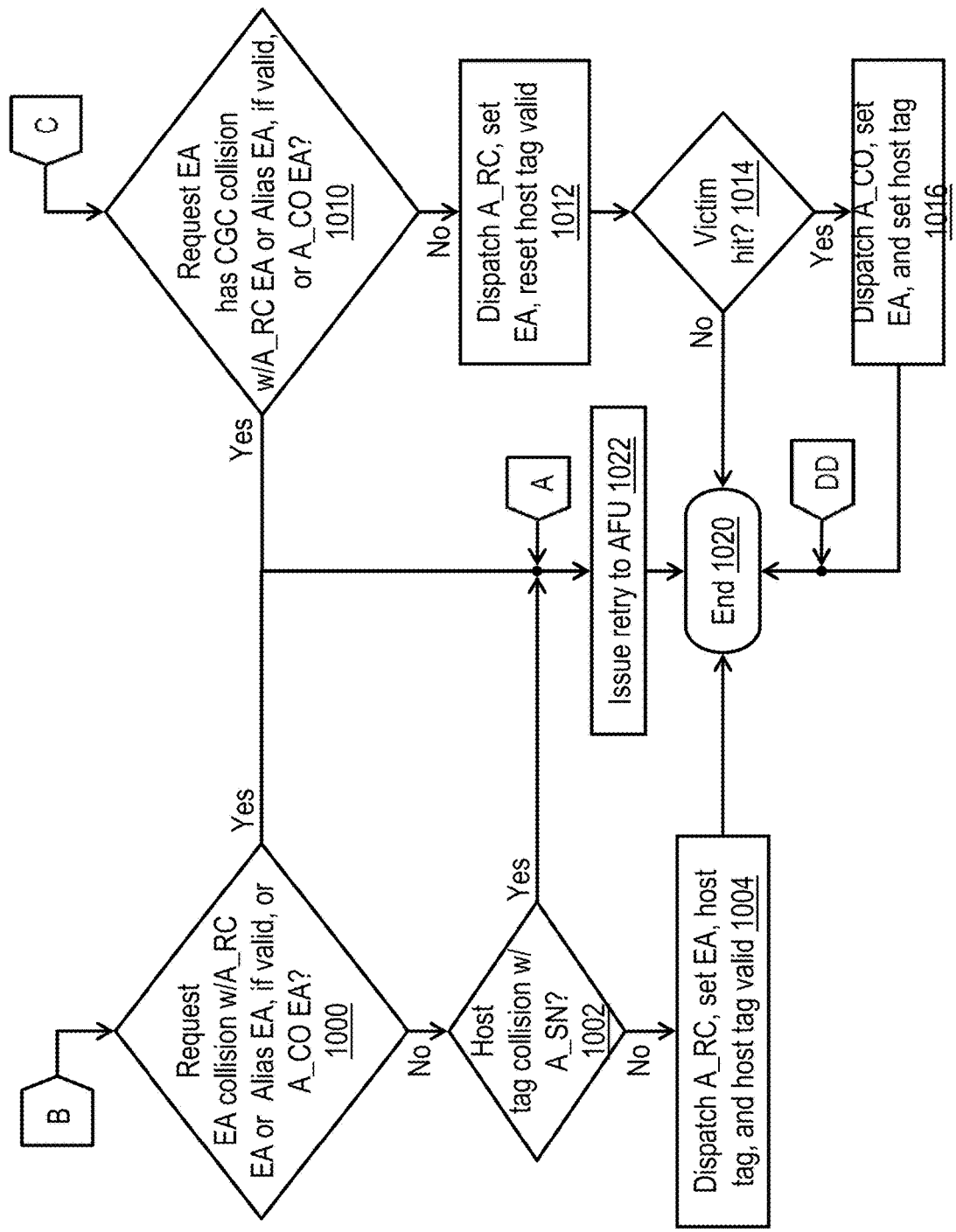

With reference now to FIGS. 9-10, a high-level logical flowchart of an exemplary process for dispatching one or more state machines of an accelerator unit 120 to service a memory access request of the accelerator unit 120 is illustrated. The process begins at block 900 in response to AFU 300 of accelerator unit 120 generating a memory access request, for example, to load from or store to a memory address. As indicated at block 902, AFU 300 optionally delays presentation of the request to outbound request logic 309 for a time interval of pseudo-random length in order to reduce or eliminate the possibility of a livelock condition in which the request frequency of AFU 300 is too great to allow sufficient time for competing memory access requests of processing units 102 to access the target cache line. Following block 902, if implemented, AFU 300 presents the memory access request to outbound request logic 309 (block 904). The memory access request typically includes at least a request EA, a desired type of memory access, and if a store request, store data.

At block 906, outbound request logic 309 determines if a pair of state machines (i.e., an A_RC machine 310 and its paired A_CO machine 312) is available for allocation to the memory access request received from AFU 300 at block 904. If not, the process passes through page connector A to block 1022 of FIG. 10, which illustrates outbound request logic 309 issuing a retry response to AFU 300. The retry response informs AFU 300 that the memory access request cannot be completed at this time and can optionally be re-presented by AFU 300. The process of FIG. 10 thereafter ends at block 1020. Returning to block 906 of FIG. 9, in response to determining that an A_RC machine 310 and A_CO machine 312 are available for allocation to the memory access request of AFU 300, the process proceeds in parallel from block 906 to block 910 and following blocks and to block 920 and following blocks.

At block 910, outbound request logic 309 performs a lookup of the request EA specified in the memory access request within EA-based directory 306. At block 912, outbound request logic 309 determines if the request EA hit in EA-based directory 306. If so, outbound request logic 309 records a hit for the target EA in EA-based directory 306, the coherence state indicated by state field 406 of the matching entry 400 of EA-based directory 306, and the host tag specified in host tag field 408 of the matching entry 400 (block 914). If outbound request logic 309 instead determines at block 912 that the request EA of the memory access request missed in EA-based directory 306, outbound request logic 309 records a miss and an invalid coherence state for the request EA of the memory access request (block 916). Following either block 914 or 916, the process proceeds to join point 930.

Referring now to block 920, outbound request logic 309 also selects a potential victim entry 400 in the congruence class (CGC) identified by the request EA of the memory access request, in the event that servicing the memory access request requires a castout of an entry 400 from the relevant congruence class. The potential victim entry 400 can be selected using, for example, a least recently used (LRU) or other algorithm, but preferably preferentially selects as a victim an invalid entry 400 of the congruence class, if present. Outbound request logic 309 also performs a lookup of the potential victim entry 400 within EA-based directory 306 at block 920. At block 922, outbound request logic 309 determines by reference to valid field 402 whether or not the potential victim entry 400 is valid. If so, outbound request logic 309 records a hit for the potential victim entry 400, the coherence state indicated by state field 406, and the host tag specified by host tag field 408 (block 924). If outbound request logic 309 instead determines at block 922 that the potential victim entry 400 in EA-based directory 306 is invalid, outbound request logic 309 records a miss and an invalid coherence state for the potential victim entry 400 (block 926). Following either block 924 or 926, the process proceeds to join point 930.

Once both branches of the process in FIG. 9 reach join point 930, outbound request logic 309 handles the memory access request of AFU 300 based on whether the request EA of the memory access request hit in EA-based directory 306, as shown at block 932. In particular, if the request EA of the memory access request missed in EA-based directory 306, the process passes through page connector C to block 1010 of FIG. 10. If, however, the request EA hit in EA-based directory 306, outbound request logic 309 additionally determines at block 934 whether or not the hit entry 400 is an alias leaf entry, as indicated by AL field 412 being set (e.g., to 1). In response to a determination that the hit entry 400 is not an alias leaf entry, the process passes from block 934 through page connector B to block 1000 of FIG. 10. If, however, the hit entry 400 is an alias leaf entry, the process proceeds through page connector AA to block 3900 of FIG. 39.

Referring now to block 1000 of FIG. 10, outbound request logic 309 determines whether or not the request EA of the memory access request collides with (i.e., falls within the same cache line as) an EA of a request currently being handled by any A_RC machine 310 or A_CO machine 312 of accelerator unit 120. Specifically, at block 1000, outbound request logic 309 checks for a collision between the request EA and EA 500 and any valid alias EA 520 of any active A_RC machine 310, as well as between the request EA and the EA 506 of any active A_CO machine 312. In addition, at block 1002, outbound request logic 309 also determines whether or not the host tag recorded for the memory access request at block 914 collides with (i.e., matches) the host tag 510 of a request currently being handled by any A_SN machine 314. In response to detection of a collision at either block 1000 or block 1002, outbound request logic 309 issues a retry response to AFU 300 (block 1022). Thereafter, the process of FIG. 10 ends at block 1020. If, however, no collision is detected at either block 1000 or block 1002, outbound request logic 309 dispatches the A_RC machine 310 allocated to handle the memory access request (block 1004). In addition, at block 1004, outbound request logic 309 sets the values of EA 500 and host tag 502 and sets valid field 504 to a valid state to indicate that host tag 502 is valid. The process performed by the A_RC machine 310 to handle the request is described in greater detail below with reference to FIGS. 11-12, 37, and 40. Following the dispatch of the A_RC machine 310 at block 1004, the process of FIG. 10 ends at block 1020.

With reference now to block 1010 of FIG. 10, outbound request logic 309 determines whether or not the request EA of the memory access request has a congruence class collision with (i.e., maps to the same congruence class as) an EA 500 or valid alias EA 520 of any active A_RC machine 310 or the EA 506 of any active A_CO machine 312. In response to detection of a congruence class collision at block 1010, outbound request logic 309 issues a retry response to AFU 300 (block 1022). If, however, no congruence class collision is detected at block 1010, outbound request logic 309 dispatches the allocated A_RC machine 310 to handle the memory access request (block 1012). In addition, at block 1012, outbound request logic 309 sets the value of EA 500, clears host tag 502, and resets valid field 504 to an invalid state to indicate that host tag 502 is invalid. In addition, at block 1014, outbound request logic 309 determines whether or not a victim hit was recorded for the potential victim entry 400 of accelerator cache 302 at block 924 of FIG. 9. If not, the process of FIG. 10 ends at block 1020 without dispatching the allocated A_CO machine 312. If, however, outbound request logic 309 determines at block 1014 that a victim hit was recorded for the potential victim entry 400 at block 924 of FIG. 9, outbound request logic 309 dispatches the A_CO machine 312 paired with the A_RC machine 310 handling the memory access request and sets the values of the associated EA 506 and host tag 508. The dispatched A_CO machine 312 performs a castout as described in greater detail below with reference to FIG. 23. Following the dispatch of the A_CO machine 312 at block 1016, the process of FIG. 10 ends at block 1020.

Figure 39:
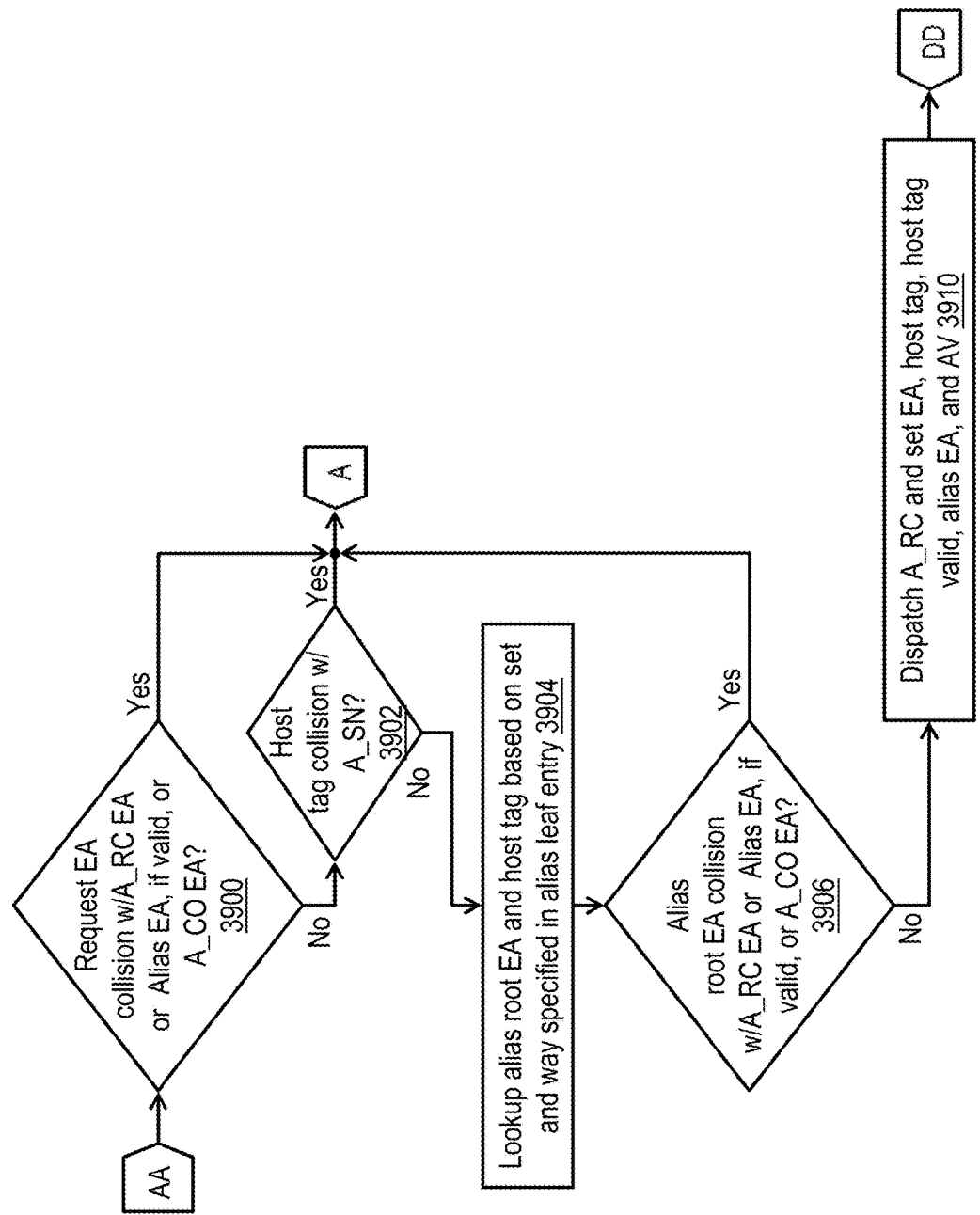
FIG. 39 is a high-level logical flowchart of an exemplary process by which a state machine of an accelerator unit is dispatched to service a request of the accelerator unit that targets an alias entry of an accelerator cache in accordance with one embodiment.

Referring now to block 3900 of FIG. 39, if the hit entry 400 of accelerator cache 302 is an alias leaf entry, outbound request logic 309 determines whether or not the request EA of the memory access request collides with (i.e., falls within the same cache line as) an EA of a request currently being handled by any active A_RC machine 310 or A_CO machine 312 of accelerator unit 120. Specifically, at block 3900, outbound request logic 309 checks for a collision between the request EA and EA 500 and any valid alias EA 520 of any active A_RC machine 310, as well as between the request EA and the EA 506 of any active A_CO machine 312. In addition, at block 3902, outbound request logic 309 also determines whether or not the host tag recorded for the memory access request at block 914 collides with (i.e., matches) the host tag 510 of a request currently being handled by any A_SN machine 314. In response to detection of a collision at either block 3900 or block 3902, the process returns through page connector A to block 1022 of FIG. 10. If, however, no collision is detected at either block 3900 or block 3902, outbound request logic 309 uses the set and way specified in field 414 and 416 of the alias leaf entry 400 to lookup the EA and host tag of the related alias root entry 400 in EA-based directory 306 (block 3904). Outbound request logic then checks for collisions impacting the alias root entry 400 at block 3906. In particular, at block 3906, outbound request logic 309 checks for a collision between the alias root EA and the EA 500 and any valid alias EA 520 of any active A_RC machine 310, as well as between the alias root EA and the EA 506 of any active A_CO machine 312. In response to detection of a collision at block 3906, the process returns through page connector A to block 1022 of FIG. 10. If, however, no collision is detected at block 3906, outbound request logic 309 dispatches the A_RC machine 310 allocated to handle the memory access request (block 3910). In addition, at block 3910, outbound request logic 309 sets the values of EA 500 and host tag 502 and sets valid field 504 to a valid state to indicate that host tag 502 is valid. Outbound request logic 309 also sets alias EA 520 with the alias root EA and sets alias valid (AV) field 524 to indicate alias EA 520 is valid. As a result, the dispatched A_RC machine 310 will protect both the request EA and the alias root EA from conflicting memory accesses until the memory access request is handled. The process performed by the dispatched A_RC machine 310 to handle the request is described in greater detail below with reference to FIGS. 11-12, 37, and 40. Following the dispatch of the A_RC machine 310 at block 3910, the process passes through page connector DD and ends at block 1020 of FIG. 10.

It should be noted that in a preferred embodiment the steps performed at block 904 and following blocks of FIGS. 9-10 and blocks 3900 to 3906 of FIG. 39 are performed by outbound request logic 309 in a logically atomic fashion.

With reference now to FIGS. 11-12, 37, and 40, there is illustrated a high-level logical flowchart of an exemplary process by which a state machine of an accelerator unit 120 services a request of the accelerator unit 120 in accordance with one embodiment. The process begins at block 1100, for example, in response to dispatch of an A_RC machine 310 (and possibly an A_CO machine 312). The process then proceeds to block 1104, which illustrates the A_RC machine 310 determining whether or not the request hit an alias leaf entry 400 of accelerator cache 302, as indicated by AL field 412 of the relevant directory entry 400 being set (e.g., to 1). If so, the process through page connector CC to FIG. 40, which is described below. If, however, a negative determination is made at block 1104, the A_RC machine 310 dispatched to service the request at block 1004 determines whether or not the memory access request is a store-type request that updates shared memory (block 1106). If so, the process passes through page connector D to FIG. 12, which is described below. If, however, A_RC machine 310 determines at block 1106 that the memory access request is not a store-type request and is therefore a load-type request, A_RC machine 310 additionally determines at block 1110 whether or not a hit in accelerator cache 302 was recorded for the request EA of the load-type request at block 914 of FIG. 9. If so, A_RC machine 310 reads the cache line identified by the request EA 500 from accelerator cache 302 and returns the requested data from the cache line (i.e., either a portion of the cache line or the entire cache line) to AFU 300 (block 1112). Thereafter, the process of FIG. 11 passes to block 1122, which is described below.

If, however, a determination is made at block 1110 that a miss was recorded for the request EA of the load-type request at block 916 of FIG. 9, A_RC machine 310 issues a Read/Castout (CO) request to host attach logic 240 via accelerator interface 116 (block 1114). An exemplary request 1300 that can be utilized to communicate a Read/CO request is given in FIG. 13. In this example, Read/CO request 1300 includes at least an A_RC number field 1302 for identifying the A_RC machine 310 that initiated the Read/CO request, a type field 1304 for identifying the type of the request as a Read/CO request, an EA field 1306 for specifying EA 500, an A_CO host tag field 1308 for specifying host tag 508 of the A_CO machine 312, if any, dispatched in conjunction with the A_RC machine 310 handling the read request, and a host tag valid (HTV) field 1310 for indicating whether field 1308 contains valid data. If HTV field 1310 is set to indicate field 1308 contains valid data, then a castout from accelerator cache 302 is requested; otherwise, no castout from accelerator cache 302 is requested by Read/CO request 1300.

Following block 1114, A_RC machine 310 awaits a response to the Read/CO request from host attach logic 240. In at least one embodiment, the response to the Read/CO request can take the form of Read response 1800 of FIG. 18. In this example, Read response 1800 includes an A_RC number field 1802 for identifying the A_RC machine 310 that initiated the associated Read/CO request 1300, a type field 1804 for identifying the type of the response as a Read response, a data field 1806 for communicating a target cache line of data, a state field 1808 for specifying a coherence state to be associated with the target cache line in accelerator cache 302, a result field 1810 for indicating a result of the request (e.g., success, retry, or alias hit), and a host tag field 1812 for specifying a host tag to be associated with the target cache line. In response to receipt of the Read response 1800, A_RC machine 310 determines from result field 1810 whether or not the result is alias hit, meaning that the EA specified in EA field 1306 of Read/CO request 1300 is currently associated with the RA to which the EA of an existing entry 400 in accelerator cache 302 already maps (block 1115). In response to detection of an alias hit at block 1115, the process passes through page connector BB to block 3700 of FIG. 37, which is described below. If, however, A_RC machine 310 determines at block 1115 that result field 1810 of the Read response 1800 does not indicate an alias hit, A_RC machine 310 additionally determines whether result field 1810 indicates retry, meaning that the Read/CO request 1300 did not complete successfully (block 1116). If result field 1810 does not indicate retry, but instead indicates success of the Read/CO request 1300, the A_RC machine 310 updates an entry in cache array 304 with the requested cache line contained in field 1806 of the Read response 1800. In addition, A_RC machine 310 updates the corresponding entry 400 of directory 306 by setting valid flag 402, establishing the tag portion of the request EA 500 in EA_Tag field 404, setting state field 406 with the coherence state specified in field 1808 of the Read response 1800, and setting host tag field 408 with host tag 502 (block 1118). As will be appreciated from the prior description, the congruence class of the entry 400 that is updated at block 1118 is determined by an index portion of the request EA of the Read/CO request 1300. As further illustrated at block 1118, A_RC machine 310 also updates the entry 320 of host tag array 308 identified by the host tag field 1812 of the Read response 1800 with the storage location (e.g., set number 324, way number 326, and, if necessary, cache number 322) of the requested cache line in accelerator cache 302. As indicated at block 1112, A_RC machine 310 additionally returns the requested portion of the cache line to AFU 300. The process then passes from block 1112 to block 1122, which is described below.

Returning to block 1116, in response to a determination by A_RC machine 310 that result field 1810 of the Read response 1800 for the Read/CO request 1300 issued by the A_RC machine 310 to host attach logic 240 indicates retry, A_RC machine 310 issues a retry to AFU 300 (block 1120). The process then passes to block 1122, which illustrates A_RC machine 310 resetting valid flag 504 for host tag 502 and alias valid flag 524 for alias EA 524 and then being released to return to an unbusy (idle) state. Thereafter, the process of FIG. 11 ends at block 1124.

Figure 11:
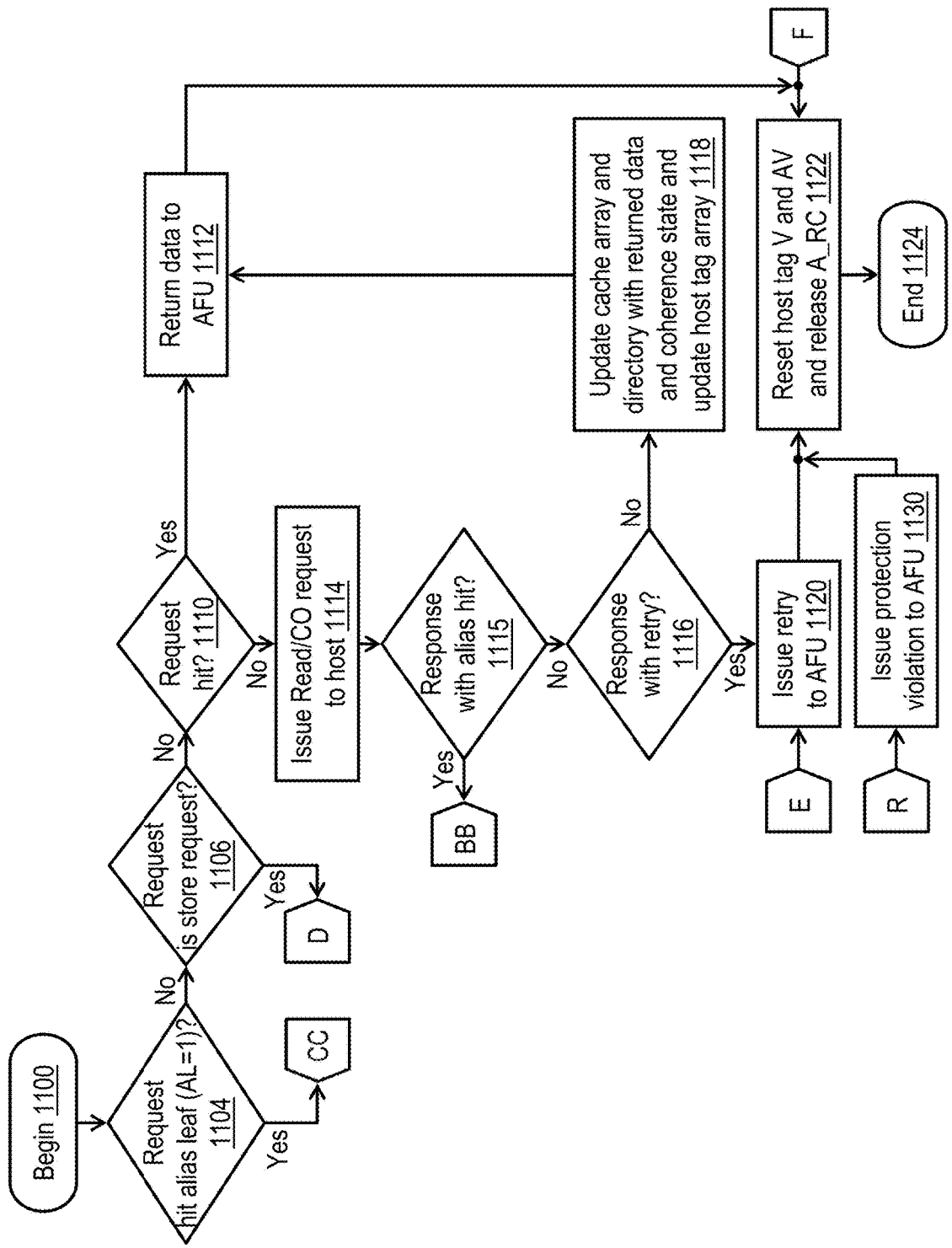
FIGS. 11-12 together form a high-level logical flowchart of an exemplary process by which one or more state machines of an AU service a request of the AU in accordance with one embodiment.
Figure 12:
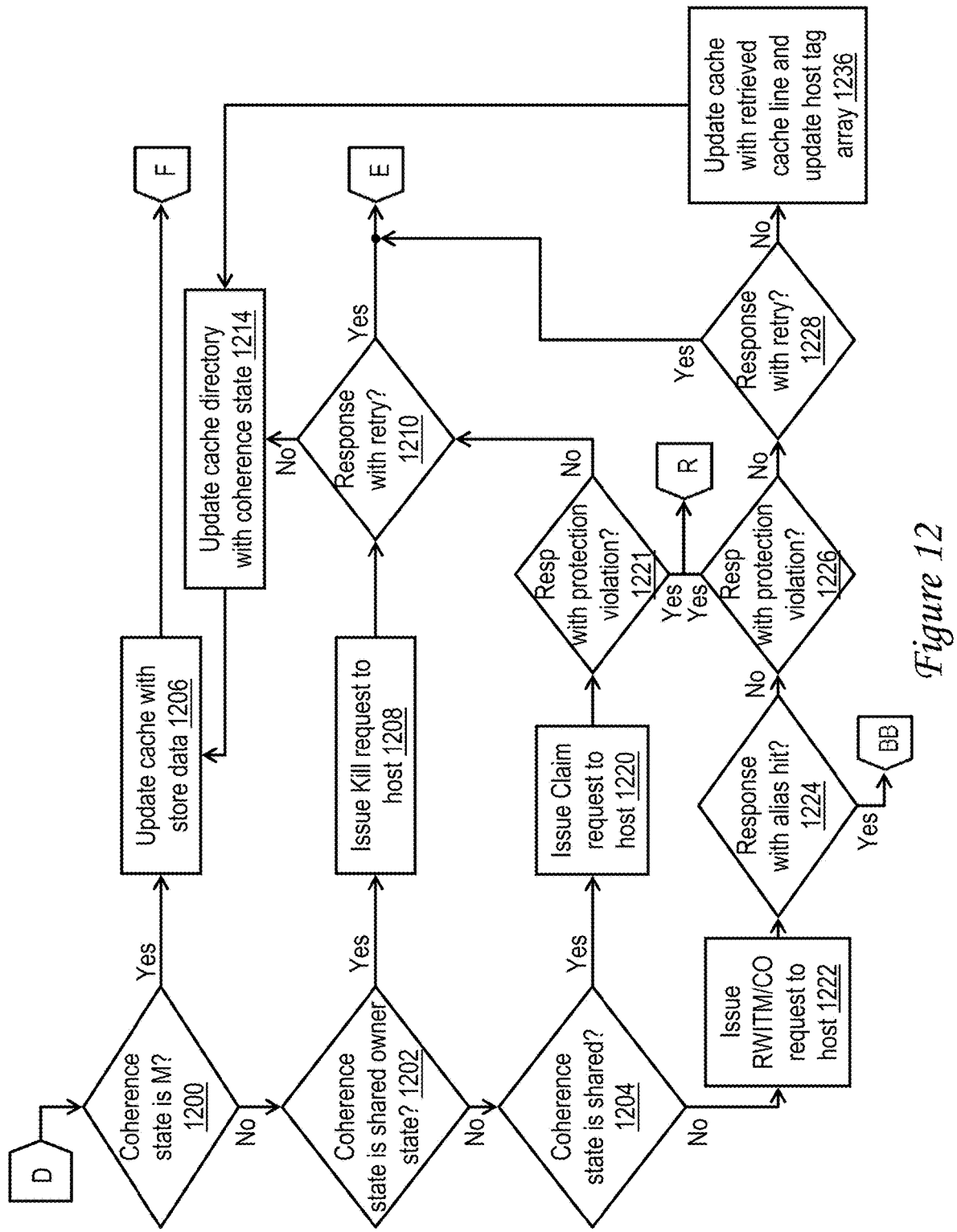

Referring now to FIG. 12, following page connector D, the process proceeds to blocks 1200-1204, which illustrate A_RC machine 310 determining the coherence state of the target cache line obtained by the directory lookup in accelerator cache 302 performed at block 910. In response to A_RC machine 310 determining at block 1200 that the coherence state of the target cache line is a modified state signifying that accelerator cache 302 holds a unique copy of the target cache line (e.g., no shared copies of the target cache line are held in any other caches of data processing system 100), A_RC machine 310 updates accelerator cache 302 with the store data provided by AFU 300 with the store request (block 1206). Thereafter, the process returns through page connector F to block 1122 of FIG. 11, which has been described.

Referring now to block 1202, if A_RC machine 310 determines that the coherence state is a shared owner coherence state indicating that accelerator unit 120 has the authority to update the target cache line but that one or more other shared copies of the target cache line may exist in data processing system 100, the process passes to block 1208. Block 1208 depicts A_RC machine 310 issuing a Kill request to host attach logic 240 in order to request the invalidation of the other cached copy or copies of the target cache line. As shown in FIG. 17, in an exemplary embodiment, a Kill request 1700 may include an A_RC number field 1702 for identifying the A_RC machine 310 issuing the Kill request, a type field 1704 for identifying the type of the request as a Kill request, and an EA field 1706 for specifying the EA of the target cache line.

Following block 1208, A_RC machine 310 awaits a response to the kill request from host attach logic 240. In at least one embodiment, the response to the kill request can take the form of Kill response 2200 of FIG. 22. In this example, Kill response 2200 includes an A_RC number field 2202 for identifying the A_RC machine 310 that initiated the associated Kill request 1700, a type field 2204 for identifying the type of the response as a Kill response, and a result field 2206 for indicating a result of the request (e.g., either success or retry). In response to receipt of the Kill response 2200, A_RC machine 310 determines from result field 2206 whether or not the result is retry, meaning that the Kill request 1700 did not complete successfully (block 1210). If result field 2206 does not indicate retry, but instead indicates success of the Kill request 1700, the A_RC machine 310 updates the relevant directory entry 400 in accelerator cache 302, for example, by setting valid flag 402 (if not already set), setting EA_Tag field 404 with the tag portion of the request EA 500 (if not already set), setting host tag field 408 with host tag 502 (if not already set), and setting state field 406 to a modified coherence state (block 1214). Thereafter, the process passes to block 1206 of FIG. 12, which has been described. If, however, A_RC machine 310 determines at block 1210 that result field 2206 indicates retry, the process returns through page connector E to block 1120 of FIG. 11, which has been described.

Referring now to block 1204, if A_RC machine 310 determines that the coherence state is a shared coherence state indicating that accelerator unit 120 does not have the authority to update the target cache line and that one or more other shared copies of the target cache line may exist in data processing system 100, the process passes to block 1220. Block 1220 depicts A_RC machine 310 issuing a Claim request to host attach logic 240 in order to request permission to update the target cache line and to invalidate any other cached copy or copies of the target cache line. As shown in FIG. 16, in an exemplary embodiment, a Claim request 1600 may include an A_RC number field 1602 for identifying the A_RC machine 310 issuing the Claim request, a type field 1604 for identifying the type of the request as a Claim request, and an EA field 1606 for specifying the EA of the target cache line of the Claim request.

Following block 1220, A_RC machine 310 awaits a response to the Claim request 1600 from host attach logic 240. In at least one embodiment, the response to the Claim request 1600 can take the form of Claim response 2100 of FIG. 21. In this example, Claim response 2100 includes an A_RC number field 2102 for identifying the A_RC machine 310 that initiated the associated Claim request 1600, a type field 2104 for identifying the type of the response as a Claim response, and a result field 2106 for indicating a result of the Claim request (e.g., success, retry, or protection violation). In response to receipt of the response, A_RC machine 310 determines from result field 2106 of Claim response 2100 whether or not the result indicates a protection violation, meaning that the relevant translation entry 633 in translation cache 630 indicates read-only permission rather than the read and write permissions required for the storage update indicated by the Claim request (block 1221). It should be noted that no similar determination of a protection violation is made for Kill requests (e.g., following block 1208) because a Kill request is only issued if both read and write permission for the target cache line have been previously obtained via a Claim request or read-with-intent-to-modify (RWITM)/CO request.

If A_RC machine 310 determines at block 1221 that result field 2106 indicates a protection violation, the process passes through page connector R to block 1130 of FIG. 11, which illustrates A_RC machine 310 issuing a protection violation message to AFU 300. AFU 300 can respond to the protection violation message by retrying the Claim request at a later time, optionally in response to a message from a hypervisor controlling data processing system 100 or after delaying for a sufficient time interval for the hypervisor to update the permissions for the relevant effective address page, as discussed further below with reference to block 2554 of FIG. 25. Following block 1130, the process proceeds to block 1122, which has been described.

Returning to block 1221 of FIG. 12, if result field 2106 of the Claim response 2100 does not indicate a protection violation, A_RC machine 310 additionally determines if result field 2106 indicates retry, meaning that the Claim request 1600 did not complete successfully (block 1210). If result field 2106 does not indicate retry, but instead indicates success of the Claim request 1600, the process passes to block 1214, which has been described. If, however, A_RC machine 310 determines at block 1210 that result field 2106 indicates retry, the process returns through page connector E to block 1120 of FIG. 11, which has been described.

In response to A_RC machine 310 determining at blocks 1200-1204 that the coherence state for the request EA is not any of the modified, shared owner, or shared states, but is instead an invalid state, the process of FIG. 12 proceeds to block 1222. Block 1222 depicts A_RC machine 310 issuing a read-with-intent-to-modify (RWITM)/CO request to host attach logic 240 in order to request a copy of the target cache line, to invalidate any other cached copy or copies of the target cache line, and to, if necessary, castout an entry of accelerator cache 302. As shown in FIG. 14, in an exemplary embodiment, a RWITM/CO request 1400 includes at least an A_RC number field 1402 for identifying the A_RC machine 310 that initiated the RWITM/CO request, a type field 1404 for identifying the type of the request as a RWITM/CO request, an EA field 1406 for specifying the request EA 500, an A_CO host tag field 1408 for specifying host tag 508 of the A_CO machine 312, if any, dispatched in conjunction with the A_RC machine 310 handling the RWITM request, and a host tag valid (HTV) field 1410 for indicating whether field 1408 contains valid data. If HTV field 1410 is set to indicate field 1408 contains valid data, then a castout from accelerator cache 302 is requested; otherwise, no castout from accelerator cache 302 is requested by the RWITM/CO request 1400.

Following block 1222, A_RC machine 310 awaits a response to the RWITM/CO request 1400 from host attach logic 240. In at least one embodiment, the response to the RWITM/CO request 1400 can take the form of RWITM response 1900 of FIG. 19. In this example, RWITM response 1900 includes an A_RC number field 1902 for identifying the A_RC machine 310 that initiated the associated RWITM/CO request 1400, a type field 1904 for identifying the type of the response as a RWITM response, a data field 1906 for communicating a target cache line of data, a result field 1908 for indicating a result of the request (e.g., success, retry, protection violation, or alias hit), and a host tag field 1910 for specifying a host tag to be associated with the target cache line. In response to receipt of the RWITM response 1900, A_RC machine 310 determines from result field 1908 whether or not the result indicates an alias hit, meaning that the EA specified in the request is currently associated with the RA to which the EA of an existing entry 400 in accelerator cache 302 already maps (block 1224). In response to detection of an alias hit at block 1224, the process passes through page connector BB to block 3700 of FIG. 37, which is described below. If, however, A_RC machine 310 determines at block 1224 that result field 1908 of the RWITM response 1900 does not indicate an alias hit, A_RC machine 310 additionally determines whether result field 1810 indicates a protection violation, meaning that the relevant translation entry 633 in translation cache 630 indicates read-only permission rather than the read and write permissions required for the storage update indicated by the RWITM/CO request (block 1226).

If A_RC machine 310 determines at block 1226 that result field 1908 indicates a protection violation, the process passes through page connector R to block 1130 of FIG. 11, which has been described. If, however, result field 1908 of the RWITM response 1900 does not indicate a protection violation, A_RC machine 310 additionally determines if result field 1908 indicates retry, meaning that the associated RWITM/CO request 1400 did not complete successfully (block 1228). If result field 1908 does not indicate retry, but instead indicates success of the RWITM/CO request 1400, A_RC machine 310 updates an entry in cache array 304 with the requested cache line contained in data field 1906 of the RWITM response 1900 (block 1236). As further illustrated at block 1236, A_RC machine 310 also updates the entry 320 of host tag array 308 identified by the host tag field 1812 of the response with the storage location (e.g., set number 324, way number 326, and, if necessary, cache number 322) of the requested cache line in accelerator cache 302. The process then proceeds to block 1214, which has been described. If, however, A_RC machine 310 determines at block 1228 that result field 1908 of the RWITM response 1900 indicates retry, the process returns through page connector E to block 1120 of FIG. 11, which has been described.

Figure 40:
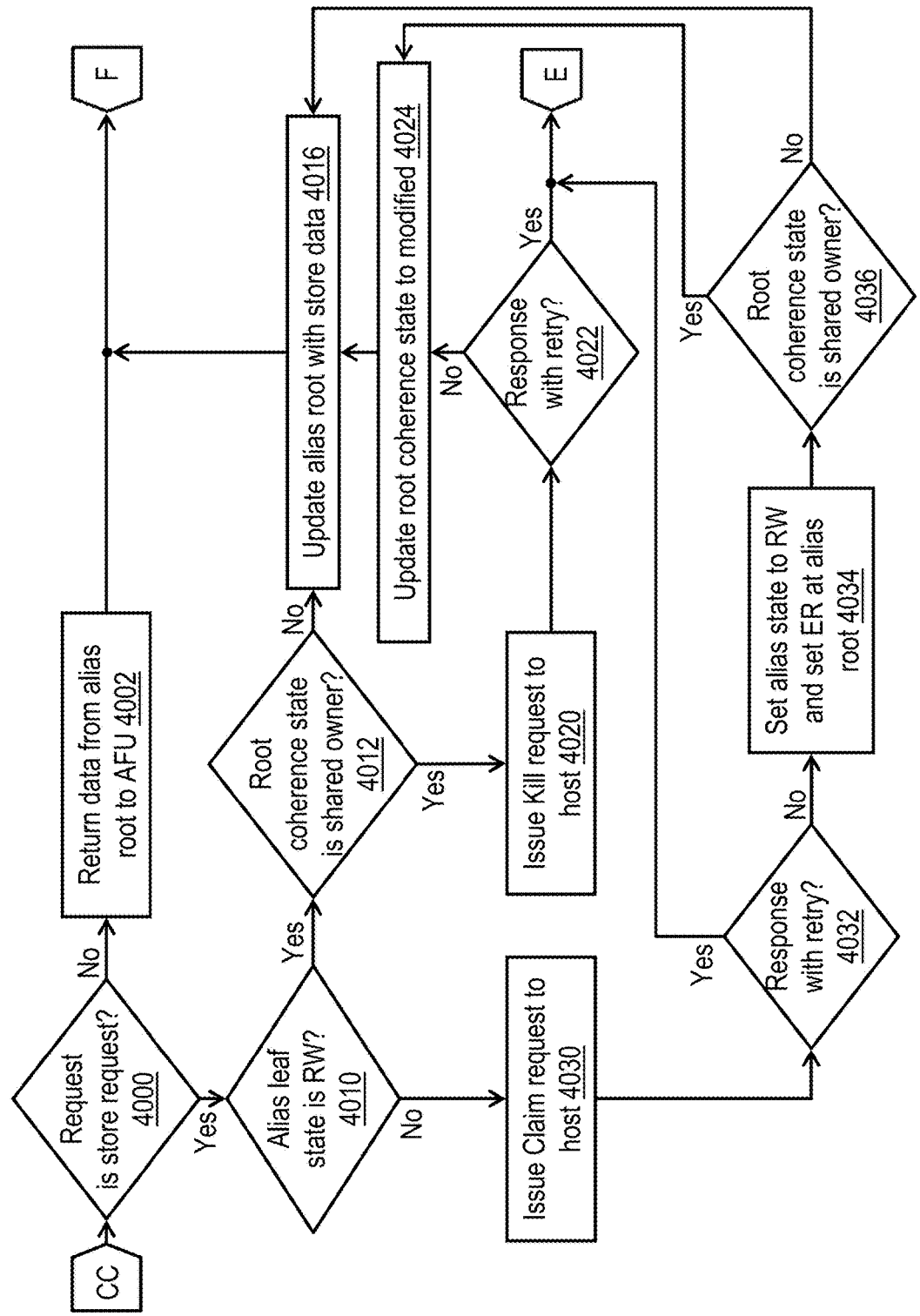
FIG. 40 is a high-level logical flowchart of an exemplary process by which a dispatched state machine of an accelerator unit services a request of the accelerator unit that targets an alias entry of an accelerator cache in accordance with one embodiment.

With reference now to FIG. 40, following page connector CC the process proceeds to block 4000, which illustrates the A_RC machine 310 dispatched to service the request at block 3910 determining whether or not the memory access request is a store-type request that updates shared memory. If not, meaning that the memory access request merely requests read access to shared memory, A_RC machine 310 reads the target cache line from the alias root entry in accelerator cache 302 and returns the requested data from the cache line (i.e., either a portion of the cache line or the entire cache line) to AFU 300 (block 4002). It should be noted that, for a hit on an alias leaf entry, the target cache line is guaranteed to be present in accelerator cache 302, and no Read/CO request is transmitted from accelerator unit 120 to host attach logic 240. Following block 4002, the process of FIG. 40 passes through page connector F to block 1122 of FIG. 11, which has been described.

Returning to block 4000, if a determination is made at block 4000 that the memory access request is a store-type request that updates shared memory, A_RC machine 310 additionally determines at block 4010 whether state field 406 of that alias leaf entry 400 indicates read/write (RW) authority for the target cache line. If not, the process passes to block 4030, which is described below. If, however, a determination is made at block 4010 that the alias leaf state has RW authority, A_RC machine 310 additionally checks the coherence state of the alias root entry, and particularly, whether state field 406 of the alias root entry 400 indicates a shared owner coherence state (block 4012). As will be appreciated, this shared owner coherence state indicates that the alias root entry 400 formerly held the target cache line exclusively in a modified coherence state. In response to A_RC machine 310 determining at block 4012 that the coherence state of the alias root entry 400 is not a shared owner coherence state, meaning that the coherence state at the alias root entry 400 is either modified or shared, A_RC machine 310 updates the entry in cache array 304 corresponding to the alias root entry 400 with the store data provided by AFU 300 with the store request (block 4016). Thereafter, the process returns through page connector F to block 1122 of FIG. 11, which has been described.

Referring again to block 4012, in response to a determination that the coherence state at the alias root entry 400 is the shared owner state, A_RC machine 310 issues a Kill request 1700 to host attach logic 240 via accelerator interface 116 (block 4020). The Kill request attempts to regain exclusive ownership of the target cache line for the alias root entry 400. The A_RC machine 310 thereafter awaits receipt of a Kill response 2200 to the Kill request 1700. In response to receipt of the Kill response 2200, the A_RC machine 310 determines at block 4022 whether result field 2206 indicates retry, meaning that the Kill request did not succeed. If so, the process passes through page connector E to block 1120 of FIG. 11. If, however, result field 2206 does not indicate retry, but instead indicates success, A_RC machine 310 updates state field 406 of the alias root entry 400 to a modified coherence state (block 4024). The process then passes to block 4016, which has been described.

Referring now to block 4030, if A_RC machine 310 determined that the state field 406 of the alias leaf entry 400 indicates only read authority for the target cache line (rather than the RW authority required to update the target cache line), A_RC machine 310 issues a Claim request 1600 to host attach logic 240 in order to request permission to update the target cache line and to invalidate any other cached copy or copies of the target cache line. Following block 4030, A_RC machine 310 awaits a Claim response 2100 to the Claim request 1600 from host attach logic 240. In response to receipt of the Claim response 2100, A_RC machine 310 determines from result field 2106 of Claim response 2100 whether or not the result indicates retry, meaning that the Claim request 1600 did not complete successfully (block 4032). If A_RC machine 310 determines at block 4032 that result field 2106 indicates retry, the process returns through page connector E to block 1120 of FIG. 11, which has been described. If, however, result field 2106 does not indicate retry, but instead indicates success of the Claim request 1600, A_RC machine 310 sets state field 406 of the alias leaf entry 400 to indicate RW authority for the target cache line and sets ER field 418 in the alias root entry 400 to indicate that, regardless of the coherence state indicated by state field 406 at the alias root entry 400, the alias root entry 400 requires writeback of the associated cache line (which is presumed dirty) upon eviction (block 4034). At block 4036, A_RC machine 310 additionally determines if the coherence state for the alias root indicated by state field 406 can be upgraded from the shared owner state to a modified state. If the state field 406 of the alias root entry 400 does not indicate the shared owner state, no coherence state upgrade is made, and the process passes to block 4016, which has been described. If, however, state field 406 of the alias root entry 400 is set to the shared owner state, A_RC machine 310 upgrades the coherence state at the alias root entry 400 to modified, as indicated at block 4024. Thereafter, the process passes to block 4016 and following blocks, which have been described.

Figure 37:
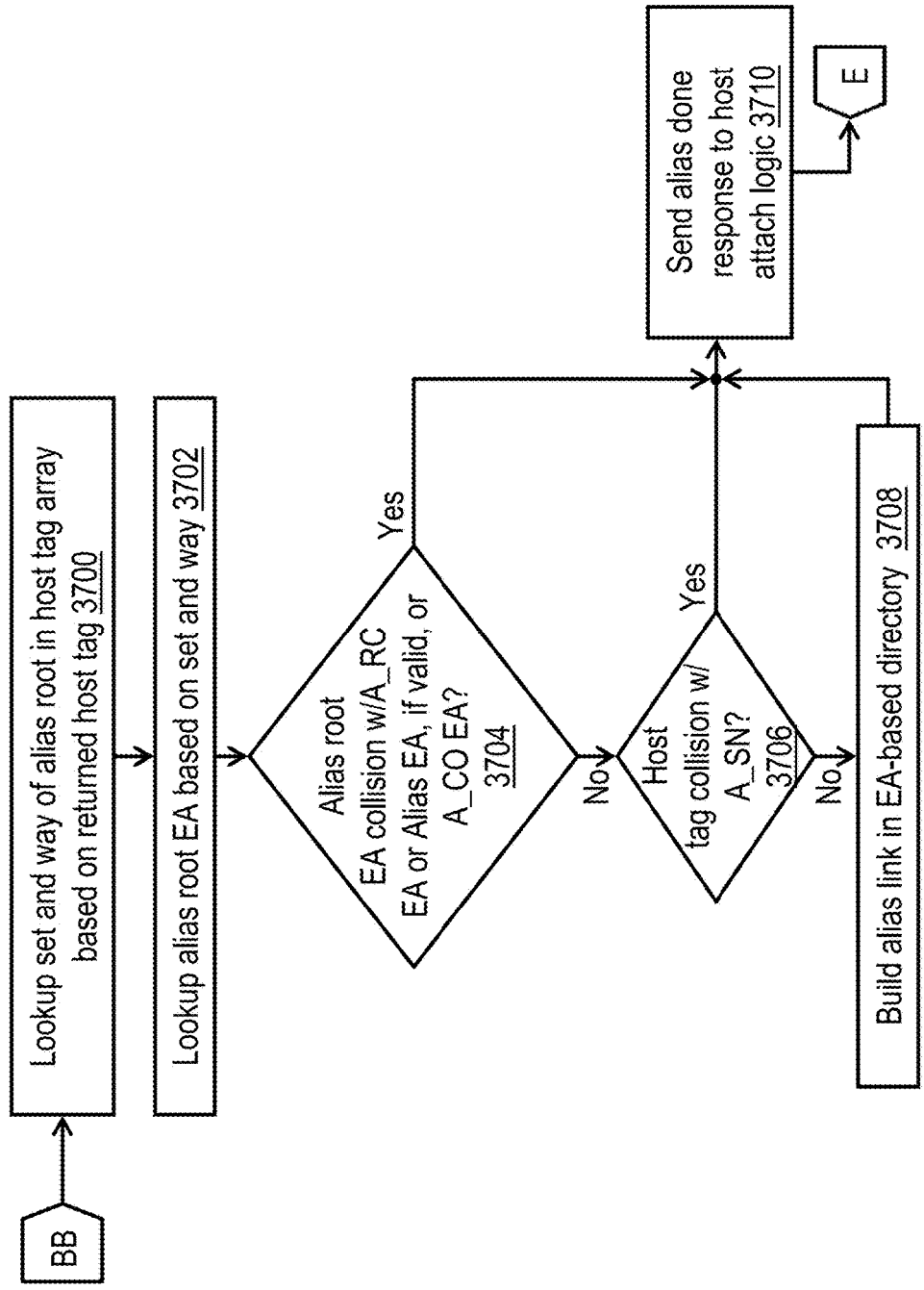
FIG. 37 is a high-level logical flowchart of an exemplary process by which an alias link is built in an accelerator cache in accordance with one embodiment.

Referring now to FIG. 37, an exemplary process by which an alias link is built in an accelerator cache 302 is depicted. The process continues from block 1115 or 1224 at page connector BB and then proceeds to block 3700, which illustrates the A_RC machine 310 performing a lookup of the set number and way number of the alias root entry 400 in host tag array 308 based on the host tag identifying the alias root returned in host tag field 1812 of the Read response 1800 or host tag field 1910 of RWITM response 1900. Based on the set and way numbers, A_RC machine 310 accesses the alias root entry 400 in accelerator cache 302 and determines the alias root EA from EA_Tag field 404.

At block 3704, A_RC machine 310 determines whether or not the alias root EA determined at block 3702 collides with (i.e., falls within the same cache line as) an EA of a request currently being handled by any A_RC machine 310 or A_CO machine 312 of accelerator unit 120. Specifically, at block 3704, outbound request logic 309 checks for a collision between the alias root EA and EA 500 and any valid alias EA 520 of any A_RC machine 310, as well as between the alias root EA and the EA 506 of any active A_CO machine 312. In addition, at block 3706, A_RC machine 310 also determines whether or not the host tag of the alias root entry 400 collides with (i.e., matches) the host tag 510 of a request currently being handled by any A_SN machine 314. In response to detection of a collision at either block 3704 or block 3706, A_RC machine 310 refrains from building an alias link between the entry for the request EA of the memory access request an the alias root entry 400. The process accordingly passes directly from to block 3710, which is described below.

If, however, no collision is detected at either block 3704 or block 3706, A_RC machine 310 builds an alias link between the entry 400 for the request EA of the memory access request (which will become one of possibly one of multiple alias leaf entries 400 linked to the same alias root entry 400) and the alias root entry 400. To build this alias link, A_RC machine 310 sets its alias EA 520 to the alias root EA and sets alias valid (AV) flag 524. In addition, A_RC machine 310 tests AR field 410 of the alias root entry 400, and if it is not set, sets AR field 410 (e.g., to 1) and resets ER field 418 of the alias root entry 400. Further, in the alias leaf entry 400, A_RC machine 310 sets valid flag 402, sets EA_Tag field 404 with the request EA, sets state field 406 to indicate read-only permission, sets AL field 412 to identify the entry as an alias leaf entry, places the set and way numbers of the alias root entry 400 in set field 414 and way field 416, respectively, and sets host tag field 408 with the host tag returned by host attach logic 240. The alias leaf entry 400 is thus established and points to the related alias root entry 400.

Figure 38:
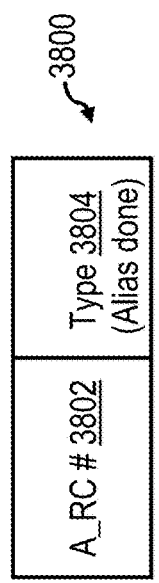
FIG. 38 depicts an exemplary Alias Done response sent from an accelerator unit to host attach logic in accordance with one embodiment.

Following block 3708 or either of blocks 3704 and 3706, A_RC machine 310 sends an Alias Done message to host attach logic 240 via accelerator interface 116. The Alias Done message informs host attach logic 240 that the attempt by accelerator unit 120 to build an alias link is complete (whether successful or not). In at least one embodiment, the Alias Done message can take the form of Alias Done message 3800 of FIG. 38, which includes an A_RC number field 3802 for identifying the A_RC machine 310 that issued the message and a type field 3804 for indicating the type of the message as Alias Done. Following block 3710, the process returns through page connector E to block 1120 of FIG. 11, which has been described.

To promote understanding of the handling of alias entries for a store-type request in accordance with the embodiment of FIGS. 11-12, 37, and 40, Table I is provided below. In Table I, the various possible combinations of settings of state fields 406 at the alias root entry and alias leaf entry (or entries) are detailed in the first two columns. The third and fourth columns respectively summarize the actions taken if the entry in accelerator cache 302 hit by the store-type request is identified by AR field 410 of the directory entry 400 as an alias root entry or is identified by AL field 412 as an alias leaf entry.

TABLE I

| RA-based directory state | Alias Root State | Alias Leaf State | If target entry in accelerator cache is an alias root entry . . . | If target entry in accelerator cache is an alias leaf entry . . . |
|---|---|---|---|---|
| Modified | Modified | RW | Write data to accelerator cache | Write data to accelerator cache |
| Shared Owner | Shared Owner | RW | Issue Kill request to host attach logic and onto system interconnect, and if succeeds, update alias root coherence state to modified | Issue Kill request to host attach logic and onto system interconnect, and if Kill succeeds, update alias root coherence state to modified |
| Modified | Shared | RW | Issue Claim request to host attach logic, but not to system interconnect. If succeeds, update alias root coherence state to modified | Write data to accelerator cache |

TABLE I-continued

| RA-based directory state | Alias Root State | Alias Leaf State | If target entry in accelerator cache is an alias root entry ... | If target entry in accelerator cache is an alias leaf entry ... |
|---|---|---|---|---|
| Modified | Modified | R | Write data to accelerator cache | Issue Claim to host attach logic, but not to system interconnect. If succeed, update alias leaf coherence state to RW, and set ER at alias root |
| Shared Owner | Shared Owner | R | Issue Kill request to host attach logic and onto system interconnect, and if succeeds, update alias root coherence state to modified | Issue Claim request to host attach logic (which will issue Kill request on system interconnect). If succeeds, update alias leaf state to RW, update alias root coherence state to modified, and set ER at alias root |
| Shared | Shared | R | Issue Claim request to host attach logic and onto system interconnect, and if succeeds, update alias root coherence state to modified | Issue Claim request to host attach logic and onto system interconnect, and if succeeds, update alias leaf state to RW and set ER at alias root |

Figure 23:
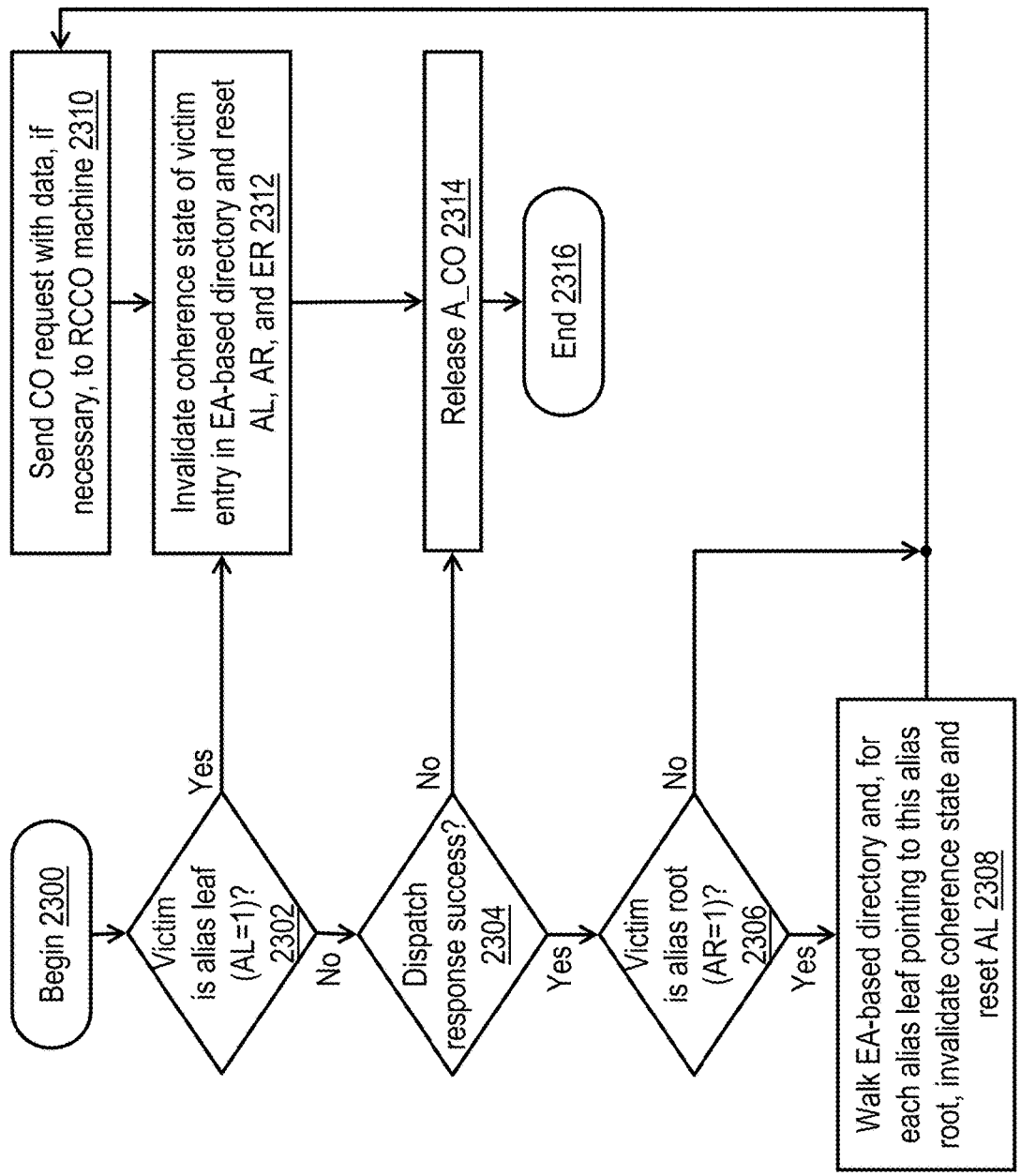
FIG. 23 is a high-level logical flowchart of an exemplary process for by which a castout (CO) machine performs a castout from the AU in accordance with one embodiment.

Referring now to FIG. 23, there is depicted a high-level logical flowchart of an exemplary process by which accelerator unit 120 performs a castout from accelerator cache 302 in accordance with one embodiment. The process begins at block 2300, for example, in response to dispatch at block 1016 of FIG. 10 of an A_CO machine 312 to handle a castout from accelerator cache 302. The process proceeds from block 2300 to block 2302, which illustrates A_CO machine 312 determining whether or not the victim entry 400 to be castout from accelerator cache 302 has AL field 412 set to indicate that the victim entry 400 is an alias leaf entry. If the victim entry is identified by its AL field 412 as an alias leaf entry, no data is stored in the corresponding entry of cache array 304, and no castout data will be transmitted to host attach logic 240 upon eviction of the victim entry regardless of the current setting of its state field 406. Thus, an alias leaf entry can be "silently" evicted from accelerator cache 302 without disturbing the alias root entry and any other alias leaf entry or entries. Consequently, in response to an affirmative determination at block 2302, the process passes directly to block 2312, which is described below. It should be noted that the ability to silently evict any alias leaf entry from accelerator cache 302 is supported by the implementation of ER field 418 in the alias root entry to record whether any associated alias leaf entry has RW authority for the related cache line. Without ER field 418, eviction of any alias leaf entry with its state field 406 set to indicated RW authority for the associated cache line would necessitate castout of the alias root entry and eviction of all linked alias leaf entries from accelerator cache 302.

Referring again to block 2302, if A_CO machine 312 determines that the victim entry of accelerator cache 302 is not an alias leaf entry, the process passes to block 2304. Block 2304 illustrates the A_CO machine 312 determining whether or not host attach logic 240 provided a castout dispatch response indicating success in response to a Read/CO request 1300 or RWITM/CO request 1400 that requested that host attach logic 240 handle a castout from accelerator cache 302 (e.g., by having HTV field 1310 or 1410 set to indicate that A_CO host tag field 1308 or 1408 contains valid data). In at least some embodiments, the castout dispatch response may take the form of CO dispatch response 2000 of FIG. 20. In this example, CO dispatch response 2000 includes an A_CO number field 2002 for identifying the pair of A_RC machine 310 and A_CO machine 312 that are handling the Read/CO request or RWITM/CO request that required the castout, a type field 2004 for indicating the type of response is a CO dispatch response, and a result field 2006 indicating success (i.e., the castout request was accepted by host attach logic 240) or failure (i.e., the castout request was not accepted by host attach logic 240).

In response to A_CO machine 312 determining at block 2304 that result field 2006 of the CO dispatch response 2000 does not indicate success, the process passes to block 2314, which is described below. If, however, the CO dispatch response 2000 indicates success in result field 2006, A_CO machine 312 additionally determines at block 2306 whether or not the victim entry of accelerator cache 302 is identified by its AR field 410 as an alias root entry. If not, the process proceeds to block 2310, which is described below. However, if A_CO machine 312 determines at block 2306 that the victim entry to be removed from accelerator cache 302 is an alias root entry, A_CO machine 312 walks EA-based directory 306 and, for each alias leaf entry pointing to the victim alias root entry (as indicated by its set field 414 and way field 416), invalidates state field 406 and resets AL field 412 (block 2308). The process then passes to block 2310

Block 2310 depicts A_CO machine 312 transmitting a castout request to an RCCO machine 610 of host attach logic 240 (block 2304). As illustrated in FIG. 15, in an exemplary embodiment a Castout request 1500 includes an A_CO field 1502 for uniquely identifying which A_CO machine 312 issued the castout request, a type field 1504 for specifying the type of the request as a Castout request, a host tag field 1506 for specifying the host tag recorded in the host tag field 408 of the evicted entry, a data field 1508 for communicating the cache line data, and a data valid field 1510 indicating whether or not data field 1508 contains valid data. As will be appreciated, for a victim entry for which AR field 410 is set and ER field 418 is not set, if the coherence state indicated by state field 406 of the evicted entry 400 indicates that the cache line is not modified with respect to the corresponding memory block in system memory 106, then no writeback of data to system memory 106 is required, and data valid field 1510 will be set to indicate that data field 1508 contains no valid data. If, on the other hand, the coherence state indicated by state field 406 indicates that the cache line is modified with respect to the corresponding memory block in system memory 106 or if ER field 418 is set to indicate mandatory writeback of data from an alias root entry regardless of the setting of its state field 406, data flag 1510 will be set to indicate that data field 1508 contains valid data, and data field 1508 will be populated with the cache line from the relevant entry in cache array 304. As shown at block 2312, A_CO machine 312 also updates the coherence state of the castout cache line appropriately in the relevant EA-based directory 306 of accelerator cache 302 (e.g., to an invalid coherence state) and resets AR field 410, AL field 412, and ER field 418. Thereafter, the castout from accelerator cache 302 is complete, and the A_CO machine 312 allocated to handle the castout is released to return to an unbusy (idle) state (block 2314). The process of FIG. 23 then ends at block 2316.

Figure 24:
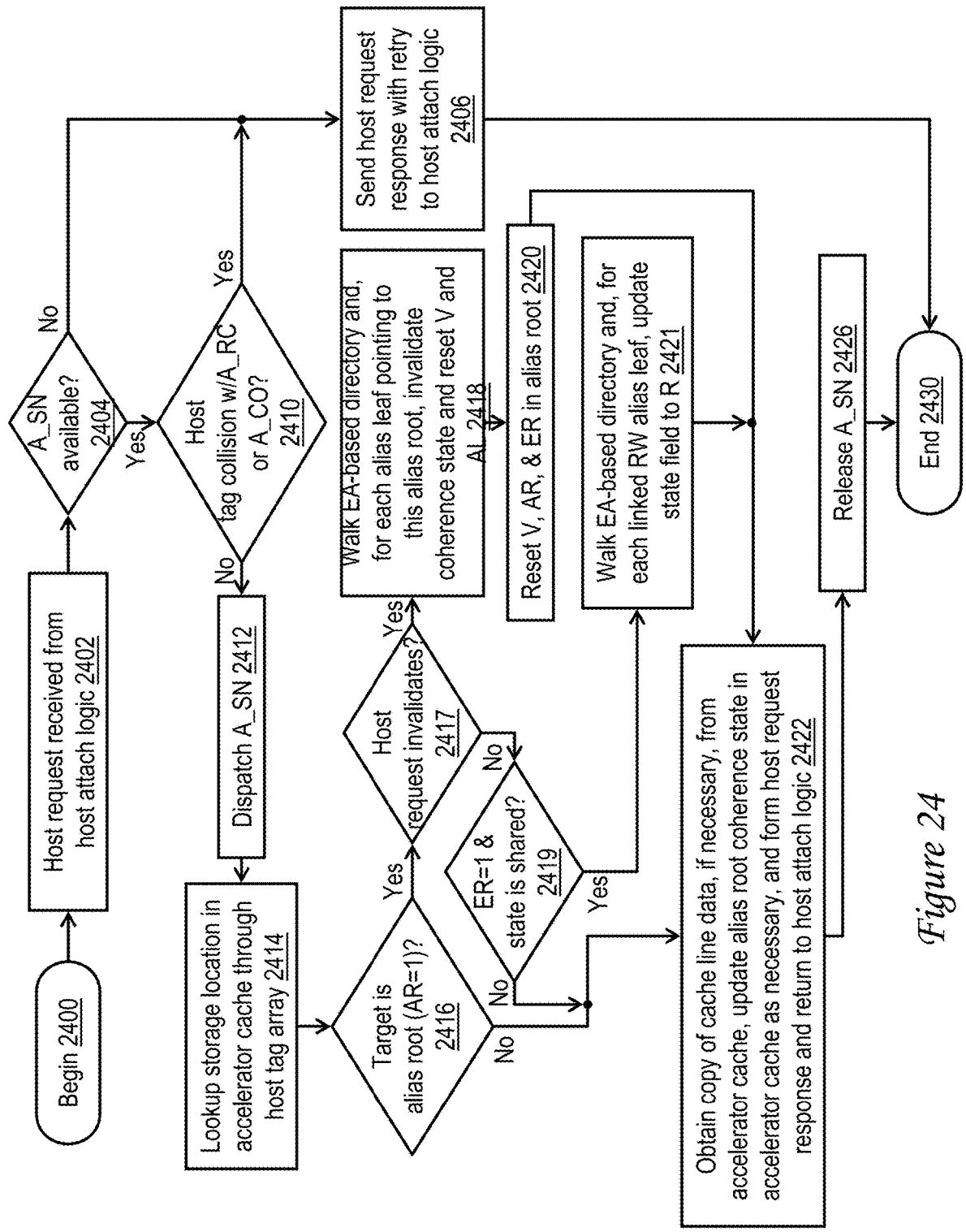
FIG. 24 is a high-level logical flowchart of an exemplary process by which a snoop (SN) machine of the AU processes a host request in accordance with one embodiment.

Referring now to FIG. 24, there is depicted a high-level logical flowchart of an exemplary process by which a snoop (SN) machine of an accelerator unit 120 processes a snooped request in accordance with one embodiment.

The process of FIG. 24 begins at block 2400 and then proceeds to block 2402, which illustrates inbound request logic 313 of an accelerator unit 120 receiving a host request from host attach logic 240 via accelerator interface 116. In an exemplary embodiment, the host request may take the form of host request 3100 of FIG. 31. In this example, host request 3100 includes a machine number (#) field 3102 for identifying a machine number of a state machine in host attach logic 240 that initiated the host request, a machine type field 3104 for specifying the type of state machine that initiated the host request, a request type field 3106 for specifying the type of the host request, and a host tag field 3108 for identifying, by its host tag, a target of the host request. In response to receipt of the host request 3100, inbound request logic 313 determines at block 2404 whether or not an A_SN machine 314 is in an unbusy (idle) state and thus available to handle the received host request 3100. If not, inbound request logic 313 provides a host request response indicating retry to host attach logic 240 (block 2406). In an exemplary embodiment, the host request response may take the form of host request response 3200 of FIG. 32. In this example, host request response 3200 includes a machine number (#) field 3202 for identifying a machine number of a state machine in host attach logic 240 that initiated the associated host request, a machine type field 3204 for specifying the type of state machine that initiated the associated host request, a response type field 3206 for specifying the type of the host request response, a result field 3208 for indicating a result of the associated host request (e.g., success or retry), a data field 3210 for, if present, communicating a cache line of data, a data valid (DV) field 3212 for indicating whether host request response 3200 includes a data field 3210, and a state field 3214 for communicating a coherence state of the cache line of data, if any, contained in data field 3210. Following block 2406, the process of FIG. 24 ends at block 2430.

Returning to block 2404, in response to A_SN machine 314 determining that an A_SN machine 314 is available for allocation to handle the received host request 3100, inbound request logic 313 additionally determines at block 2410 whether or not the received host request 3100 specifies in host tag field 3108 a host tag that matches (collides) with a host tag 502 or 508 associated with a request being handled by any active A_RC machine 310 or A_CO machine 312. If so, the process passes to block 2406, which has been described. If, however, no host tag collision is detected at block 2410, inbound request logic 313 dispatches an idle A_SN machine 314 to handle the received host request 3100 (block 2412). The A_SN machine 314 performs a lookup of the storage location of the relevant cache line in accelerator cache 302 by using the host tag specified in host tag field 3108 to index into host tag array 320 (block 2414).

At block 2416, A_SN machine 314 determines by reference to AR field 410 of the entry 400 of EA-based directory 306 identified by host tag array 320 whether or not the entry 400 is an alias root entry. It should be noted that the entry 400 in EA-based directory 306 identified by host tag array 320 cannot be an alias leaf entry as, in the described embodiment, host tags map only to entries 400 that are alias root entries or neither alias root entries nor alias leaf entries. In response to a negative determination at block 2416, the process passes to block 2422, which is described below. If, however, A_SN machine 314 determines at block 2416 that the entry 400 is an alias root entry, A_SN machine 314 additionally determines at block 2417 whether or not the host request 3100 requires invalidation of the identified alias root entry 400 in EA-based directory 306 (e.g., host request 3100 specifies a RWITM, Kill, or Claim request in request type field 3106). If not, the process proceeds to block 2419, which is described below. If, however, A_SN machine 314 determines at block 2417 that host request 3100 requires invalidation of the identified entry 400, the process passes to block 2418. Block 2418 depicts A_SN machine 314 removing from accelerator cache 302 all alias leaf entries 400 linked to the identified alias root entry 400. To remove the relevant alias leaf entries 400, A_SN machine 314 walks EA-based directory 306 and, for each alias leaf entry (as indicated by AL field 412 being set) pointing to the alias root entry (as indicated by its set field 414 and way field 416), resets valid field 402, invalidates state field 406, and resets AL field 412. In addition, A_SN machine 314 resets valid field 402, AR field 410, and ER field 418 in the alias root entry 400 (block 2420). The process then passes to block 2422.

Referring now to block 2419, A_SN machine 314 determines whether or not the identified alias root entry 400 has ER field 418 set (meaning that at some time, a linked alias leaf entry had RW authority for the associated cache line) and has a state field 406 indicating the shared state. If not, the process passes to block 2422, which is described below. If, however, an affirmative determination is made at block 2419, A_SN machine 314 walks EA-based directory 306 and, for each alias leaf entry (as indicated by AL field 412 being set) pointing to the alias root entry (as indicated by its set field 414 and way field 416), updates state field 406 to indicate only R (rather than RW) authority for the associated cache line (block 2421). The update to the state field 406 of the linked alias leaf entries will ensure that any subsequent storage-modifying request of accelerator unit that specifies one of the alias EAs as the request EA will be forced to initiate a Claim request on system interconnect 110 rather than silently updating the associated cache line (see, e.g., blocks 4010 and 4030 of FIG. 40). The process passes from block 2421 to block 2422.

Referring now to block 2422, the A_SN machine 314 then handles the host request 3100 by reference to accelerator cache 302 and provides an appropriate host request response 3200 to host attach logic 240 (block 2422). As indicated in block 2422, handling the host request 3100 includes, for example, forwarding a copy of a target cache line, if necessary, to host attach logic 240 in host request response 3200 and updating the coherence state of the target cache line in accelerator cache 302 as necessary. Exemplary coherence state updates are summarized in Table II below. Thereafter, the A_SN machine 314 is released to return to an unbusy (idle) state (block 2426), and the process of FIG. 24 ends at block 2430.

TABLE II

| Original state of alias root | Request | Updated state of alias root |
|---|---|---|
| Modified | RWITM | Invalid |
| Modified | Read | Shared owner |
| Shared owner | RWITM, Claim | Invalid |
| Shared owner | Read | Shared owner (no update) |
| Shared | RWITM, Kill, Claim | Invalid |
| Shared | Read | Shared (no update) |

Figure 25:
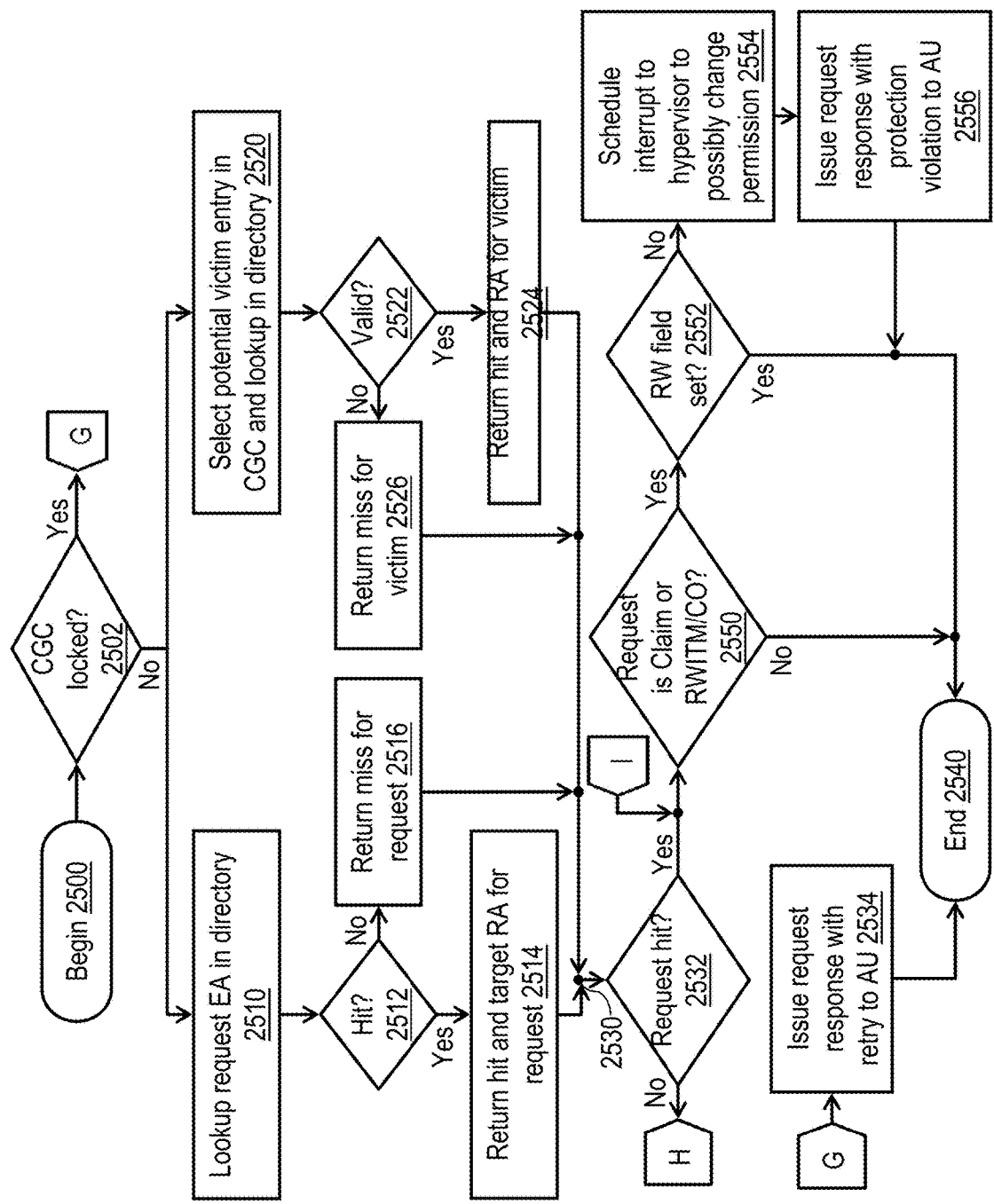
FIGS. 25-26 together form a high-level logical flowchart of an exemplary process by which a target address of a memory access request of the AU is translated by the host attach logic in accordance with one embodiment.
Figure 26:
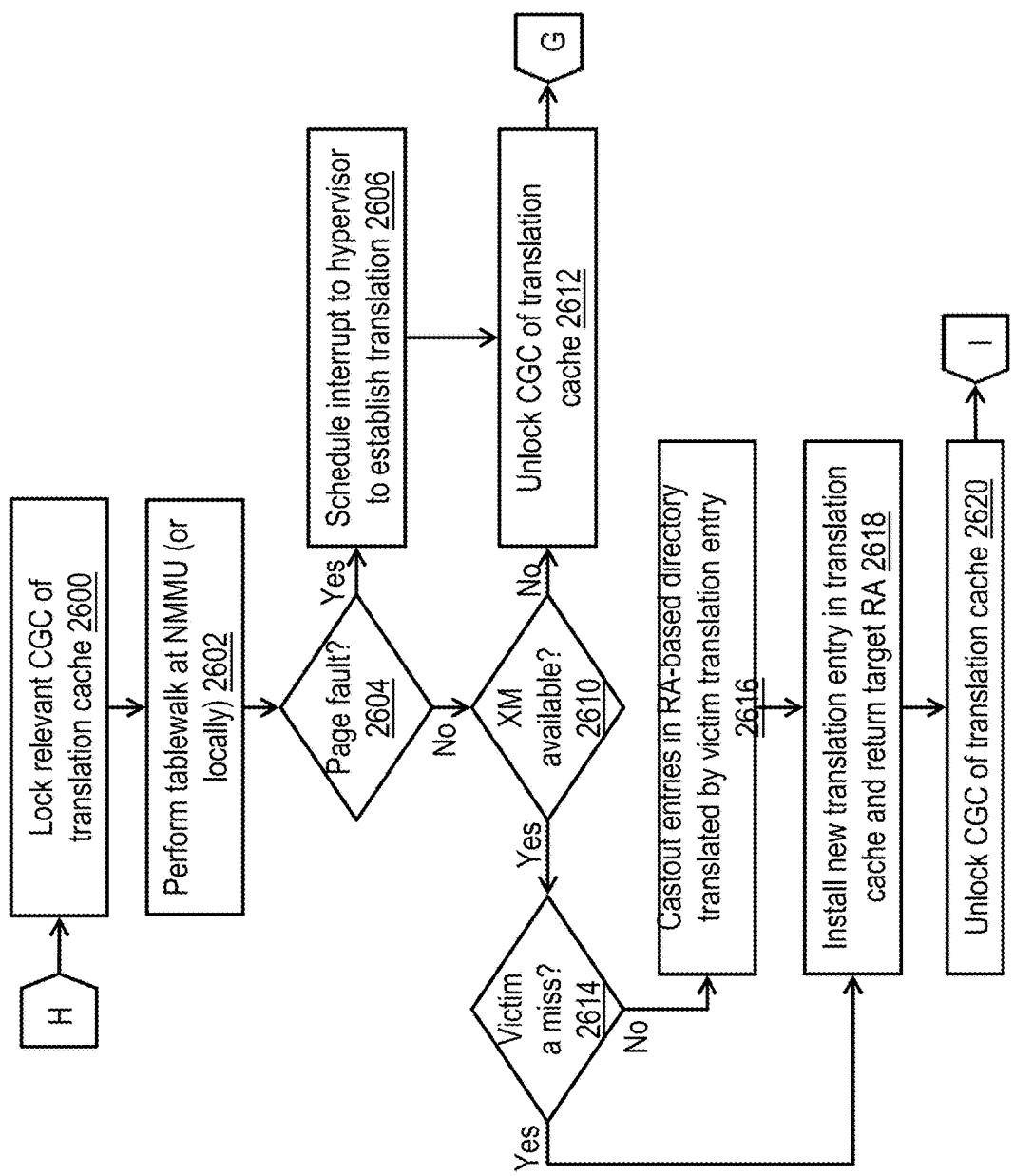

With reference now to FIGS. 25-26, there is illustrated a high-level logical flowchart of an exemplary process by which a request effective address (EA) of a request of an accelerator unit 120 is translated by host attach logic 240 in accordance with one embodiment. The process begins at block 2500 of FIG. 25, for example, in response to receipt by translation unit 620 of host attach logic 240 of a memory access request from accelerator unit 120 via accelerator interface 116. The process then proceeds to block 2502, which illustrates translation unit 620 determining whether or not the congruence class 632 in translation cache 630 to which the EA specified by the EA field 1306, 1406, 1606, or 1706 of the memory access request maps is currently locked and thus unavailable for access to service other memory access requests, as discussed further below at block 2600 of FIG. 26. If so, the process passes through page connector G to block 2534, which illustrates translation unit 620 issuing the relevant request response 1800, 1900, 2100, or 2200 to accelerator unit 120 with a retry result specified in result field 1810, 1908, 2106, or 2206. This request response informs accelerator unit 120 that the memory access request can optionally be re-presented by accelerator unit 120. The process of FIG. 25 thereafter ends at block 2540. Returning to block 2502 of FIG. 25, in response to determining that the relevant congruence class of translation cache 630 is not locked, the process proceeds in parallel from block 2502 to block 2510 and following blocks and to block 2520 and following blocks.

At block 2510, translation unit 620 performs a lookup of the request EA specified in the memory access request within translation cache 630. At block 2512, translation unit 620 determines if the request EA hit in translation cache 630. If so, translation unit 620 records a hit for the request EA in translation cache 630 and the RA contained in the RA field 638 of the translation entry 633 whose EA field 636 matches the request EA (block 2514). If translation unit 620 instead determines at block 2512 that the request EA of the memory access request missed in translation cache 630, translation unit 620 records a miss for the request EA of the memory access request (block 2516). Following either block 2514 or 2516, the process proceeds to join point 2530.

Referring now to block 2520, translation unit 620 also selects a potential victim translation entry 633 in the congruence class (CGC) 632 identified by the request EA of the memory access request, in the event that a castout of a translation entry 633 from the relevant congruence class is required. The potential victim translation entry 633 can be selected using, for example, a least recently used (LRU) or other algorithm, but preferably preferentially selects as a victim an invalid translation entry 633 of the congruence class 632, if present. Translation unit 620 also performs a lookup of the potential victim translation entry 633 within translation cache 630 at block 2520. At block 2522, translation unit 620 determines by reference to valid field 634 whether or not the potential victim translation entry 633 is valid. If so, translation unit 620 records a hit for the potential victim translation entry 633 and the real address specified in RA field 638 of the potential victim translation entry 633 (block 2524). If translation unit 620 instead determines at block 2522 that the potential victim translation entry 633 is invalid, translation unit 620 records a miss for the potential victim translation entry 633. Following either block 2524 or 2526, the process proceeds to join point 2530.

Once both branches of the process in FIG. 25 reach join point 2530, translation unit 620 handles the memory access request of accelerator unit 120 based on whether the request EA of the memory access request hit in translation cache 630, as shown at block 2532. In particular, if the request EA missed in translation cache 630, the process passes through page connector H to block 2600 of FIG. 26. If, however, the request EA of the memory access request hit in translation cache 630, the process passes from block 2532 to block 2550 and following blocks, at which translation unit 620 determines whether or not accelerator unit 120 has sufficient permissions to make the requested memory access. In particular, at block 2550 translation unit 620 determines whether the memory access request is a Claim or RWITM/CO request that requires acquisition of both read and write permissions. If not, meaning that the accelerator unit 120 already has all access permission required for the memory access request, the process ends at block 2540 of FIG. 25 with a translation unit 620 having obtained the target RA of the memory access request of accelerator unit 120.

In response to a determination at block 2550 that the memory access request for which address translation is required is a Claim or RWITM/CO request, translation unit 620 additionally determines at block 2552 whether or not RW field 642 of the relevant entry 633 of translation cache 630 is set to indicate that accelerator unit 120 has both read and write permissions for the effective address page to which access is requested. If so, the process passes to block 2540. If, however, translation unit 620 determines at block 2552 that RW field 642 is reset to indicate read-only access, translation unit 620 schedules an interrupt to the hypervisor to prompt the hypervisor to possibly upgrade the access permissions of accelerator unit 120 to permit both read and write access (block 2554). In addition, translation unit 620 issues to accelerator unit 120 a request response 1900 or 2100 including a result field 1908 or 2106 indicating a protection violation (block 2556). This request response is handled by the relevant A_RC machine 310 of accelerator unit 120 as discussed above with reference to block 1221 or block 1226 of FIG. 12. Thereafter, the process of FIG. 25 ends at block 2540.

Referring now to block 2600 of FIG. 26, translation unit 620 initiates a process to install a new translation entry for translating the request EA of the memory access request into translation cache 620. As part of this process, translation unit 620 locks the congruence class 632 to which the request EA of the memory access request maps (block 2600). Then, at block 2602, translation unit 620 initiates a tablewalk of the page table in system memory 106 to locate the relevant translation entry, if present. As indicated, the tablewalk can be performed, for example, by translation unit 620 itself or can be performed by NMMU 112 in response to a request by translation unit 620. At block 2604, translation unit 620 determines whether the tablewalk was successful in locating a translation entry to translate the request EA or whether a page fault occurred (i.e., no translation entry for the request EA was found in the page table).

In response to a determination at block 2604 that a page fault occurred, translation unit 620 schedules an interrupt to the hypervisor (or other control program) to request establishment in the page table of a translation entry for translating the request EA (block 2606). Translation unit 620 also unlocks the congruence class of translation cache 630 (block 2612). The process then passes from block 2612 through page connector G to block 2534 of FIG. 25, which has been described.

Referring again to block 2604, in response to a determination that the tablewalk performed at block 2602 did not result in a page fault, but instead located the relevant translation entry in the page table, translation unit 620 determines at block 2610 whether or not a translation machine 622 is available to handle the installation of a new translation entry 633 for translating the request EA of the memory access request into translation cache 630. If not, the process passes to block 2612 and following blocks, which have been described. If, however, translation unit 620 determines at block 2610 that a translation machine 622 is available, translation unit 620 allocates the translation machine 622 to handle the installation of the new translation entry 633 into translation cache 630.

At block 2614, the allocated translation machine 622 determines whether or not a miss was recorded for the victim translation entry 633 to be evicted from translation cache 630. If so, the process passes to block 2618, which is described below. If, however, a hit was recorded for the victim translation entry 633 (i.e., the victim entry 633 has is marked valid), translation machine initiates castout from RA-based directory 600 of all entries 702 having RAs within the memory page translated by the victim translation entry 633 (block 2616). This process is described in greater detail below with reference to FIG. 27. Once the victim translation entry 633 is removed from translation cache 620, translation machine 622 installs the new translation entry 633 located by the tablewalk (including all the values of the relevant fields 634, 636, 638, 640, and 642) into translation cache 620 in place of the victim translation entry 633 and returns the target RA for the memory access request (block 2618). Translation machine 622 then unlocks the congruence class of the translation cache 630 (block 2620). The process thereafter passes from block 2612 through page connector I to block 2550 of FIG. 25, which has been described.

Figure 27:
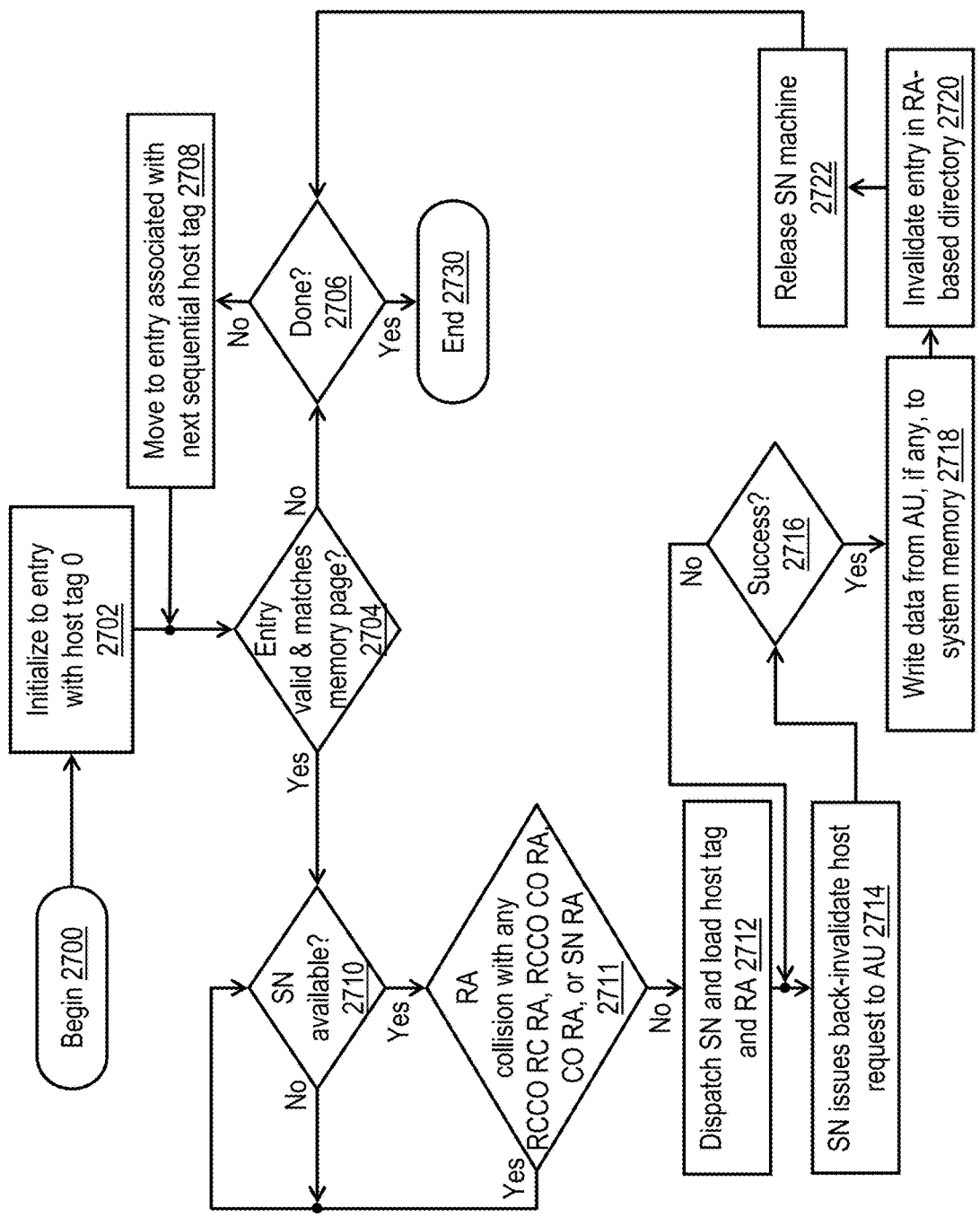
FIG. 27 is a high-level logical flowchart of an exemplary process by which entries of the RA-based directory in the host attach logic and of the accelerator cache are invalidated in response to a translation cache miss in accordance with one embodiment.

With reference now to FIG. 27, there is illustrated a high-level logical flowchart of an exemplary process by which entries of RA-based directory 600 and of accelerator cache 302 are invalidated in response to a request EA miss and victim hit in translation cache 620 of host logic 240 in accordance with one embodiment. The process is performed, for example, at block 2616 of FIG. 26.

The process of FIG. 27 begins at block 2700 and then proceeds to block 2702, which illustrates the translation machine 622 allocated to handle the installation of the new translation entry 633 into translation cache 630 initializing a pointer identifying an entry 702 of RA-based directory 600 to be processed to an initial host tag value (e.g., host tag 0). At block 2704, the translation machine 622 determines if the current entry 702 is marked as valid (e.g., in valid field 800) and if the RA_tag indicated by RA_tag field 802 matches the RA field 638 of the translation entry 633 to be evicted from translation cache 630 (i.e., the victim). If not, translation machine 622 determines at block 2706 whether or not all entries 702 of RA-based directory 600 have been processed. If so, the process of FIG. 27 ends at block 2730. If, however, translation machine 622 determines at block 2706 that not all entries 702 of RA-based directory 600 have been processed, the process proceeds to block 2708, which illustrates translation machine 622 moving the pointer to the entry 702 associated with the next sequential host tag. The process then returns to block 2704, which has been described.

In response to a determination at block 2704 that the current entry 702 of RA-based directory 600 is valid and has a RA_tag field 802 matching the RA field 638 of the translation entry 633 to be evicted from translation cache 630, translation machine 622 determines at block 2710 whether or not a SN machine 614 is available to be dispatched to handle eviction of corresponding entries from RA-based directory 600 and accelerator cache 302. If not, the process waits at block 2710 until a SN machine 614 is available to be dispatched. If a determination is made at block 2710 that a SN machine 614 is available to be dispatched, translation machine 622 additionally determines at block 2711 whether or not the RA specified in RA field 638 of the translation entry 633 to be evicted from translation cache 630 collides with (matches) any RCCO RC RA 2812, RCCO CO RA 2816, CO RA 2830, or SN RA 2840 of an active state machine. If so, the process returns to block 2710.

In response to a SN machine 614 being available at block 2710 and no collision being detected at block 2711, translation machine 622 dispatches an available SN machine 614 and provides the SN machine 614 the relevant values for SN RA 2840 and host tag 2842, as shown at block 2712 of FIG. 27 and in FIG. 28. As shown at blocks 2714 and 2716, the dispatched SN machine 614 issues one or more back-invalidate host requests 3100 specifying host tag 2842 to accelerator unit 120 until SN machine 614 has successfully invalidated in accelerator cache 302 the entry 400 associated with host tag 2842, as indicated by result field 3208 of host request response 3200 indicating success. The last successful back-invalidate host request is processed in the process of FIG. 24 as discussed previously. In addition, at block 2718, SN machine 614 writes to system memory 106 any data received from accelerator unit 120 in the successful host request response 3200 associated with the successful back-invalidate host request 3100. SN machine 614 also invalidates the entry 702 in RA-based directory 602 having an RA_tag field 802 that matches SN RA 2840 (block 2720). Thereafter, the SN machine 614 is released to return to the idle state (block 2722), and the process passes to block 2706, which has been described. It should be noted that in at least some embodiments of the process of FIG. 27, a translation machine 622 can invoke concurrent invalidation of multiple entries 400 and 633 by dispatching multiple SN machines 614 in parallel.

Figure 29:
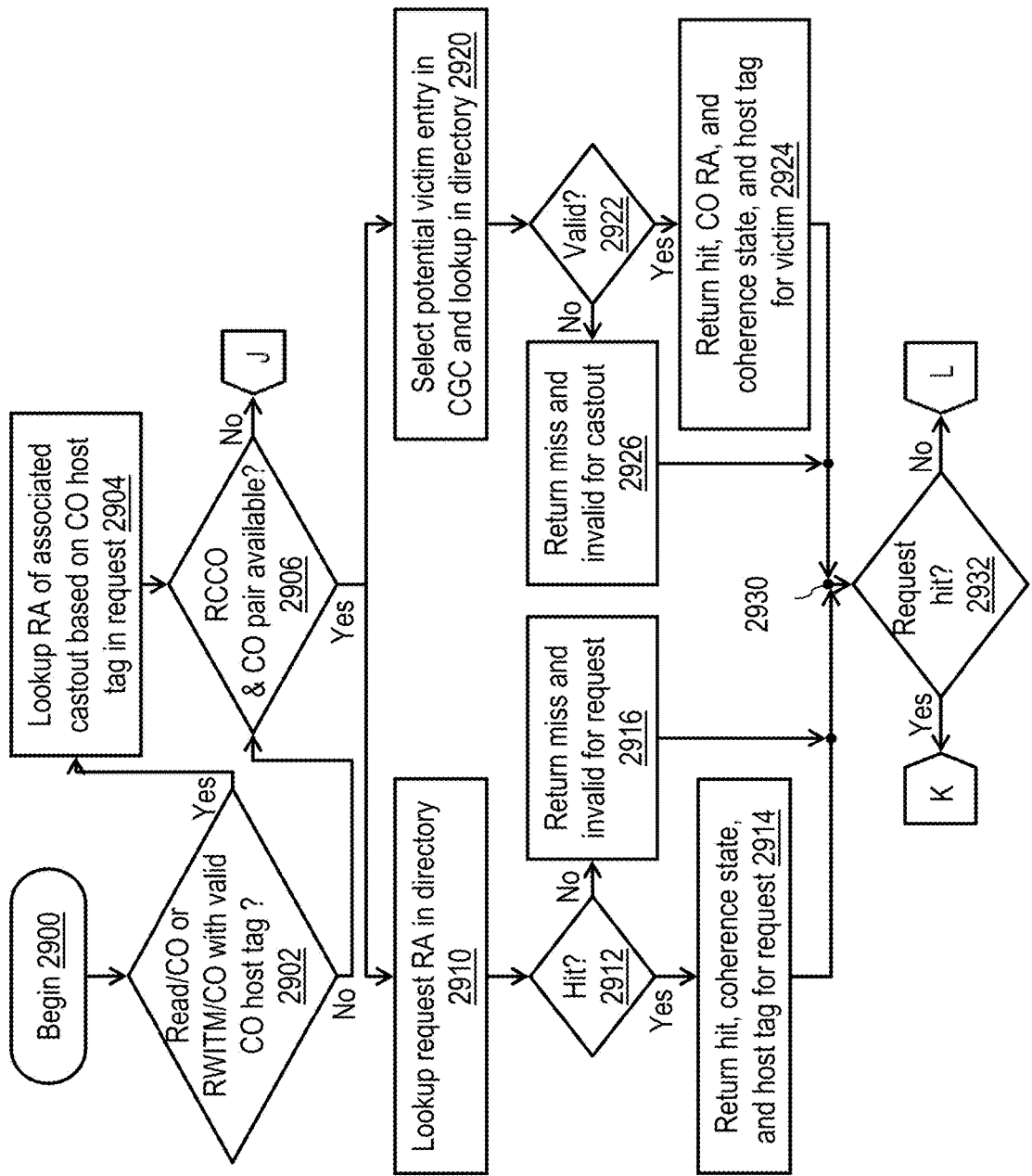
FIGS. 29-30 together form a high-level logical flowchart of an exemplary process by which host attach logic handles memory access requests received from the AU in accordance with one embodiment.
Figure 30:
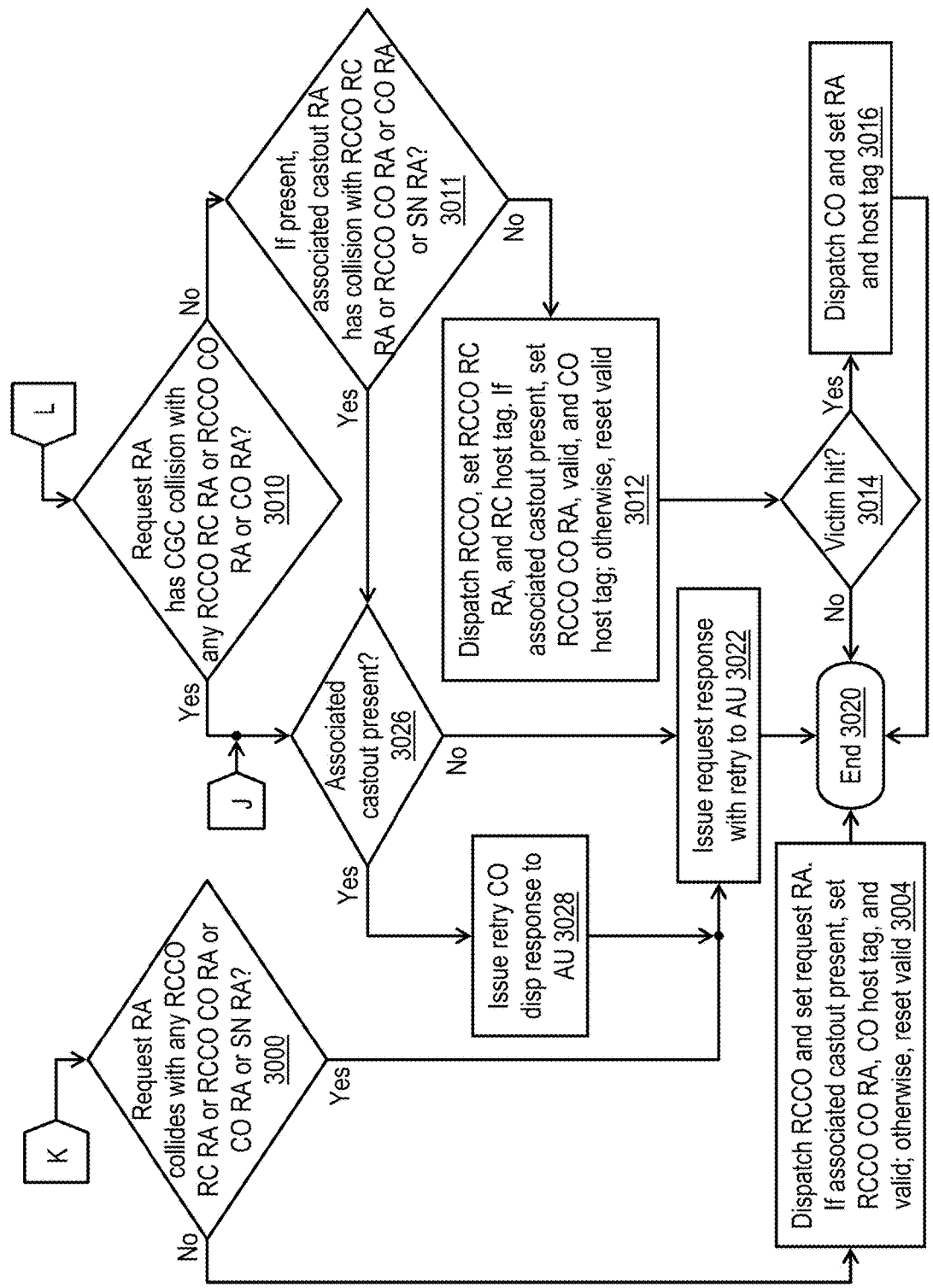

Referring now to FIGS. 29-30, a high-level logical flowchart is given of an exemplary process by which host attach logic 240 handles memory access requests received from an accelerator unit 120 in accordance with one embodiment. The illustrated process can be utilized to handle Read/CO requests 1300, RWITM/CO requests 1400, CO requests 1500, Claim requests 1600, and Kill requests 1700 as previously described.

The process of FIG. 29 begins at block 2900 and then proceeds to block 2902, which illustrates outbound request logic 609 determining whether or not the memory access request received by host attach logic 240 from accelerator unit 120 is a Read/CO request 1300 or a RWITM/CO request 1400 with a valid CO host tag (e.g., as indicated in HTV field 1310 or 1410). If not, the process passes directly to block 2906, which is described below. If, however, outbound request logic 609 makes an affirmative determination at block 2902, meaning that the memory access request includes a castout request, outbound request logic 609 performs a lookup of the real address in RA-based directory 600 utilizing the CO host tag found in A_CO host tag field 1308 or 1408.

At block 2906, outbound request logic 609 determines if a pair of state machines (i.e., an RCCO machine 610 and a CO machine 612) is available for allocation to the memory access request received from accelerator unit 120. If not, the process passes through page connector J to block 3026 of FIG. 30, which illustrates outbound request logic 609 determining whether or not the memory access request has an associated castout request. If so, outbound request logic 609 issues to accelerator unit 120 a CO dispatch response 2000 indicating retry in result field 2006 (block 3028). This CO dispatch response 2000 informs accelerator unit 120 that the memory access request can optionally be re-presented. The process of FIG. 30 thereafter passes to block 3022, which is described below. Returning to block 2906 of FIG. 29, in response to determining that a RCCO machine 610 and a CO machine 612 are available for allocation to the memory access request of accelerator unit 120, the process proceeds in parallel from block 2906 to block 2910 and following blocks and to block 2920 and following blocks.

At block 2910, outbound request logic 609 performs a lookup within RA-based directory 600 of the request real address obtained from translation of the request EA contained in the EA field 1306, 1406, 1606, or 1706 of the memory access request. At block 2912, outbound request logic 609 determines if the request real address hit in RA-based directory 600. If so, outbound request logic 609 records a hit for the request real address in RA-based directory 600, the host tag of the relevant entry 702, and the coherence state indicated by state field 804 of the relevant entry 702 of RA-based directory 600 (block 2914). If outbound request logic 609 instead determines at block 2912 that the request real address of the memory access request missed in RA-based directory 600, outbound request logic 609 records a miss and an invalid coherence state for the request real address of the memory access request (block 2916). Following either block 2914 or 2916, the process proceeds to join point 2930.

Referring now to block 2920, outbound request logic 609 also selects a potential victim entry 702 in the congruence class (CGC) 700 identified by the request real address of the memory access request, in the event that servicing the memory access request requires a castout of an entry 702 from the relevant congruence class 700. The potential victim entry 702 can be selected using, for example, a least recently used (LRU) or other algorithm, but preferably preferentially selects as a potential victim an invalid entry 702 of the congruence class 700, if present. Outbound request logic 609 also performs a lookup of the potential victim entry 702 within RA-based directory 600 at block 2920. At block 2922, outbound request logic 609 determines by reference to valid field 800 whether or not the potential victim entry 702 is valid. If so, outbound request logic 609 records a hit for the potential victim entry 702, the real address and host tag of the potential victim entry 702, and the coherence state indicated by state field 804 (block 2924). If outbound request logic 609 instead determines at block 2922 that the potential victim entry 702 in RA-based directory 600 is invalid, outbound request logic 609 records a miss and an invalid coherence state for the potential victim entry 702 (block 2926). Following either block 2924 or 2926, the process proceeds to join point 2930.

Once both branches of the process in FIG. 29 reach join point 2930, outbound request logic 609 handles the memory access request of accelerator unit 120 based on whether the request real address of the memory access request hit in RA-based directory 600 (block 2932). In particular, if the request real address hit in RA-based directory 600 (as will be the case for all Claim requests and Kill requests), the process passes through page connector K to block 3000 of FIG. 30. It should be noted that a hit for a Read/CO or RWITM/CO request means that the request EA of the memory access request is aliased and is one of multiple EAs associated with the same RA. If, however, the request real address of the memory access request missed in RA-based directory 600 (which can be the case for Read/CO and RWITM/CO requests, but not Castout, Claim or Kill requests), the process passes through page connector L to block 3010 of FIG. 30.

Referring now to block 3000 of FIG. 30, outbound request logic 609 determines whether or not the request real address of the memory access request collides with (i.e., falls within the same cache line as) an RCCO RC RA 2812, RCCO CO RA 2816, CO RA 2830, or SN RA 2840 currently being handled by any RCCO machine 610, CO machine 612, or SN machine 614. In response to detection of a collision at block 3000, outbound request logic 609 issues to accelerator unit 120 a request response 1800, 1900, 2100, or 2200 indicating retry in result field 1810, 1908, 2106, or 2206 (block 3022). Thereafter, the process of FIG. 30 ends at block 3020. If, however, no RA collision is detected at block 3000, outbound request logic 609 dispatches the RCCO machine 610 allocated to handle the memory access request (block 3004). In addition, at block 3004, outbound request logic 609 sets the values of RCCO RC RA 2812 for the dispatched RCCO machine 610, and if the memory access request is a Read/CO request 1300 or RWITM/CO request 1400 that also requests castout of a valid cache line, sets valid field 2818 to a valid state and loads the real address of the castout cache line in RCCO CO RA 2816. The process performed by the RCCO machine 610 to handle the memory access request is described in greater detail below with reference to FIGS. 31-32. Following the dispatch of the RCCO machine 610 at block 3004, the process of FIG. 30 ends at block 3020.

With reference now to block 3010 of FIG. 30, outbound request logic 609 determines whether or not the request real address of the memory access request (which was a Read/CO request or RWITM/CO request whose request real address missed in RA-based directory 600) has a congruence class collision with (i.e., maps to the same congruence class as) an RCCO RC RA 2812 or RCCO CO RA 2816 of a memory access request currently being handled by any RCCO machine 610 or the CO RA 2830 of a castout being handled by any CO machine 612. In response to detection of a congruence class collision at block 3010, outbound request logic 609 also determines at block 3026 whether or not the Read/CO request or RWITM/CO request included a request to castout an entry 400 from accelerator cache 302 as indicated by HTV field 1310 or 1410 being set. In response to an affirmative determination at block 3026, outbound request logic 609 issues a CO dispatch response 2000 indicating retry in result field 2006 (block 3028). This CO dispatch response 2000 indicates to the relevant A_CO 312 that its requested castout failed. Following block 3028 or in response to a negative determination at block 3026, outbound request logic 609 issues to accelerator unit 120 a request response 1800 or 1900 indicating a retry in result field 1810 or 1908 (block 3022). This request response indicates that accelerator unit 120 may optionally present the memory access request again to host attach logic 240.

Referring again to block 3010, if no congruence class collision is detected, outbound request logic 609 also determines at block 3011 whether or not the real address of the castout, if any, requested by the Read/CO or RWITM/CO request has a collision with (is within the same cache line as) the RCCO RC RA 2812 or RCCO CO RA 2816 of a memory access request currently being handled by any RCCO machine 610 or the CO RA 2830 of a castout being handled by a CO machine 612 or the SN RA 2840 of a snooped memory access request being handled by a SN machine 614. In response to detection of an RA collision at block 3011, the process passes to block 3026 and following blocks, which have been described. If, however, no collision is detected at block 3011, outbound request logic 609 dispatches the allocated RCCO machine 610 to handle the memory access request (block 3012). In addition, at block 3012, outbound request logic 609 sets the values of RCCO RC RA 2812, and, if an associated castout is not present, resets valid field 2818 to an invalid state to indicate that RCCO CO RA 2816 is invalid. If an associated castout is present, as indicated by HTV field 1310 of a Read/CO request 1300 or HTV field 1410 of a RWITM/CO request 1400 being set, outbound request logic 609 sets RCCO CO RA 2816 to the CO RA retrieved in block 2924 from RA directory 600 and sets valid field 2818 to a valid state to indicate that RCCO CO RA 2816 is valid. At block 3014, outbound request logic 609 determines whether or not a victim hit was recorded for the potential victim entry 702 at block 2924 of FIG. 29. If not, the process of FIG. 30 ends at block 3020 without a CO machine 614 performing any castout from RA-based directory 600. If, however, outbound request logic 609 determines at block 3014 that a victim hit was recorded for the potential victim entry 702 at block 2924 of FIG. 29, outbound request logic 609 dispatches the CO machine 612 paired with the RCCO machine 610 handling the memory access request and sets the value of the associated CO RA 2830. The dispatched CO machine 612 performs a castout from RA-based directory 600 as described in greater detail below with reference to FIGS. 33-35. Following the dispatch of the CO machine 612 at block 3016, the process of FIG. 30 ends at block 3020.

Figure 33:
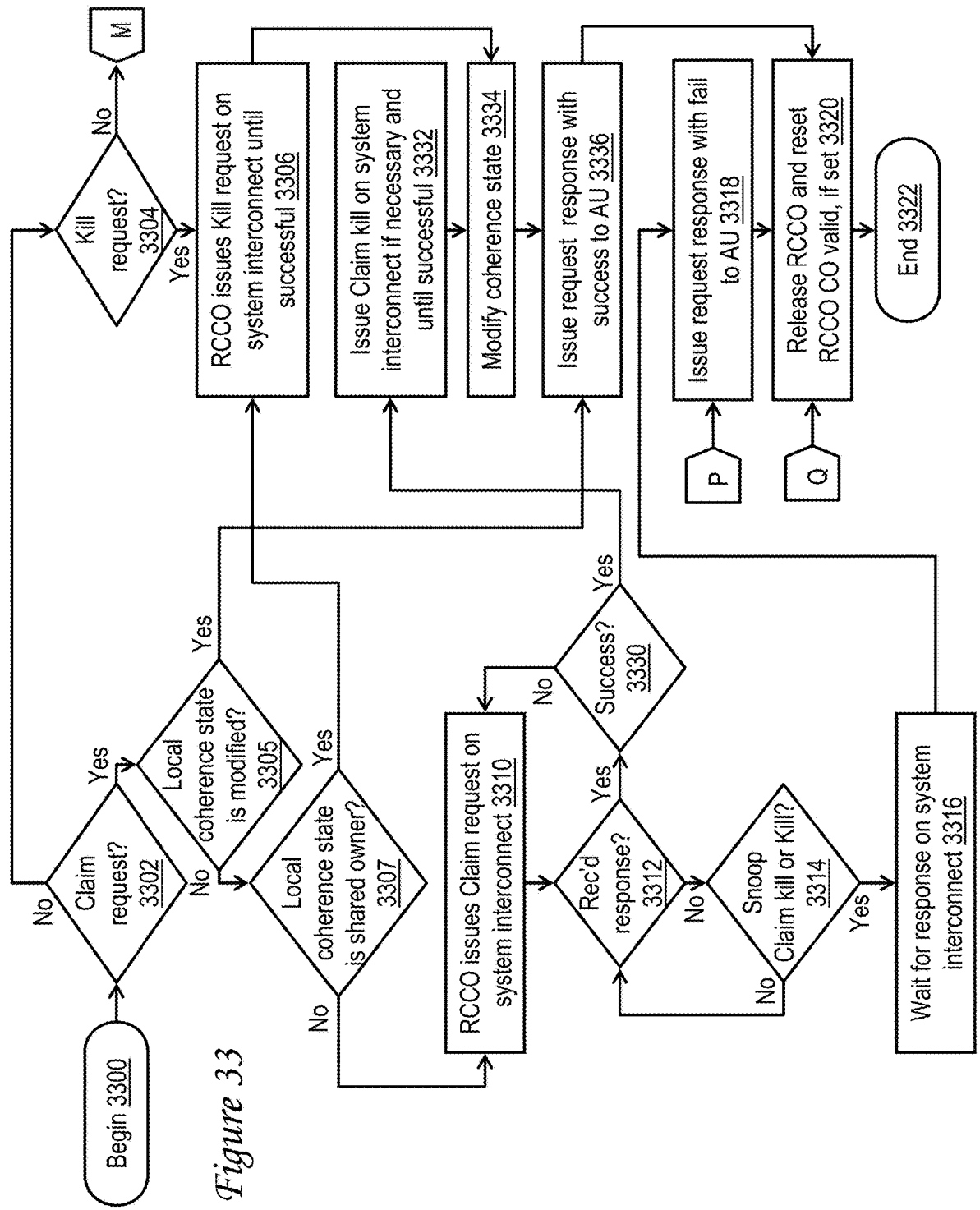
FIGS. 33-35 together form a high-level logical flowchart of an exemplary process by which host attach logic issues a Read, RWITM, Claim, or Kill request on a system interconnect of a coherent data processing system on behalf of the AU in accordance with one embodiment.
Figure 34:
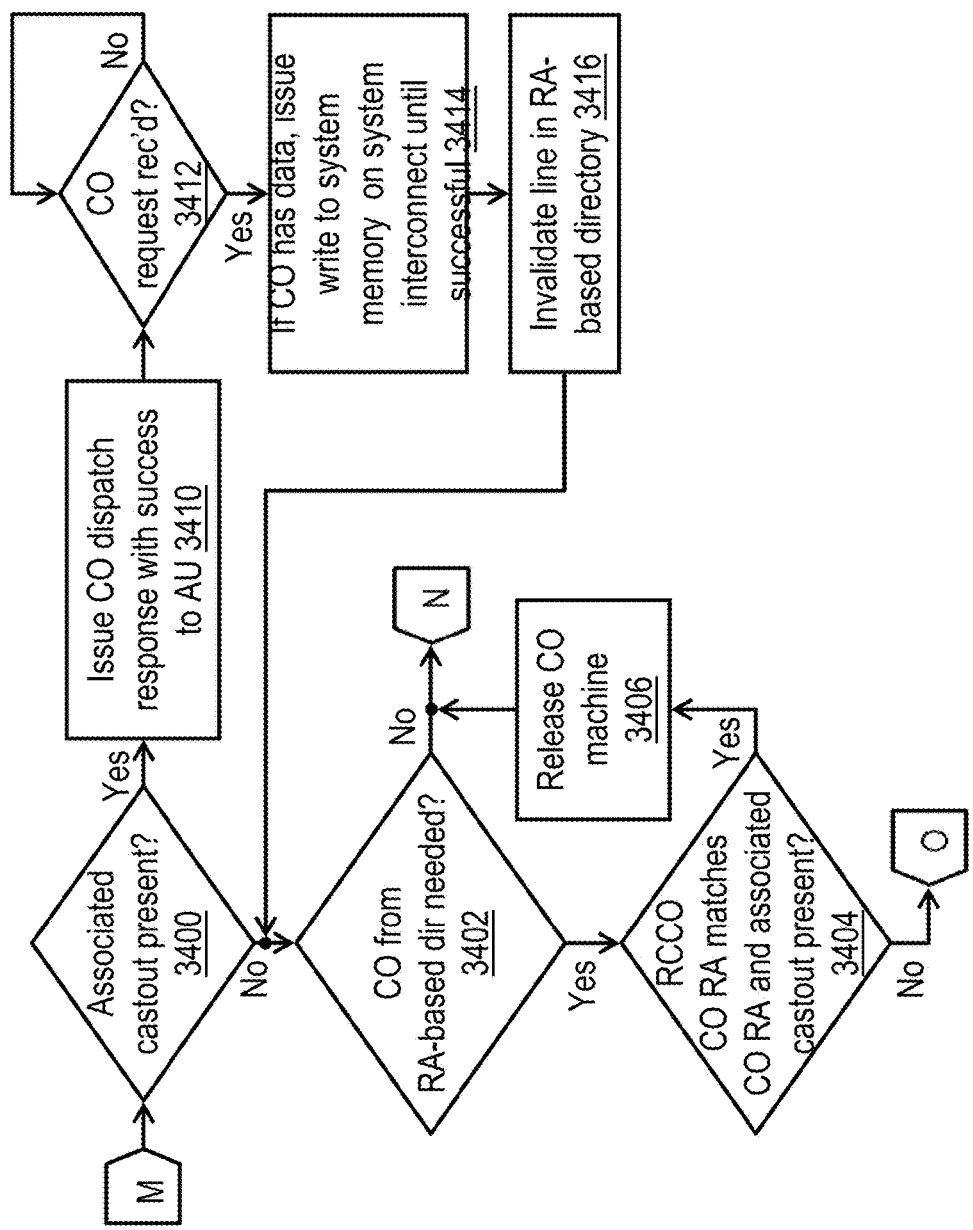
Figure 35:
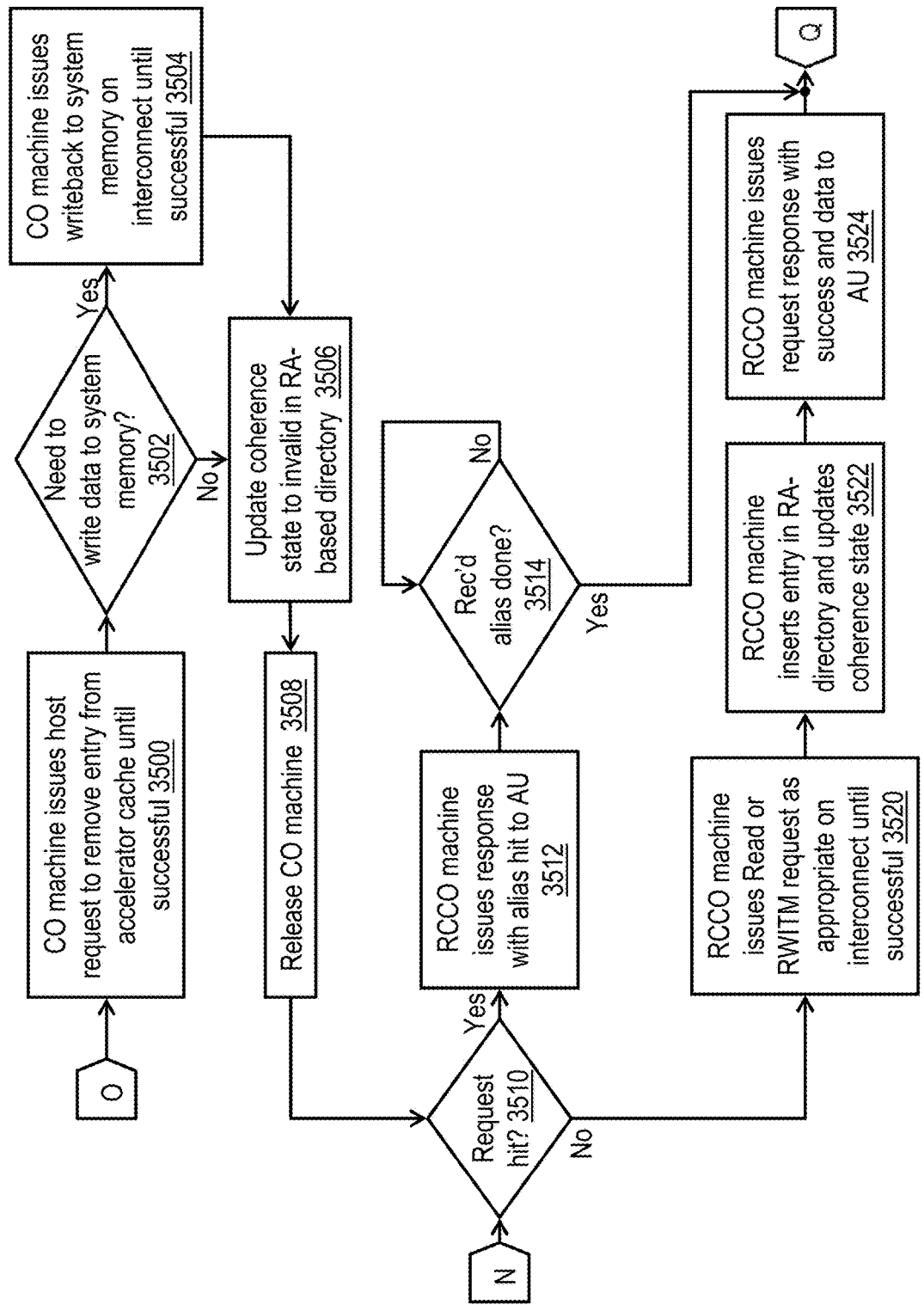

With reference now to FIGS. 33-35, there is illustrated a high-level logical flowchart of an exemplary process by which host attach logic 240 issues a Read, RWITM, Claim, or Kill request on behalf of an associated accelerator unit 120 on system interconnect 110 of data processing system 100 in accordance with one embodiment. The process begins at block 3300, for example, in response to dispatch of a RCCO machine 610 and, if necessary, a CO machine 612 to service a memory access request of accelerator unit 120 at block 3004, 3012, or 3016 of FIG. 30. The process proceeds from block 3300 to blocks 3302 and 3304, which together illustrate the RCCO machine 610 allocated to handle the memory access request of the accelerator unit 120 determining the type of the memory access request. In response to determination that the memory access request is a Claim request 1600, the process passes to block 3305 and following blocks. If the memory access request is a Kill request 1700, the process passes to block 3306 and following blocks. If, the memory access request is neither a Claim request 1600 nor a Kill request 1700, meaning that the request is a Read/CO request 1300 or RWITM/CO request 1400, the process passes through page connector M to block 3400 of FIG. 34 and following blocks.

Referring now to block 3302, in response to a determination that the memory access request to be handled is a Claim request 1600 of accelerator unit 120, the RCCO machine 610 determines if the local coherence state for the target cache line (i.e., the state indicated by state field 804 of the relevant entry in RA-based directory 600) is modified, meaning that accelerator cache 302 holds a unique copy of the target cache line at an alias root entry of accelerator cache 302. If so, RCCO machine 610 refrains from issuing any request corresponding to the Claim request 1600 on system interconnect 110, and instead simply issues to accelerator unit 120 a Claim response 2100 indicating success in result field 2106 (block 3336). Thereafter, the process passes to block 3320, which is described below.

Returning to block 3305, if RCCO machine 610 determines that the local coherence state for the target cache line is not modified, RCCO machine 610 additionally determines at block 3307 if the local coherence state is a shared owner coherence state, meaning that accelerator cache 302 already holds authority to update the target cache line at an alias root entry 400. In response to an affirmative determination at block 3307, RCCO machine 610 issues on system interconnect 110 until successful a Kill request specifying as a target address RCCO RC RA 2812 (block 3306). A Kill request is issued on system interconnect 110 rather than a Claim request corresponding to the Claim request 1600 received from accelerator unit 120 because accelerator cache 120 already holds write authority for the target cache line, but must invalidate any extant shared copies of the target cache line. Following block 3306, the process passes to block 3334, which is described below.

In response to negative determinations at both of blocks 3305 and 3307, the RCCO machine 610 issues on system interconnect 110 a Claim request specifying as a target address RCCO RC RA 2812 (block 3310). RCCO machine 610 then monitors to detect receipt of a systemwide coherence response to the Claim request on system interconnect 110 (block 3312). If a systemwide coherence response is received, the process passes to block 3330, which is described below. If, however, no systemwide coherence response to the Claim request is yet received, RCCO machine 610 also determines at block 3314 whether or not a Claim kill request or a Kill request specifying the same target address as the Claim request has been snooped on system interconnect 110. Receipt of such a Claim kill request or Kill request indicates that another coherence participant competing for coherence ownership of the target cache line of the Claim request has obtained coherence ownership of the cache line, and the Claim request will accordingly fail. In response to negative determination at block 3314, the process of FIG. 33 returns to block 3312, which has been described.

If, however, a Claim kill request or Kill request targeting the same cache line as the Claim request is detected at block 3314 prior to receipt the systemwide coherence response for the Claim request, RCCO machine 610 awaits receipt of the systemwide coherence response to the Claim request on system interconnect 110 (block 3316) and then issues to accelerator unit 120 a Claim response 2100 indicating failure of the Claim request in result field 2106 (block 3318). Outbound request logic 609 then releases RCCO machine 610 to return to an unbusy state and resets RCCO CO host tag valid field 2820 (block 3320). Thereafter, the process of FIG. 33 ends at block 3322.

Returning to block 3330, in response to receipt of the systemwide coherence response to the Claim request, RCCO machine 610 determines if the systemwide coherence response indicates success of the Claim request, that is, whether the systemwide coherence response indicates that accelerator unit 120 has been granted coherence ownership of the target cache line of the Claim request. If not, the process returns to block 3310 and following blocks, which have been described. If, however, the systemwide coherence response for the Claim request indicates success of the Claim request, RCCO machine 610, if indicated as necessary by the systemwide coherence response, issues on system interconnect 110 one or more Claim kill requests to invalidate any other cached copies of the target cache line of the Claim request (block 3332). Following success of the Claim kill request(s), if necessary, RCCO machine 610 modifies the coherence state of the target cache line of the Claim request in RA-based directory 600, for example, to a Modified coherence state (block 3334). RCCO machine 610 then issues to accelerator unit 120 a Claim response 2100 indicating success in result field 2106 (block 3336). Thereafter, the process passes to block 3320, which has been described.

Referring now to block 3304, in response to a determination that the memory access request to be handled is a Kill request 1700, RCCO machine 610 issues a corresponding Kill request on system interconnect 110 one or more times until a systemwide coherence response is received indicating success of the Kill request in invalidating any other cached copies of the target cache line of the Kill request (i.e., other than the copy held by accelerator cache 302) (block 3306). Following success of the Kill request(s), RCCO machine 610 modifies the coherence state of the target cache line of the Claim request 1700 in RA-based directory 600, for example, to a Modified coherence state (block 3334). RCCO machine 610 then issues to accelerator unit 120 a Kill response 2200 indicating success in result field 2206 (block 3336). Thereafter, the process passes to block 3320, which has been described.

Referring now to block 3400 of FIG. 34, RCCO machine 610 determines whether or not valid field 2818 is set to indicate that the Read/CO request 1300 or RWITM/CO request 1400 to be handled has an accompanying castout request from accelerator cache 302. If so, the process passes to block 3410, which is described below. If, however, a negative determination is made at block 3400, RCCO machine 610 additionally determines at block 3402 whether or not a castout from RA-based directory 600 is needed to accommodate a new entry 702 for the target cache line of the Read/CO request 1300 or RWITM/CO request 1400. If not, meaning that the relevant congruence class 700 of RA-based directory 600 contains at least one invalid entry 702, the process passes through page connector N to block 3510 of FIG. 35, which is described below. If, however, RCCO machine 610 determines at block 3402 that a castout from RA-based directory 600 is needed, RCCO machine 610 also determines at block 3404 whether RCCO CO RA 2816 of RCCO machine 610 is present and valid and matches CO RA 2830 of CO machine 612, meaning that both RCCO machine 610 and CO machine 612 are intending to perform a castout of the same entry 702 of RA-directory 600. In response to an affirmative determination at block 3404, the CO machine 612 allocated with the RCCO machine 610 at block 2906 is released (block 3406) since the castout has already been handled by RCCO machine 610 at blocks 3414-3416 (described below), and the process passes through page connector N to block 3510 of FIG. 35. If, however, a negative determination is made at block 3404, the process passes through page connector O to block 3500 of FIG. 35.

With reference now to block 3410, RCCO machine 610 issues to accelerator unit 120 a CO dispatch response 2000 indicating success in result field 2006. RCCO machine 610 then awaits receipt of a CO request 1500 from accelerator unit 120, as described above with reference to block 2310 of FIG. 23 (block 3412). In response to receipt of the CO request 1500 from accelerator unit 120, the process proceeds to block 3414. Block 3414 depicts RCCO machine 610 determining by reference to data valid field 1510 if the CO request 1500 contains data to be written to system memory, and if so, issuing on system interconnect 110 a writeback request writing the data from data field 1508 back to system memory 106 until the writeback is successful. No writeback is issued at block 3414 if data valid field 1510 has an invalid state. Following block 3414, RCCO machine 610 invalidates the entry 702 associated with the castout cache line in RA-based directory 600 (block 3416). The process then proceeds to block 3402 and following blocks, which have been described.

With reference now to block 3500 of FIG. 35, the CO machine 612 allocated to handle the castout from RA-based directory 600 issues to accelerator unit 120 a host request 3100 requesting eviction from accelerator cache 302 of the cache line corresponding to the entry 702 to be evicted from RA-based directory 600. The host request 3100 identifies the CO machine 612 issuing the request in machine number field 3102, indicates a CO machine 612 in machine type field 3104, specifies the request type as a castout in request type field 3106, and identifies the cache line to be castout by placing CO host tag 2820 in host tag field 3108. As indicated in block 3500, host attach logic 240 iteratively issues such a host request 3100 to accelerator unit 120 until a matching host request response 3200 (i.e., one having a matching machine number field 3202 and machine type field 3204) is received that from accelerator unit 120 having a result field 3208 indicating success. Based on the data valid (DV) field 3212, which indicates if data field 3210 contains valid data, CO machine 612 determines at block 3502 whether or not an update of system memory 106 is required. If so, CO machine 612 issues a writeback request to system memory 106 on system interconnect 110 one or more times until the writeback request is successful in updating system memory with the data contained in data field 3210 of the host request response 3200 (block 3504). Following block 3504 or in response to a negative determination at block 3502, CO machine 612 updates the coherence state for the castout cache line in RA-based directory 600 to an invalid coherence state (block 3506). The CO machine 612 is then released to return to an unbusy state (block 3508), and the process proceeds to block 3510.

At block 3510, the RCCO machine 610 allocated to handle the Read/CO request 1300 or RWITM/CO request 1400 of accelerator unit 120 determines whether or not the real address of the memory access request hit in RA-based directory 600 at block 2932, meaning that the real address is aliased (i.e., multiple EAs in accelerator cache 302 map to the same real address). If not, the process proceeds from block 3510 to block 3520 and following blocks, which are described below. If, however, a hit was recorded for the request RA at block 2932, the process proceeds to block 3512 and following blocks. At block 3512, RCCO machine 610 issues to accelerator unit 120 a request response 1800 or 1900 indicating an alias hit in result field 1810 or 1908, as discussed above with reference to block 1115 of FIG. 11 and block 1224 of FIG. 12. As indicated in block 3512, host attach logic 240 then awaits receipt of an Alias Done response 3800 from accelerator unit 120, as discussed above with reference to block 3710 of FIG. 37. In response to receipt of the Alias Done response 3800, the process passes through page connector Q to block 3320 of FIG. 33, which has been described.

Referring now to block 3520, RCCO machine 610 issues a Read request or RWITM request as requested by accelerator unit 120 on system interconnect 110 until a system-wide coherence response indicating success is received. RCCO machine 610 inserts an entry 702 for the cache line of data returned in conjunction with the Read or RWITM request into RA-based directory 600 (noting the corresponding host tag 702) and sets the coherence state field 804 appropriately, given the implemented coherence protocol (block 3522). RCCO machine 610 then issues a Read response 1800 or RWITM response 1900 containing the requested cache line of data to accelerator unit 120, as appropriate (block 3524). As indicated in FIGS. 18 and 19, the request response identifies the cache line of data by the host tag noted previously and specified in host tag field 1812 or 1910 rather than with the RA. As noted above, the request EA 500 of the memory access request is held by the A_RC machine 310. When A_RC machine 310 receives request response 1800 or 1900, A_RC machine 310 connects the request EA 500 with the host tag and places the host tag in host tag field 408 of the relevant entry 400 of EA-based directory 306. Following block 3524, the process passes through page connector Q to block 3320 of FIG. 33, which has been described.

Figure 36:
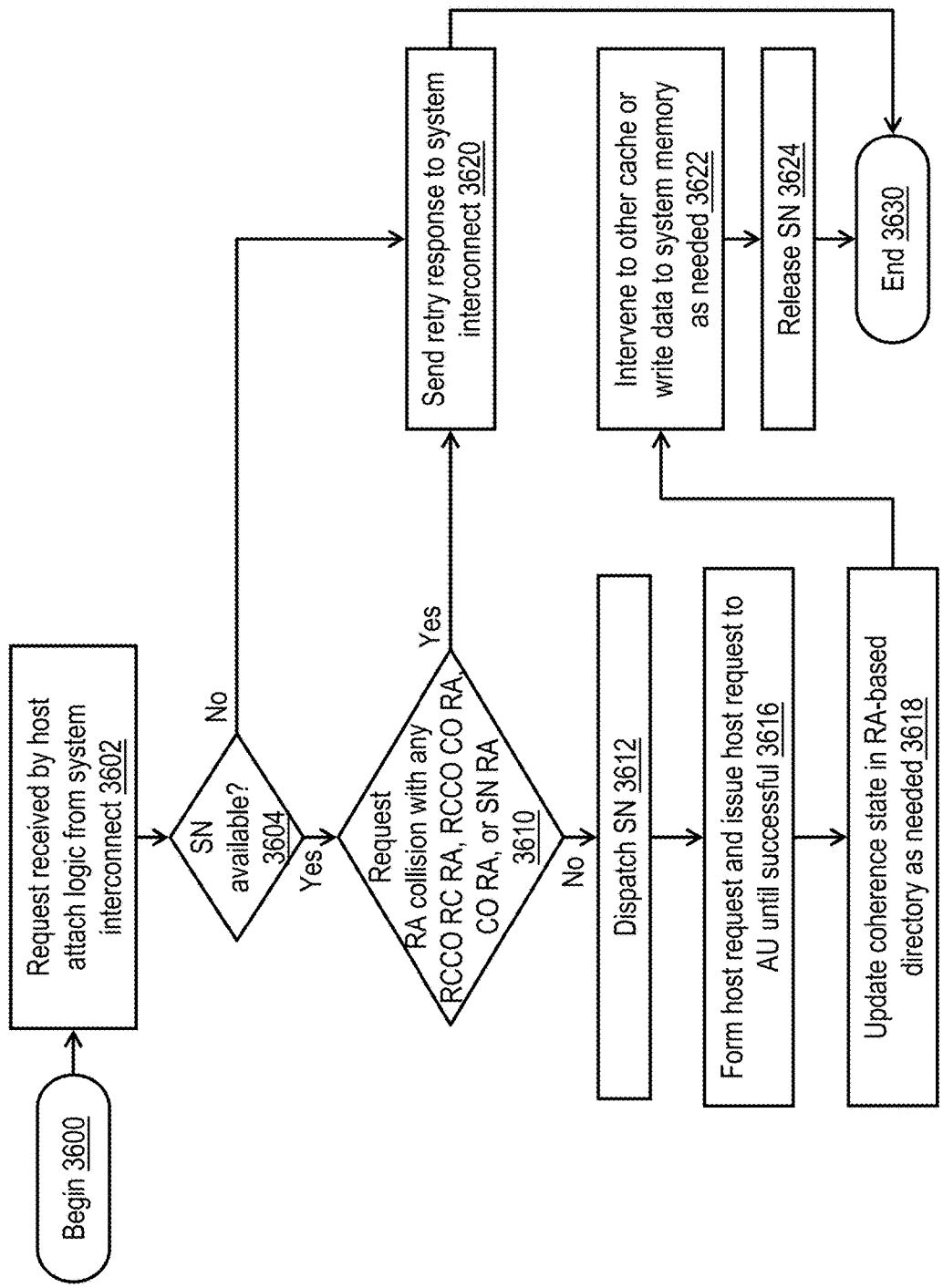
FIG. 36 is a high-level logical flowchart of an exemplary process by which a snoop (SN) machine of the host attach logic processes a snooped memory access request in accordance with one embodiment.

Referring now to FIG. 36, there is depicted a high-level logical flowchart of an exemplary process by which a snoop (SN) machine of host attach logic 240 processes a snooped memory access request in accordance with one embodiment. The process begins at block 3600 and then proceeds to block 3602, which illustrates inbound request logic 613 of host attach logic 240 snooping a memory access request on system interconnect 110. The memory access request can be initiated, for example, by a master 212 of an L2 cache 210 in any of processing units 102 or by an RCCO machine 610. In response to receipt of the snooped memory access request, inbound request logic 613 determines at block 3604 whether or not a SN machine 614 is in an unbusy (idle) state and thus available to handle the snooped memory access request. If not, inbound request logic 613 provides a retry response on system interconnect 110 (block 3620), and the process of FIG. 36 ends at block 3630.

Returning to block 3604, in response to inbound request logic 613 determining at block 3604 that a SN machine 614 is available for allocation to handle the snooped memory access request, inbound request logic 613 additionally determines at block 3610 whether or not the RA specified by the snooped memory access request collides with (falls within the same cache line as) any RCCO RC RA 2812, RCCO CO RA 2816, CO RA 2830, or SN RA 2840. If so, the process passes to block 3620, which has been described. If, however, no RA collision is detected at block 3610, inbound request logic 613 dispatches an available SN machine 614 to handle the received memory access request (block 3612). The SN machine 614 handles the request, for example, by, among other possible activities, forming an appropriate host request 3100 and issuing the host request 3100 to accelerator unit 120 (block 3616). As indicated, the host request 3100 is issued until a host request response 3200 indicating success in result field 3208 is received. The host request 3100 may, for example, request a shared copy of a target cache line, request invalidation or other coherence state update for a target cache line, etc. At block 3618, the SN machine 614 also updates the coherence state recorded for the target cache line of the snooped memory access request in RA-based directory 600 as needed. As indicated at block 3622, SN machine 614 may also intervene a copy of the target cache line (received from accelerator cache in data field 3210 of host request response 3200) to another cache or write the cache line data to system memory 110 as needed to handle the snooped memory access request. Following block 3622, the SN machine 614 is released to return to an unbusy (idle) state (block 3624), and the process of FIG. 36 ends at block 3630.

Figure 41:
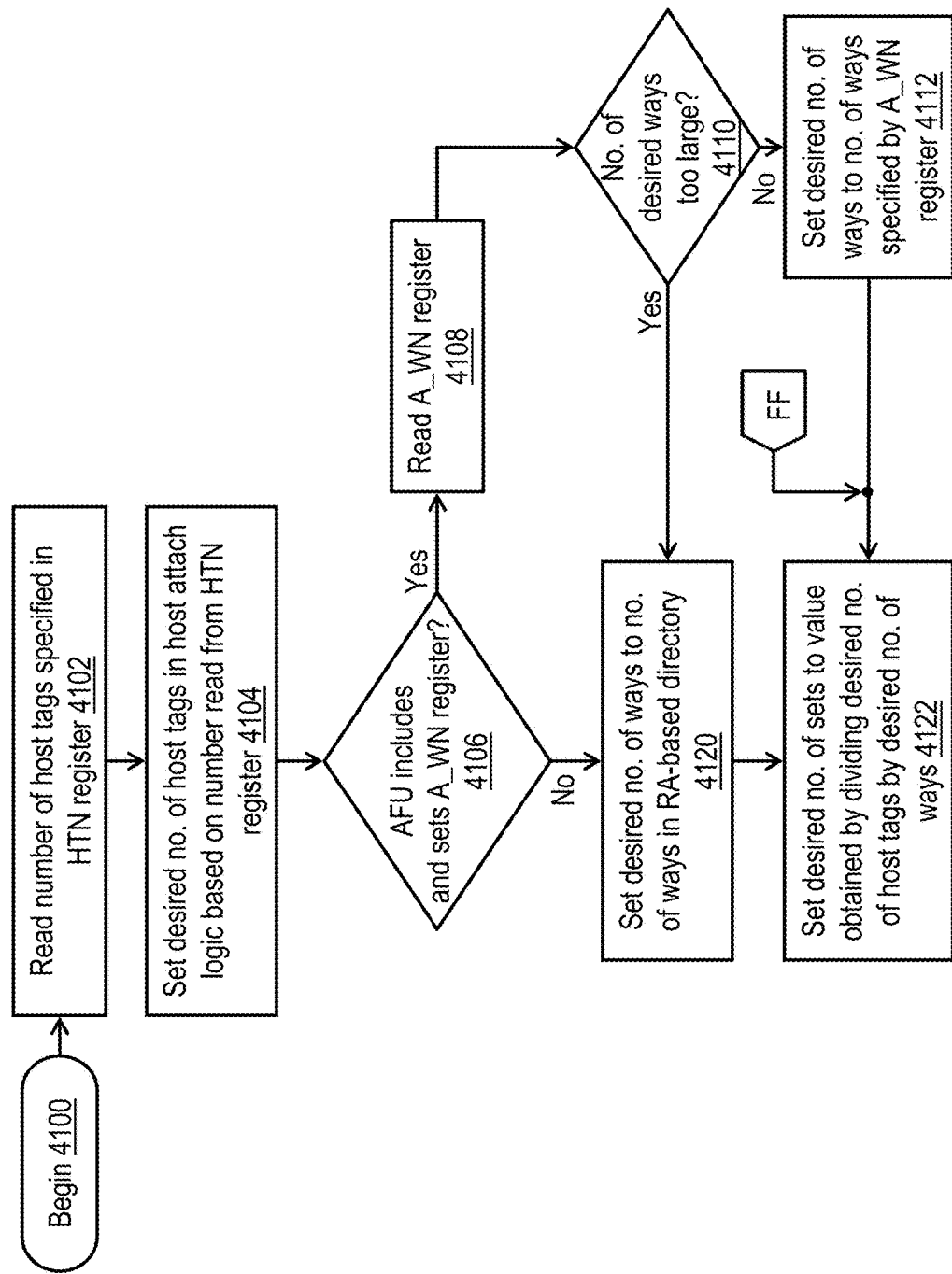
FIGS. 41-42 together form a high-level logical flowchart of an exemplary process by which the dimensions of an accelerator cache and a corresponding directory in host attach logic are configured in accordance with one embodiment.
Figure 42:
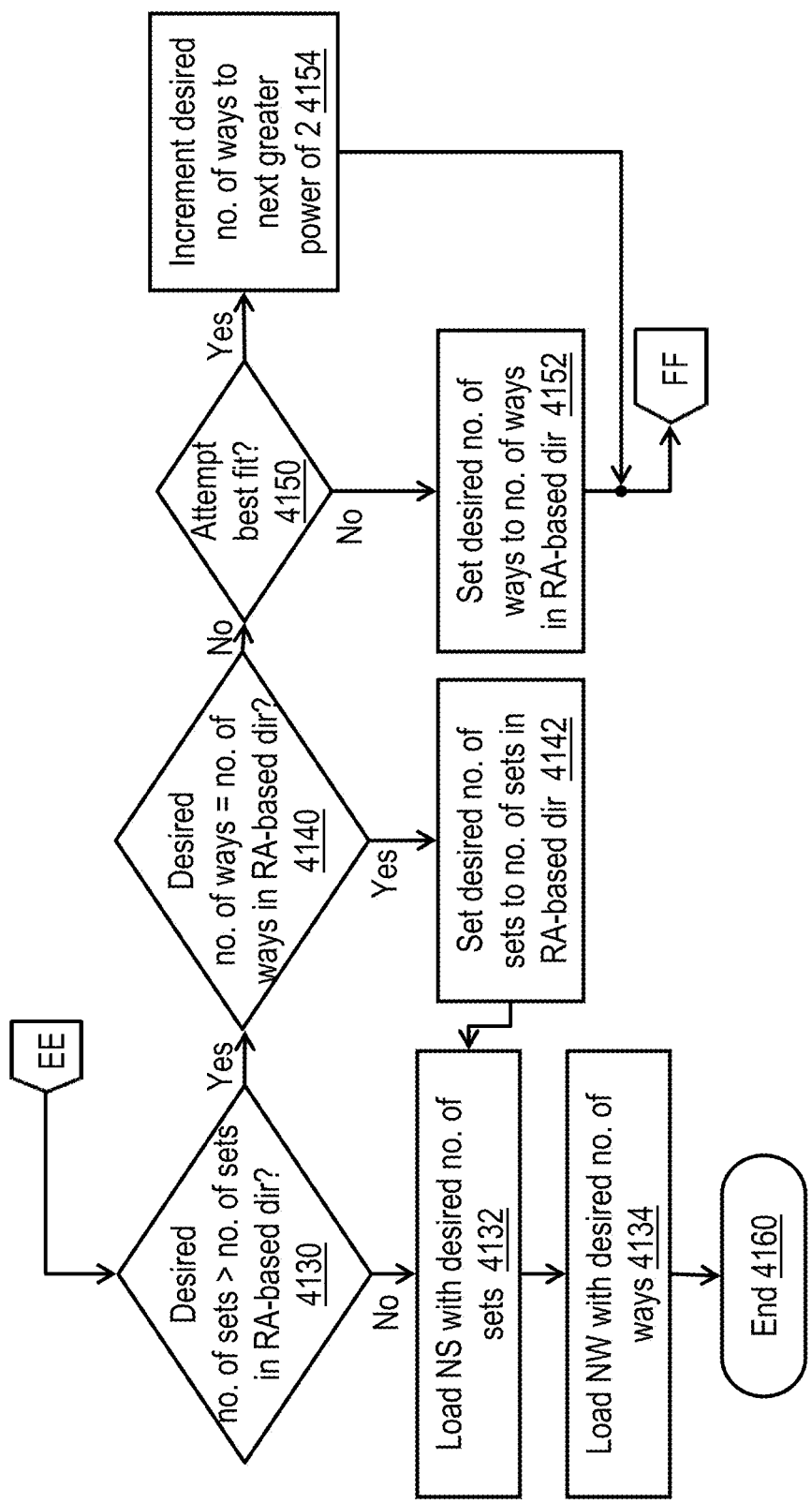

With reference now to FIGS. 41-42, a high-level logical flowchart of an exemplary process is illustrated by which the dimensions of RA-based directory 600 of host attach logic 240 are configured. In various embodiments, the configuration process can be performed in hardware (e.g., by directory control logic 640 and/or by software and/or firmware).

The configuration process begins at block 4100 and then proceeds to block 4102, which illustrates directory control logic 640 of host attach logic 240 reading a desired number of host tags for accelerator cache 302, for example, by reading host tag number (HTN) register 332 of accelerator unit 120 via host interface 116. As noted above, the value specified in HTN register 332 can be specified by AFU 300 at or after setup of data processing system 100. Based on the positive integer value N read from HTN register 332, directory control logic 640 sets a variable specifying a desired number of host tags to $2^N$ (block 4104).

The process proceeds from block 4104 to block 4106, which depicts a determination of whether or not accelerator unit 120 has specified a desired number of ways to be implemented in RA-based directory 600, for example, by implementing optional A_WN register 334 and setting A_WN register 334 to a positive integer value. If a determination is made at block 4106 that accelerator unit 120 has not specified a desired number of ways, the process passes to block 4120, which illustrates setting a variable specifying a desired number of ways to the physically determined maximum number of ways implemented in RA-based directory 600. The configuration process then passes to block 4122, which is described below. Returning to block 4106, if a determination is made that accelerator unit 120 has specified a desired number of ways, the desired number of ways specified by accelerator unit 120 is read, for example, by accessing A_WN register 334 (block 4108).

Following block 4108, the configuration process determines at block 4110 whether or not the number of ways specified by accelerator unit 120 is too large, that is, whether $2^N$ (where N is the value read, for example, from A_WN register 334) is greater than the maximum number of ways supported by the physical geometry of RA-based directory 600. If so, the process passes to block 4120, which has been described. If, however, directory control logic 640 determines at block 4110 that the number of ways specified by accelerator unit 120 is not too large, directory control logic 640 sets a variable indicating the desired number of ways to the number of ways specified by accelerator unit 120, for example, in A_WN register 334 (block 4112). The process then passes to block 4122. Block 4122 illustrates directory control logic 640 setting a variable reflecting the desired number of sets to a value obtained by dividing the desired number of host tags (as set at block 4104) by the desired number of ways (as set at block 4120 or block 4112). The configuration process then passes through page connector EE to block 4130 of FIG. 42.

At block 4130, the configuration process determines whether or not the desired number of sets is greater than the physical number of sets in RA-based directory 600 and thus cannot be supported. If not, the configuration process passes to block 4132, which is described below. If, however, the configuration process determines at block 4130 that the desired number of sets is greater than the physical number of sets in RA-based directory 600, the configuration process additionally determines at block 4140 whether or not the desired number of ways has already been set to its maximum possible value, that is, equal to the physical number of ways implemented in RA-based directory 600. If not, the process passes to block 4150, which is described below. If, however, the configuration process determines at block 4140 that the desired number of ways is already set to the maximum value determined by the physical number of ways in RA-based directory 600, the configuration process sets the variable specifying the desired number of sets to the number of physical sets in RA-based directory 600 (block 4142). Thereafter, directory control logic 640 loads NS register 642 with the base 2 logarithm of the value specified by the desired number of sets variable (block 4132) and loads NW register 644 (if present) with the base 2 logarithm of the value specified by the desired number of ways variable (block 4134). The process then ends at block 4160.

As noted above, the configuration process reaches block 4150 if the value of the desired number of sets is too great to be supported by RA-based directory 600 (block 4130) and the value of the desired number of ways has not yet been set to the maximum value determined by the physical size of RA-based directory 600 (block 4140). Accordingly, at block 4150 the configuration process determines whether or not to attempt a best fit of the desired dimensions of RA-based directory 600. If not, the configuration process simply sets the desired number of ways to the maximum value determined by the physical number of ways in RA-based directory 600 (block 4152). If, however, the configuration process determines to attempt a best fit at block 4150, the configuration process increments the desired number of ways to the next greater power of 2 (block 4154). Following either block 4152 or block 4154, the process passes through page connector FF to block 4122 of FIG. 41, which has been described. At the conclusion of the process of FIGS. 41-42, the configuration process has either configured RA-based directory 600 to operate utilizing fewer ways and/or sets than are physically implemented within RA-based directory 600 as requested by accelerator cache 302 or to operate utilizing all of the ways and sets physically implemented within RA-based directory 600.

Figures 43, 44:
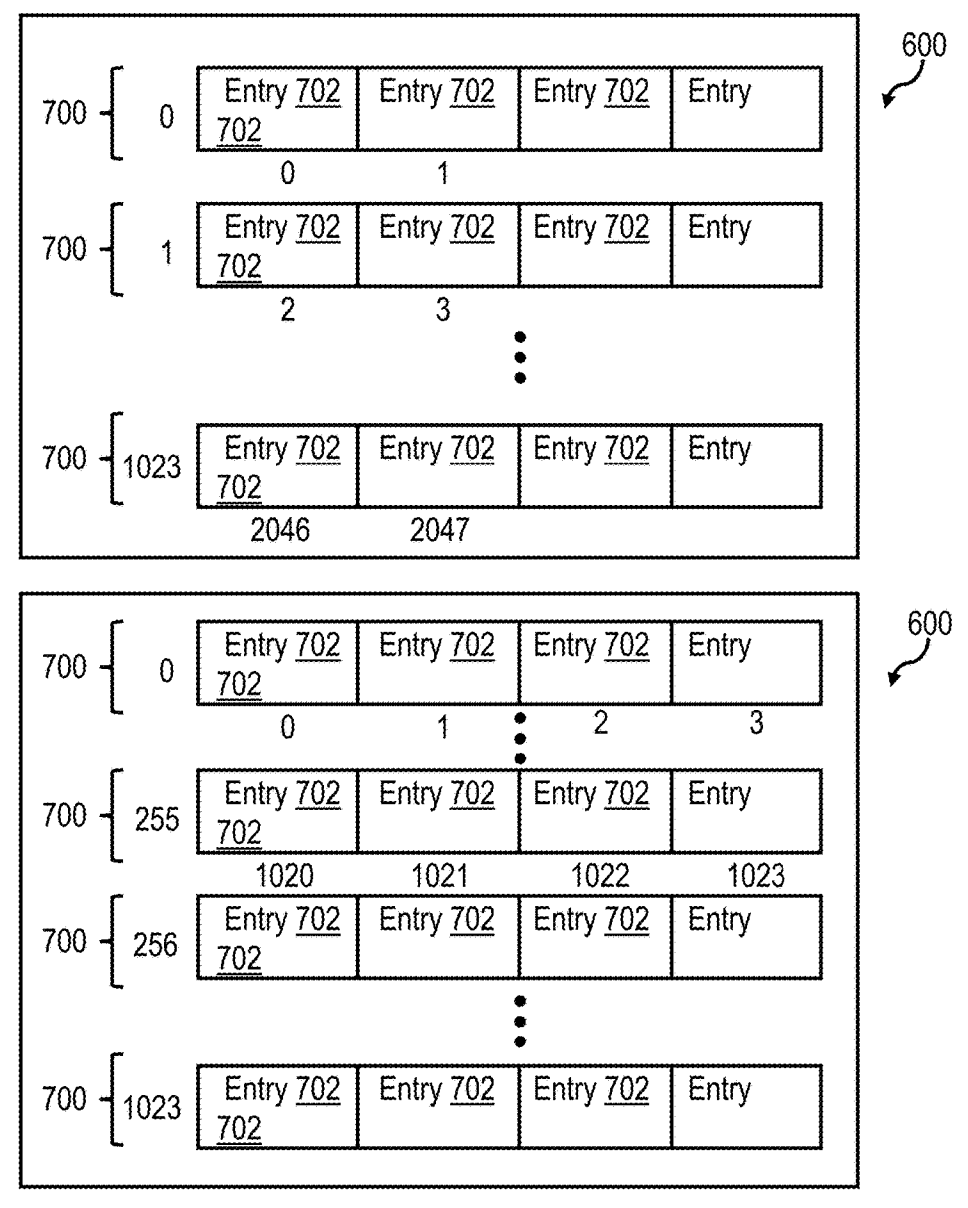
Figure 45:
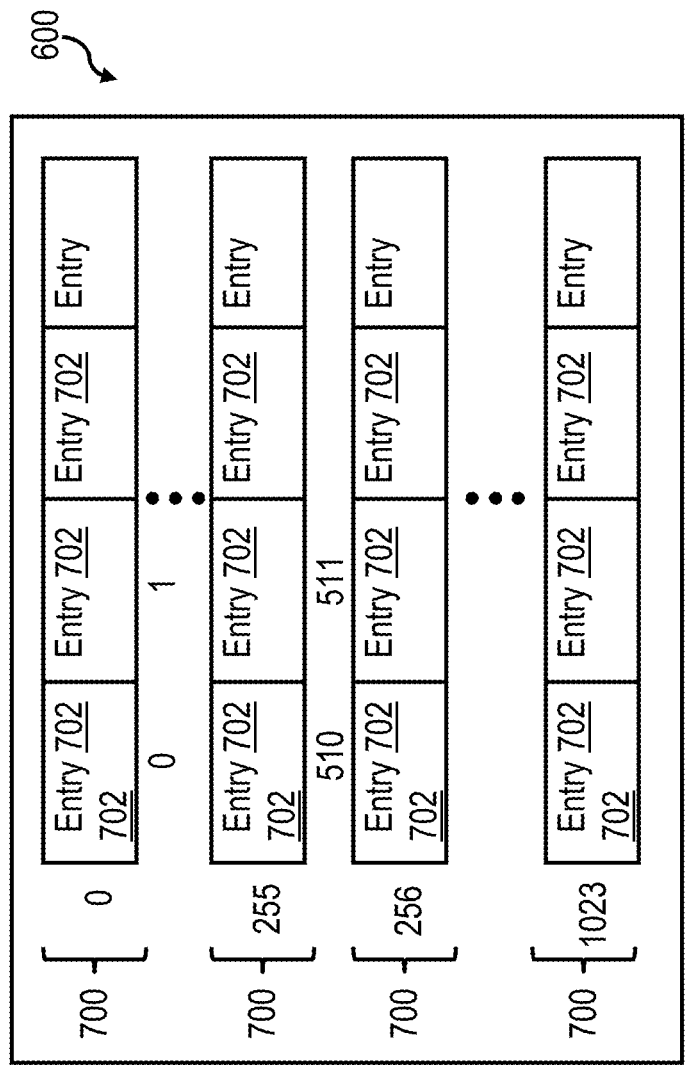

Referring now to FIGS. 43-45, illustrative views of RA-based directory 600 are given, which depict some of the various alternative directory configurations that can be supported in an exemplary system. For example, FIG. 43 illustrates a configuration in which RA-based directory 600, which includes 4096 physical storage locations organized as a four-way set associative cache having 1024 congruence classes, is configured by directory control logic 640 in accordance with the process of FIGS. 41-42 to utilize 2048 storage locations organized as a two-way set associative cache having 1024 congruence classes. As another example, FIG. 44 illustrates an alternative configuration in which RA-based directory 600 is configured by directory control logic 640 in accordance with the process of FIGS. 41-42 to utilize 1024 storage locations organized as a four-way set associative cache having 256 congruence classes. FIG. 45 depicts yet another example in which RA-based directory 600 is configured by directory control logic 640 in accordance with the process of FIGS. 41-42 to utilize 512 storage locations organized as a two-way set associative cache having 256 congruence classes.

Figure 46:
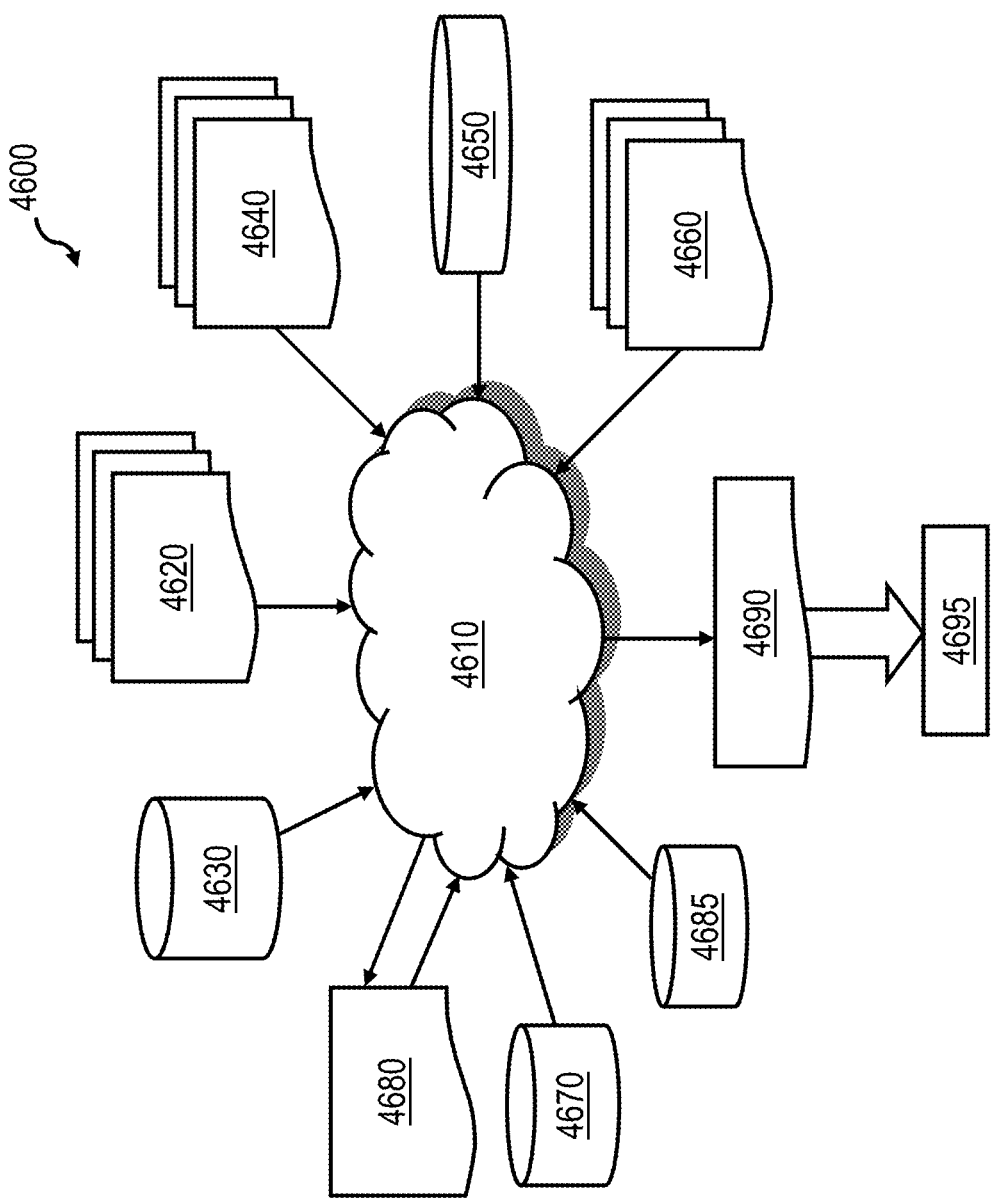
FIG. 46 is a data flow diagram of an exemplary design process.

With reference now to FIG. 46, there is illustrated a block diagram of an exemplary design flow 4600 used for example, in semiconductor IC logic design, simulation, test, layout, and manufacture. Design flow 4600 includes processes, machines and/or mechanisms for processing design structures or devices to generate logically or otherwise functionally equivalent representations of the design structures and/or devices described above. The design structures processed and/or generated by design flow 4600 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 4600 may vary depending on the type of representation being designed. For example, a design flow 4600 for building an application specific IC (ASIC) may differ from a design flow 4600 for designing a standard component or from a design flow 4600 for instantiating the design into a programmable array, for example a programmable gate array (PGA) or a field programmable gate array (FPGA) offered by Altera® Inc. or Xilinx® Inc.

FIG. 46 illustrates multiple such design structures including an input design structure 4620 that is preferably processed by a design process 4610. Design structure 4620 may be a logical simulation design structure generated and processed by design process 4610 to produce a logically equivalent functional representation of a hardware device. Design structure 4620 may also or alternatively comprise data and/or program instructions that when processed by design process 4610, generate a functional representation of the physical structure of a hardware device. Whether representing functional and/or structural design features, design structure 4620 may be generated using electronic computer-aided design (ECAD) such as implemented by a core developer/designer. When encoded on a machine-readable data transmission, gate array, or storage medium, design structure 4620 may be accessed and processed by one or more hardware and/or software modules within design process 4610 to simulate or otherwise functionally represent an electronic component, circuit, electronic or logic module, apparatus, device, or system such as those illustrated herein. As such, design structure 4620 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 4610 preferably employs and incorporates hardware and/or software modules for synthesizing, translating, or otherwise processing a design/simulation functional equivalent of the components, circuits, devices, or logic structures shown herein to generate a netlist 4680 which may contain design structures such as design structure 4620. Netlist 4680 may comprise, for example, compiled or otherwise processed data structures representing a list of wires, discrete components, logic gates, control circuits, I/O devices, models, etc. that describes the connections to other elements and circuits in an integrated circuit design. Netlist 4680 may be synthesized using an iterative process in which netlist 4680 is resynthesized one or more times depending on design specifications and parameters for the device. As with other design structure types described herein, netlist 4680 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 4610 may include hardware and software modules for processing a variety of input data structure types including netlist 4680. Such data structure types may reside, for example, within library elements 4630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 4640, characterization data 4650, verification data 4660, design rules 4670, and test data files 4685 which may include input test patterns, output test results, and other testing information. Design process 4610 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 4610 without deviating from the scope and spirit of the invention. Design process 4610 may also include modules for performing standard circuit design processes such as timing analysis, verification, design rule checking, place and route operations, etc.

Design process 4610 employs and incorporates logic and physical design tools such as HDL compilers and simulation model build tools to process design structure 4620 together with some or all of the depicted supporting data structures along with any additional mechanical design or data (if applicable), to generate a second design structure 4690. Design structure 4690 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 4620, design structure 4690 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 4690 may comprise a compiled, executable HDL simulation model that functionally simulates the devices shown herein.

Design structure 4690 may also employ a data format used for the exchange of layout data of integrated circuits and/or symbolic data format (e.g., information stored in a GDSII (GDS2), GL1, OASIS, map files, or any other suitable format for storing such design data structures). Design structure 4690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 4690 may then proceed to a stage 4695 where, for example, design structure 4690: proceeds to tape-out, is released to manufacturing, is released to a mask house, is sent to another design house, is sent back to the customer, etc. As has been described, in at least one embodiment, An integrated circuit includes a first communication interface for communicatively coupling the integrated circuit with a coherent data processing system, a second communication interface for communicatively coupling the integrated circuit with an accelerator unit including an effective address-based accelerator cache for buffering copies of data from a system memory, and a real address-based directory inclusive of contents of the accelerator cache. The real address-based directory assigns entries based on real addresses utilized to identify storage locations in the system memory. The integrated circuit further includes directory control logic that configures at least a number of congruence classes utilized in the real address-based directory based on configuration parameters specified on behalf of or by the accelerator unit.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se. Further, the term "coupled" as used herein is defined to encompass embodiments employing a direct electrical connection between coupled elements or blocks, as well as embodiments employing an indirect electrical connection between coupled elements or blocks achieved using one or more intervening elements or blocks. In addition, the term "exemplary" is defined herein as meaning one example of a feature, not necessarily the best or preferred example.

What is claimed is:

1. An integrated circuit for a coherent data processing system including a system memory, the integrated circuit comprising:
    a first communication interface for communicatively coupling the integrated circuit with the coherent data processing system;
    a second communication interface for communicatively coupling the integrated circuit with an accelerator unit including an effective address-based accelerator cache for buffering copies of data from the system memory of the coherent data processing system;
    a set-associative real address-based directory inclusive of contents of the accelerator cache, wherein the real address-based directory assigns entries based on real addresses utilized to identify storage locations in the system memory; and
    directory control logic that configures at least a number of congruence classes utilized in the real address-based directory based on configuration parameters provided by or on behalf of the accelerator unit.

2. The integrated circuit of claim 1, wherein the directory control logic further configures a number of ways per congruence class utilized in the real address-based directory based on the configuration parameters.

3. The integrated circuit of claim 2, wherein:
the directory control logic is configured to first attempt to configure a desired number of ways in the real address-based directory and then to attempt to configure a desired number of congruence classes.

4. The integrated circuit of claim 3, wherein the directory control logic, based on the configuration parameters specifying directory dimensions greater than a maximum physical size of the real address-based directory, configures the real address-based directory to use the maximum physical size.

5. The integrated circuit of claim 1, wherein the directory control logic is configured to iteratively attempt a best fit of desired directory dimensions indicated by the configuration parameters within a maximum physical size of the real address-based directory.

6. The integrated circuit of claim 1, wherein:
the configuration parameters include a number of host tags to employ to map between entries in the real address-based directory and data storage locations the effective address-based accelerator cache.

7. A system, comprising:
the integrated circuit of claim 6;
the accelerator unit coupled to the integrated circuit via the second communication interface, wherein:
the accelerator cache includes a cache configuration register for storing one of the configuration parameters; and
the cache configuration register specifies a value for the configuration parameter expressed as a positive integer exponent of 2.

8. A method of data processing in a coherent data processing system including a system memory, the method comprising:
host attach logic communicating memory access requests with the coherent data processing system via a first communication interface and communicating, via a second communication interface, memory access requests and request responses with an accelerator unit including an effective address-based accelerator cache for buffering copies of data from the system memory;
the host attach logic recording, in a real address-based directory inclusive of contents of the accelerator cache, addresses of data from the system memory accessed by the accelerator unit, wherein the recording includes assigning entries in the real address-based directory based on real addresses utilized to identify storage locations in the system memory; and
configuring at least a number of congruence classes utilized in the real address-based directory based on configuration parameters provided by or on behalf of the accelerator unit.

9. The method of claim 8, and further comprising configuring a number of ways per congruence class utilized in the real address-based directory based on the configuration parameters.

10. The method of claim 9, wherein the configuring includes first attempting to configure a desired number of ways in the real address-based directory and then to attempting to configure a desired number of congruence classes.

11. The method of claim 8, and further comprising:
based on the configuration parameters specifying directory dimensions greater than a maximum physical size of the real address-based directory, configuring the real address-based directory to use the maximum physical size.

12. The method of claim 8, wherein the configuring includes iteratively attempting a best fit of desired directory dimensions indicated by the configuration parameters within a maximum physical size of the real address-based directory.

13. The method of claim 8, wherein:
the configuration parameters include a number of host tags to employ to map between entries in the real address-based directory and data storage locations the effective address-based accelerator cache.

14. The method of claim 8, and further comprising specifying a configuration parameter in a cache configuration register, wherein the cache configuration register specifies a value for the configuration parameter expressed as a positive integer exponent of 2.

15. A design structure tangibly embodied in a storage device for designing, manufacturing, or testing an integrated circuit, the design structure comprising:
host attach logic, including:
a first communication interface for communicatively coupling the integrated circuit with the coherent data processing system;
a second communication interface for communicatively coupling the integrated circuit with an accelerator unit including an effective address-based accelerator cache for buffering copies of data from the system memory of the coherent data processing system;
a set-associative real address-based directory inclusive of contents of the accelerator cache, wherein the real address-based directory assigns entries based on real addresses utilized to identify storage locations in the system memory; and
directory control logic that configures at least a number of congruence classes utilized in the real address-based directory based on configuration parameters provided by or on behalf of the accelerator unit.

16. The design structure of claim 15, wherein the directory control logic further configures a number of ways per congruence class utilized in the real address-based directory based on the configuration parameters.

17. The design structure of claim 16, wherein:
the directory control logic is configured to first attempt to configure a desired number of ways in the real address-based directory and then to attempt to configure a desired number of congruence classes.

18. The design structure of claim 17, wherein the directory control logic, based on the configuration parameters specifying directory dimensions greater than a maximum physical size of the real address-based directory, configures the real address-based directory to use the maximum physical size.

19. The design structure of claim 15, wherein the directory control logic is configured to iteratively attempt a best fit of desired directory dimensions indicated by the configuration parameters within a maximum physical size of the real address-based directory.

20. The design structure of claim 15, wherein:
the configuration parameters include a number of host tags to employ to map between entries in the real address-based directory and data storage locations the effective address-based accelerator cache.

* * * * *